United States Patent
Bolognia et al.

(10) Patent No.: US 12,474,290 B2
(45) Date of Patent: Nov. 18, 2025

(54) ELECTROCHEMICAL DEVICE

(71) Applicant: Analog Devices International Unlimited Company, Limerick (IE)

(72) Inventors: David Frank Bolognia, Charlestown, MA (US); Weidong Wang, Westford, MA (US); Alfonso Berduque, Crusheen (IE)

(73) Assignee: Analog Devices International Unlimited Company, Limerick (IE)

( * ) Notice: Subject to any disclaimer, the term of this patent is extended or adjusted under 35 U.S.C. 154(b) by 407 days.

(21) Appl. No.: 16/689,966

(22) Filed: Nov. 20, 2019

(65) Prior Publication Data

US 2021/0148852 A1    May 20, 2021

(51) Int. Cl.
*G01N 27/404*    (2006.01)
*G01N 33/00*    (2006.01)

(52) U.S. Cl.
CPC ....... *G01N 27/4045* (2013.01); *G01N 33/004* (2013.01)

(58) Field of Classification Search
CPC .......... G01N 27/4045; G01N 33/004
See application file for complete search history.

(56) References Cited

U.S. PATENT DOCUMENTS

| | | |
|---|---|---|
| 3,675,501 A | 7/1972 | De Kanter |
| 4,135,999 A | 1/1979 | Schindler et al. |
| 4,267,509 A | 5/1981 | Graham |
| 4,377,446 A * | 3/1983 | Albery ............... G01N 27/4045 |
| | | 204/415 |
| 4,575,330 A | 3/1986 | Hull |
| 4,671,852 A | 6/1987 | Pyke |
| 4,752,352 A | 6/1988 | Feygin |
| 4,863,538 A | 9/1989 | Deckard |

(Continued)

FOREIGN PATENT DOCUMENTS

| | | |
|---|---|---|
| AT | 511171 A1 | 9/2012 |
| CN | 1728365 A | 2/2006 |

(Continued)

OTHER PUBLICATIONS

Dulger (DE 3723798 A1, machine translation) (Year: 1989).*

(Continued)

*Primary Examiner* — Luan V Van
*Assistant Examiner* — Shizhi Qian
(74) *Attorney, Agent, or Firm* — Knobbe, Martens, Olson & Bear, LLP

(57) ABSTRACT

A gas sensor is disclosed. The gas sensor can include a housing that has an upper portion and a lower portion. The gas sensor can also include a chamber that is formed in the lower portion of the housing. The chamber can be configured to receive an electrochemical solution. The gas sensor can also include a plurality of electrodes that are formed in the upper portion of the housing. The plurality of electrodes can be molded in the upper portion of the housing and at least partially exposed to the chamber. The gas sensor can further include an access port that is formed in the upper portion. The access port can be configured to provide fluid communication between the an interior of the housing and the outside environs. The gas sensor can be a system-in-package (SiP) sensor.

18 Claims, 59 Drawing Sheets

(56) References Cited

U.S. PATENT DOCUMENTS

| | | |
|---|---|---|
| 5,173,166 A | 12/1992 | Tomantschger et al. |
| 5,183,550 A | 2/1993 | Mattiessen |
| 5,313,365 A | 5/1994 | Pennisi et al. |
| 5,348,693 A | 9/1994 | Taylor et al. |
| 5,547,554 A * | 8/1996 | Kiesele ............ G01N 27/4045 204/415 |
| 5,624,546 A * | 4/1997 | Milco ................ G01N 27/4045 205/794.5 |
| 5,666,127 A | 9/1997 | Kochiyama et al. |
| 5,870,482 A | 2/1999 | Loeppert et al. |
| 6,030,118 A | 2/2000 | Schneider et al. |
| 6,075,239 A | 6/2000 | Aksyuk et al. |
| 6,765,287 B1 | 7/2004 | Lin |
| 6,781,231 B2 | 8/2004 | Minervini |
| 6,800,930 B2 | 10/2004 | Jackson et al. |
| 6,803,559 B2 | 10/2004 | Hsu et al. |
| 6,879,429 B2 | 4/2005 | Wong et al. |
| 6,894,502 B2 | 5/2005 | Feng et al. |
| 6,997,698 B2 | 2/2006 | Silverbrook |
| 7,048,890 B2 | 5/2006 | Cochoorn et al. |
| 7,077,938 B1 * | 7/2006 | Austen ............... G01N 27/4045 204/431 |
| 7,130,177 B2 | 10/2006 | Aizawa et al. |
| 7,202,552 B2 | 4/2007 | Zhe et al. |
| 7,208,832 B2 | 4/2007 | Yamagata |
| 7,242,089 B2 | 7/2007 | Minervini |
| 7,255,551 B2 | 8/2007 | Taylor et al. |
| D575,056 S | 8/2008 | Tan |
| 7,547,415 B2 | 6/2009 | Hataoka et al. |
| 7,550,834 B2 | 6/2009 | Yu et al. |
| 7,648,911 B2 | 1/2010 | Pagaila et al. |
| 7,691,747 B2 | 4/2010 | Lin et al. |
| 7,719,427 B2 | 5/2010 | Hsiung et al. |
| 7,723,831 B2 | 5/2010 | Kwang et al. |
| 7,855,429 B2 | 12/2010 | Ishida et al. |
| 7,875,942 B2 | 1/2011 | Cortese et al. |
| 7,898,043 B2 | 3/2011 | Ziglioli et al. |
| 8,101,898 B2 | 1/2012 | Koste et al. |
| 8,115,283 B1 | 2/2012 | Bolognia et al. |
| 8,155,355 B2 | 4/2012 | Ogura et al. |
| 8,199,939 B2 | 6/2012 | Suvanto et al. |
| 8,274,147 B2 | 9/2012 | Rofougaran et al. |
| 8,280,207 B2 | 10/2012 | Pinguet et al. |
| 8,300,870 B2 | 10/2012 | Lee et al. |
| 8,339,798 B2 | 12/2012 | Minoo et al. |
| 8,350,382 B2 | 1/2013 | Furgut et al. |
| 8,362,589 B2 | 1/2013 | Quinn |
| 8,368,654 B2 | 2/2013 | Rosenblatt et al. |
| 8,390,083 B2 | 3/2013 | O'Donnell et al. |
| 8,395,252 B1 | 3/2013 | Yang |
| 8,402,666 B1 | 3/2013 | Hsu et al. |
| 8,436,690 B2 | 5/2013 | McCraith et al. |
| 8,436,698 B2 | 5/2013 | Rogers |
| 8,502,329 B2 | 8/2013 | Hsieh et al. |
| 8,569,861 B2 | 10/2013 | O'Donnell et al. |
| 8,574,413 B2 | 11/2013 | Mosley et al. |
| 8,577,063 B2 | 11/2013 | Yang |
| 8,625,832 B2 | 1/2014 | Lillelund |
| 8,637,943 B1 | 1/2014 | Yang |
| 8,754,643 B2 | 6/2014 | Gugel et al. |
| 8,779,532 B2 | 7/2014 | O'Donnell et al. |
| 8,847,340 B2 | 9/2014 | Baldo et al. |
| 8,852,513 B1 | 10/2014 | Speer et al. |
| 8,853,799 B2 | 10/2014 | O'Donnell et al. |
| 8,890,285 B2 | 11/2014 | O'Donnell et al. |
| 8,890,286 B2 | 11/2014 | O'Donnell et al. |
| 8,957,497 B2 | 2/2015 | O'Donnell et al. |
| 9,041,150 B2 | 5/2015 | O'Donnell et al. |
| 9,063,084 B1 | 6/2015 | Lin et al. |
| 9,156,680 B2 | 10/2015 | Kierse et al. |
| 9,267,915 B2 | 2/2016 | O'Donnell et al. |
| 9,269,831 B2 | 2/2016 | Ehrenpfordt et al. |
| 9,545,669 B2 | 1/2017 | Åklint et al. |
| 9,618,490 B2 | 4/2017 | Paik et al. |
| 9,661,408 B2 | 5/2017 | Kierse et al. |
| 9,818,665 B2 | 11/2017 | Elian et al. |
| 9,983,164 B1 | 5/2018 | Allen et al. |
| 9,993,982 B2 | 6/2018 | Sherrer et al. |
| 10,357,771 B2 | 7/2019 | Bharadwaj et al. |
| 10,730,743 B2 | 8/2020 | Kierse et al. |
| 10,967,122 B2 | 4/2021 | Cima |
| 11,666,913 B2 | 6/2023 | Beaumont et al. |
| 12,117,415 B2 | 10/2024 | Berney et al. |
| 2003/0000833 A1 | 1/2003 | Mansouri et al. |
| 2004/0000713 A1 | 1/2004 | Yamashita et al. |
| 2004/0190254 A1 | 9/2004 | Hu et al. |
| 2005/0156584 A1 | 7/2005 | Feng |
| 2005/0189622 A1 | 9/2005 | Humpston et al. |
| 2005/0253244 A1 | 11/2005 | Chang |
| 2006/0139883 A1 | 6/2006 | Hu et al. |
| 2006/0258053 A1 | 11/2006 | Lee et al. |
| 2006/0261460 A1 | 11/2006 | Sato et al. |
| 2006/0266098 A1 | 11/2006 | Eickhoff et al. |
| 2006/0283252 A1 | 12/2006 | Liu et al. |
| 2007/0053504 A1 | 3/2007 | Sato et al. |
| 2007/0071268 A1 | 3/2007 | Harney et al. |
| 2007/0082421 A1 | 4/2007 | Minerviani |
| 2007/0138027 A1 | 6/2007 | Dinsmoor et al. |
| 2007/0187826 A1 | 8/2007 | Shim et al. |
| 2007/0202627 A1 | 8/2007 | Minervini |
| 2007/0210423 A1 | 9/2007 | Hsu |
| 2007/0246806 A1 | 10/2007 | Ong et al. |
| 2007/0246813 A1 | 10/2007 | Ong et al. |
| 2007/0278601 A1 | 12/2007 | Goodelle et al. |
| 2007/0296065 A1 | 12/2007 | Yew et al. |
| 2008/0054431 A1 | 3/2008 | Wang et al. |
| 2008/0075309 A1 | 3/2008 | Chen et al. |
| 2008/0079142 A1 | 4/2008 | Carmona et al. |
| 2008/0151590 A1 | 6/2008 | Rogers et al. |
| 2008/0175425 A1 | 7/2008 | Roberts et al. |
| 2008/0217766 A1 | 9/2008 | Minervini |
| 2008/0234599 A1 | 9/2008 | Chiao et al. |
| 2008/0265421 A1 | 10/2008 | Brunnbauer et al. |
| 2008/0304681 A1 | 12/2008 | Langlois et al. |
| 2009/0008792 A1 | 1/2009 | Ko et al. |
| 2009/0026080 A1 | 1/2009 | Han et al. |
| 2009/0029492 A1 | 1/2009 | Tu et al. |
| 2009/0039492 A1 | 2/2009 | Kang et al. |
| 2009/0072334 A1 | 3/2009 | Saitoh |
| 2009/0079065 A1 | 3/2009 | Furgut et al. |
| 2009/0170242 A1 | 7/2009 | Lin et al. |
| 2009/0194829 A1 | 8/2009 | Chung et al. |
| 2009/0200620 A1 | 8/2009 | Omura et al. |
| 2009/0202089 A1 | 8/2009 | Zhang et al. |
| 2009/0204250 A1 | 8/2009 | Potyrailo et al. |
| 2009/0261460 A1 | 10/2009 | Kuan et al. |
| 2009/0283871 A1 | 11/2009 | Chang et al. |
| 2009/0302437 A1 | 12/2009 | Kim et al. |
| 2009/0320698 A1 | 12/2009 | LaPerna Wong |
| 2009/0321930 A1 | 12/2009 | Marcoux |
| 2010/0009133 A1 | 1/2010 | Chait |
| 2010/0032748 A1 | 2/2010 | Edwards |
| 2010/0044704 A1 | 2/2010 | Male et al. |
| 2010/0052630 A1 | 3/2010 | Chen |
| 2010/0055895 A1 | 3/2010 | Zafiropoulo et al. |
| 2010/0086146 A1 | 4/2010 | Gong et al. |
| 2010/0090295 A1 | 4/2010 | Zhe et al. |
| 2010/0134139 A1 | 6/2010 | Chen et al. |
| 2010/0142744 A1 | 6/2010 | Rombach et al. |
| 2010/0155863 A1 | 6/2010 | Weekamp |
| 2010/0171203 A1 | 7/2010 | Chen et al. |
| 2010/0181643 A1 | 7/2010 | Kothandaraman et al. |
| 2010/0193905 A1 | 8/2010 | Kim et al. |
| 2010/0284553 A1 | 11/2010 | Conti et al. |
| 2011/0013787 A1 | 1/2011 | Chang |
| 2011/0023929 A1 | 2/2011 | Edwards |
| 2011/0057273 A1 | 3/2011 | O'Donnell et al. |
| 2011/0101537 A1 | 5/2011 | Barth |
| 2011/0108933 A1 | 5/2011 | Nakatani |
| 2011/0140703 A1 | 6/2011 | Chiao et al. |
| 2011/0198714 A1 | 8/2011 | Yang |
| 2011/0199057 A1 | 8/2011 | Ivanov et al. |
| 2011/0293126 A1 | 12/2011 | Maekawa et al. |
| 2011/0317863 A1 | 12/2011 | Inoda et al. |

(56) References Cited

U.S. PATENT DOCUMENTS

| | | | |
|---|---|---|---|
| 2012/0065617 A1 | 3/2012 | Matsiev et al. | |
| 2012/0079981 A1 | 4/2012 | Huffman et al. | |
| 2012/0237073 A1 | 9/2012 | Goida et al. | |
| 2012/0250925 A1 | 10/2012 | Lillelund | |
| 2012/0321111 A1 | 12/2012 | Lillelund | |
| 2013/0037909 A1 | 2/2013 | French | |
| 2013/0085687 A1 | 4/2013 | Danov et al. | |
| 2013/0105952 A1 | 5/2013 | Fontana et al. | |
| 2013/0119509 A1 | 5/2013 | Farooq et al. | |
| 2013/0250532 A1 | 9/2013 | Bryzek et al. | |
| 2013/0273693 A1 | 10/2013 | Haba et al. | |
| 2013/0299924 A1 | 11/2013 | Weber et al. | |
| 2014/0014480 A1 | 1/2014 | Anderson et al. | |
| 2014/0026649 A1 | 1/2014 | O'Donnell et al. | |
| 2014/0034104 A1 | 2/2014 | O'Donnell et al. | |
| 2014/0035630 A1 | 2/2014 | O'Donnell et al. | |
| 2014/0044297 A1 | 2/2014 | Loeppert et al. | |
| 2014/0103540 A1 | 4/2014 | Ching et al. | |
| 2014/0162393 A1 | 6/2014 | Yang | |
| 2014/0197042 A1 | 7/2014 | Zhang et al. | |
| 2014/0233782 A1 | 8/2014 | Bolognia et al. | |
| 2014/0250975 A1 | 9/2014 | Kane | |
| 2014/0311905 A1 | 10/2014 | Stetter et al. | |
| 2015/0010191 A1 | 1/2015 | Baumhauer, Jr. et al. | |
| 2015/0075257 A1 | 3/2015 | Paik et al. | |
| 2015/0075258 A1 | 3/2015 | Paik et al. | |
| 2015/0090002 A1 | 4/2015 | Paik et al. | |
| 2015/0131248 A1 | 5/2015 | Dakhiya et al. | |
| 2015/0177171 A1 | 6/2015 | Kim et al. | |
| 2015/0198551 A1 | 7/2015 | Jun et al. | |
| 2015/0247818 A1 | 9/2015 | Silvester et al. | |
| 2015/0346138 A1* | 12/2015 | Allen | G01N 27/404 204/414 |
| 2015/0362451 A1 | 12/2015 | Hunziker et al. | |
| 2016/0047774 A1* | 2/2016 | Teysseyre | G01N 27/128 204/406 |
| 2016/0105737 A1 | 4/2016 | Kierse et al. | |
| 2016/0178565 A1* | 6/2016 | Chapples | G01N 27/407 427/58 |
| 2017/0045472 A1 | 2/2017 | Zanon et al. | |
| 2017/0131230 A1 | 5/2017 | Papageorge et al. | |
| 2017/0199148 A1 | 7/2017 | Berney et al. | |
| 2017/0257687 A1 | 9/2017 | Kierse et al. | |
| 2017/0336343 A1* | 11/2017 | Bhat | G01N 27/4163 |
| 2018/0038737 A1 | 2/2018 | Hedlund et al. | |
| 2018/0050486 A1 | 2/2018 | Talgorn et al. | |
| 2018/0059044 A1 | 3/2018 | Berduque et al. | |
| 2018/0266984 A1* | 9/2018 | Pratt | G01N 27/4035 |
| 2018/0372675 A1 | 12/2018 | Wade et al. | |
| 2019/0135614 A1* | 5/2019 | Kierse | B81C 1/00269 |
| 2019/0178829 A1* | 6/2019 | Matsumoto | G01N 27/16 |
| 2019/0227024 A1 | 7/2019 | Bhat et al. | |
| 2019/0227026 A1* | 7/2019 | Bhat | G01N 27/404 |
| 2019/0277801 A1* | 9/2019 | Pratt | G01N 27/413 |
| 2020/0072783 A1 | 3/2020 | Berney et al. | |
| 2020/0411398 A1 | 12/2020 | Bologna et al. | |

FOREIGN PATENT DOCUMENTS

| | | | |
|---|---|---|---|
| CN | 1877989 A | | 12/2006 |
| CN | 101409279 A | | 4/2009 |
| CN | 201490184 A | | 5/2010 |
| CN | 203376285 U | * | 1/2014 |
| CN | 106687804 A | | 5/2017 |
| CN | 109752486 A | | 5/2019 |
| CN | 110678745 A | | 1/2020 |
| CN | 112825362 A | | 5/2021 |
| CN | 116124856 A | | 5/2023 |
| DE | 3723798 A1 | * | 1/1989 |
| DE | 20 2014 102 842 U1 | | 8/2014 |
| DE | 10 2018 127 399 A1 | | 5/2019 |
| EP | 0015322 | | 9/1980 |
| EP | 1732215 | | 12/2006 |
| EP | 2086015 | | 8/2009 |
| EP | 2765410 A1 | | 8/2014 |
| EP | 2857349 A3 | | 5/2015 |
| EP | 3480590 A1 | | 5/2019 |
| EP | 3625554 | | 3/2020 |
| EP | 3828536 | | 6/2021 |
| EP | 3896470 A1 | | 10/2021 |
| JP | S60-012780 | | 1/1985 |
| JP | 63-26569 | | 2/1988 |
| JP | H04-152664 | | 5/1992 |
| JP | H05-258925 | | 10/1993 |
| JP | H10-051017 | | 2/1998 |
| JP | 2002-111041 | | 4/2002 |
| JP | 2002-246514 | | 8/2002 |
| JP | 2004-207540 | | 7/2004 |
| JP | 2004-349537 | | 12/2004 |
| JP | 2005-283389 | | 10/2005 |
| JP | 2005-353867 | | 12/2005 |
| JP | 2006-245311 | | 9/2006 |
| JP | 2006-344737 | | 12/2006 |
| JP | 2006-352136 | | 12/2006 |
| JP | 2007-103413 | | 4/2007 |
| JP | 2007-234913 | | 9/2007 |
| JP | 2008-017421 | | 1/2008 |
| JP | 2008-173462 | | 7/2008 |
| JP | 2008237949 A | * | 10/2008 |
| JP | 2009-081100 | | 4/2009 |
| JP | 2009-081160 | | 4/2009 |
| JP | 2009-200189 | | 9/2009 |
| JP | 2010-087021 | | 4/2010 |
| JP | 2010107335 A | * | 5/2010 |
| JP | 2010-251662 | | 11/2010 |
| KR | 10-0537093 | | 12/2005 |
| KR | 2006-0045375 | | 5/2006 |
| KR | 2009-0117004 | | 11/2009 |
| KR | 10-2010-0112699 | | 10/2010 |
| KR | 10-2715943 | | 10/2024 |
| WO | WO 96/02438 A1 | | 2/1996 |
| WO | WO 97/44707 | | 11/1997 |
| WO | WO 00/19190 A1 | | 4/2000 |
| WO | WO 2005/101476 | | 10/2005 |
| WO | WO 2007/129787 A1 | | 11/2007 |
| WO | WO 2010/053997 | | 5/2010 |
| WO | WO 2010/100929 | | 9/2010 |
| WO | WO 2010/117874 | | 10/2010 |
| WO | WO 2010/136919 | | 12/2010 |
| WO | WO 2011/103720 | | 9/2011 |
| WO | WO 2011/142636 A9 | | 11/2011 |
| WO | WO 2016/015028 A1 | | 1/2016 |
| WO | WO 2016/163630 A1 | | 10/2016 |
| WO | WO 2017/099963 A1 | | 6/2017 |

OTHER PUBLICATIONS

Ono et al., English translation of JP2010107335A, 2010 (Year: 2010).*

Sawa et al., English translation of JP2008237949A, 2008 (Year: 2008).*

Zhang et al., English translation of CN203376285U, 2014 (Year: 2014).*

Berger, M., "Polymer Carpets—A New Class of Nanomaterials for NEMS and MEMS", Nanowerk, Sep. 2, 2010. (retrieved from http://www.nanowerk.com/spotlight/spotid=17875.php).

Chait et al. "Custom Designed Microstructures Using Metamaterials," Antenna Systems & Technology Magazine and Conference, World Wide Web Address: antennasonline.com/eprints/EoPlex_Sept10.html; accessed Aug. 24, 2012.

Chait, "High-Volume Print Forming, HVPF™ A New Method for Manufacturing Large Volumes of Complex Metal-Ceramic and Hybrid Components," World Wide Web Address: eoplex.com/images/eoplex_whitepaper_hvpf.pdf, accessed Aug. 24, 2012.

Chait. "Solving 'The Last Milli-Mile' Problem in Vehicle Safety: The EoPlex Approach to Powering Wireless Tire Pressure Sensors," World Wide Web Address: eoplex.com/images/eoplex_whitepaper_tire.pdf, accessed Aug. 24, 2012.

Chou, J., Chapter 2: Electrochemical Sensors, Hazardous Gas Monitors, 1000 McGraw-Hill, pp. 27-35.

(56) References Cited

OTHER PUBLICATIONS

Duplessis, M. et al., "Physical Implementation of 3D Integrated Solenoids within Silicon Substrate for Hybrid IC Applications", IEEE European Microwave Conference, Oct. 2009, pp. 1006-1009.
Fan, H.B. et al., "Prediction of Delamination in a Bi-material System based on Free-Edge Energy Evaluation", Proceedings of the 53rd IEEE Electronic Components and Technology Conference, May 2003, pp. 1160-1164.
Hagleitner et al., "Smart single-chip gas sensor microsystem", Nature 414, Nov. 15, 2001, 3 pages.
Hosiden, "Guide for Electret Condenser Microphones," World Wide Web Address: es.co.th/schemetic/pdf/KUC.pdf. accessed Aug. 24, 2012.
International Search Report and Written Opinion, mailed Aug. 8, 2018, in International Application No. PCT/EP2018/062505, 11 pages.
Japanese Office Action of Feb. 10, 2016 for Japanese Patent Application No. 2015-079984, filed Apr. 9, 2015, 4 pages and 4 page translation.
Kanellos, "How Do You Make a Fuel Cell? Print it," CNET News, World Wide Web Address: news.cnet.com/How-do-you-make-a-fuel-cell-Print-it/2100-1008_3-6078124.html?tag=sas.email; accessed Aug. 24, 2012.
Kim et al., "Hydrogel-Based Integrated Antenna-pH Sensor", IEEE Sensors Conference, 2007, pp. 695-698.
Luo, Y. et al., "An Improved Estimate for Thermal Stresses in Multi-Layer Assemblies", IEEE 11th Intersociety Conference on Thermal and Thermomechanical Phenomena in Electronic Systems, May 2008, pp. 842-852.
Maseeh et al., "A Novel Silicon Micro Amperometric Gas Sensor", IEEE 1991, pp. 359-362.
Massachusetts Institute of Technology, "Funneling Solar Energy: Antenna Made of Carbon Nanotubes Could Make Photovoltaic Cells More Efficient", ScienceDaily. Sep. 13, 2010. (retrieved from http://www.sciencedaily.com/releases/2010/09/100912151548.htm).
Meng, E. et al., "Polymer MEMS for Micro Fluid Delivery Systems", American Chemical Society (ACS) Polymer MEMS Symposia, New York, New York, USA, Sep. 2003. (two pages).
Moore, T.D., "Peeling Stress Analyzed for Resistance to Delamination—Application to Multiple Thin Films on a Thick Substrate", IEEE 9th Intersociety Conference on Thermomechanical Phenomena in Electronic Systems, Jun. 2004, vol. 2, pp. 330-335.
Nie, Chuan et al., "An integrated flex-microfluidic-Si chip device towards sweat sensing applications," Sensors and Actuators B, May 2, 2016, vol. 227, pp. 427-437.
Open Music Labs. "Electret Microphones," World Wide Web Address: openmusiclabs.com/learnig/sensors/electret-microphones/, accessed Aug. 24, 2012.
Rogren et al., "A High Perfor mance and Cost Effective Molded Array Package Substrate," World Wide Web Address: eoplex.com/QFP_MR_White_Paper.pdf, accessed Aug. 24, 2012.
Roozeboom, F. et al., "System-in-Package Integration of Passives using 3D Through-Silicon Vias", Solid State Technology, May 2008, vol. 51, No. 5, pp. 38-47.
Taylor et al, "'Spatial Forming' A Three Dimensional Printing Process," World Wide Web Address: eoplex.com/images/eoplex_whitepaper_3dprinting.pdf, accessed Aug. 24, 2012.
University of Southern California. "Graphene Organic Photovoltaics: Flexible Material Only a Few Atoms Thick May Offer Cheap Solar Power", ScienceDaily, Jul. 24, 2010. (retrieved from http://www.sciencedaily.com/releases/2010/07/100723095430.htm).
Wang, K. et al., "Interfacial Shear Stress, Peeling Stress and Die Cracking Stress in Trilyaer Electronic Assemblies", IEEE 7th Intersociety Conference on Thermomechanical Phenomena in Electronic Systems, May 2000, vol. 2, pp. 56-64.
Website for Goldpoint pH Sensor orp202g-2 having 2014 copyright date, http://www.igpg.com.cn/Products/Online_pH_ORP_Sensor2/75.html (accessed Jun. 10, 2016).
Website related to Andose pH sensor Glass ORP/pH sensor, http://www.aliexpress.com/store/product/Glass-PH-sensor-PH-electrode-for-pipe-on-stallation-ph-G2008/1040787_32259217887.html (accessed Jun. 10, 2016).
Zevenbergen, Marcel A.G. et al., "Electrochemical sensing of ethylene employing a thin ionic-liquid layer," Analytical Chemistry, Aug. 15, 2011, vol. 83, No. 16, pp. 6300-6307.
Zevenbergen, Marcel A.G. et al., "Solid state pH and chloride sensor with microfluidic reference electrode," 2016 IEEE International Electron Devices Meeting (IEDM), Dec. 2, 2016, pp. 26.1.1-26.1.4.
Extended European Search Report issued in application No. 20206101.6 on Apr. 30, 2021.
Chinese Office Action of Aug. 11, 2016 for Chinese Patent Application No. 201410454353.9, 3 pages.
Chinese Office Action of Dec. 21, 2015 for Chinese Patent Application No. 201410454357.7, filed Sep. 9, 2014, 10 pages.
Chinese Office Action of Dec. 28, 2015 for Chinese Patent Application No. 201410454354.3, filed Sep. 9, 2014. 5 pages.
Chinese Office Action of Dec. 30, 2013 for Chinese Patent Application No. 201110433902.0, filed Dec. 22, 2011. 6 pages.
Chinese Office Action of Feb. 3, 2016 for Chinese Patent Application No. 201410454358.1, filed Sep. 9, 2014, 5 pages.
Chinese Office Action of Jul. 18, 2016 for Chinese Patent Application No. 201410454357.7, 5 pages.
Chinese Office Action of Mar. 2, 2016 for Chinese Patent Application No. 201410454353.9, filed Sep. 9, 2014.
Chinese Office Action of Sep. 13, 2016 for Chinese Patent Application No. 201410454354.3, 6 pages.
Chinese Office Action of Feb. 8, 2024 for Chinese Patent Application No. 202011310987.9, 10 pages.
Chinese Office Action of Aug. 28, 2024 for Chinese Patent Application No. 202011310987.9, 11 pages.
Decision of Rejection of Jan. 18. 2016 for Japanese Patent Application No. 2011-279492, 8 pages and 8 page translation.
European Communication under Rule 63(1) mailed Oct. 8, 2015 in European Patent Application No. 15 170 129.9, 3 pages.
European Office Action of Jan. 18, 2016 for European Patent Application No. 11 192 789.3, 5 pages.
European Office Action of Nov. 9, 2023, for European Patent Application No. 18 728 051.6, 11 pages.
Extended European Search Report dated Mar. 26, 2012, in European Application No. 11192789.3.
Extended European Search Report issued in application No. 18204196.2 on Feb. 13, 2019.
Extended European Search Report of Mar. 17, 2016 for European Patent Application No. 15170129.9. 12 pages.
Extended Search Report mailed May 8, 2015 in European Patent Application No. 15151494.0, 7 pages.
Japanese Office Action of Feb. 2, 2015 for Japanese Patent Application No. 2011-279492, filed on Dec. 21, 2011. 3 pages, 3 page translation.
Japanese Office Action of Feb. 26, 2013 for Japanese Patent Application No. 2011279492: filed Dec. 21, 2011. 3 pages, 3 page translation.
Japanese Office Action of Jun. 29, 2015 for Japanese Patent Application No. 2015-079984, filed Apr. 9, 2015. 3 pages, 3 page translation.
Japanese Office Action of Mar. 31, 2014 for Japanese Patent Application No. 2011-279492, filed Dec. 21, 2011. 3 pages, 3 page translation.
Korean Office Action of Jun. 17, 2013 for Korean Patent Application No. 10-2011-0139346 filed Dec. 21, 2011. 6 pages, 6 page translation.
Notice of Allowance of Dec. 26, 2013 for Korean Patent Application No. 10-2011-0139346 filed Dec. 21, 2011. 2 pages, 1 page translation.
Office Action of Jul. 3, 2015 for Chinese Application No. 201410454353.9, 4 pages.
Office Action received in European Application No. 18728051.6, dated Oct. 29, 2021 in 7 pages.
Office Action of Mar. 17, 2016 for Taiwanese Patent Application No. 103131989. 5 pages.

(56) References Cited

OTHER PUBLICATIONS

Search Report dated Nov. 30, 2015 in Taiwanese Patent Application No. 103131988, 4 pages.
Taiwanese Office Action of Jul. 11, 2014 for Taiwanese Patent Application No. 100146568, filed on Dec. 15, 2011. 4 pages, 3 page translation.
Taiwanese Office Action of Nov. 26, 2015 for Taiwan Patent Application No. 103131988, filed Sep. 16, 2014. 7 pages with translation.
Taiwanese Search Report of Jun. 11, 2015 for Taiwanese Patent Application No. 104113577, filed Dec. 15, 2011, 1 page and 1 page translation.
Translation of Office Action dated Oct. 26, 2015 in Japanese Patent Application No. 2015-079984, 6 pages.
Wang et al., "A Fully Integrated On-chip Electrochemical Microreactor for the Detection of Total Phosphorus in Freshwater", IEEE 18th International Conference on Solid-State Sensors, Actuators, and Microsystems, Jun. 21, 2015, pp. 1468-1471.

* cited by examiner

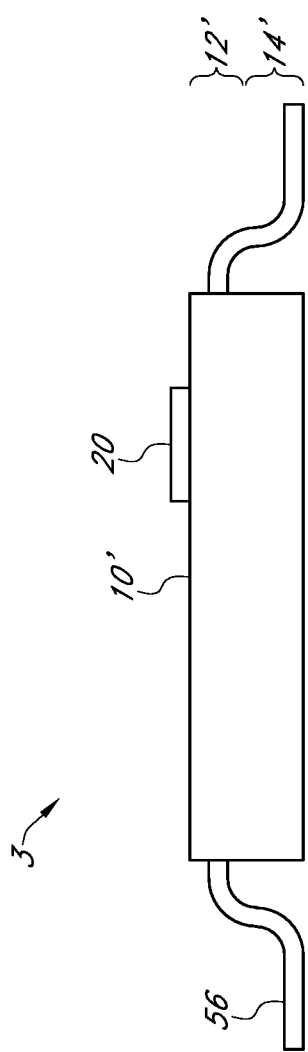

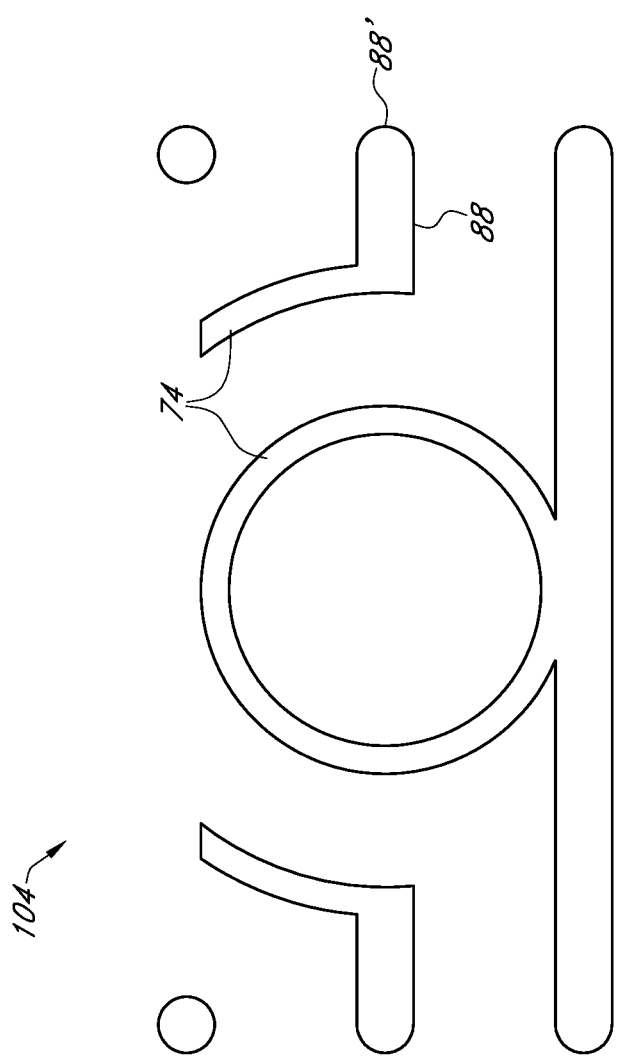

ELECTROCHEMICAL DEVICE

BACKGROUND

Field

The field relates to electrochemical devices, and, in particular, to gas sensor devices.

Description of the Related Art

Electrochemical devices can include electrochemical sensor devices. An electrochemical sensor device can observe chemical reactions by monitoring changes in electrical properties (e.g., voltage and current). The electrochemical sensor device can be a gas sensor device for detecting gases. The electrochemical sensor device can include an electrochemical solution or material and electrodes.

SUMMARY OF THE INVENTION

In one aspect, a gas sensor is disclosed. The gas sensor includes a housing that has an upper portion and a lower portion. The gas sensor also includes a chamber that is formed in the lower portion of the housing. The chamber is configured to receive an electrochemical solution. The gas sensor also includes a plurality of electrodes that are formed in the upper portion of the housing. The plurality of electrodes are molded in the upper portion of the housing and at least partially exposed to the chamber. The gas sensor further includes an access port that is formed in the upper portion. The access port is configured to provide fluid communication between the chamber and the outside environs.

In one embodiment, the gas sensor can also include a microcontroller packaged in the housing and electrically coupled to the plurality of electrodes.

In one embodiment, the housing includes polymer or plastic.

In one embodiment, at least one of the plurality of electrodes includes conductive non-metal materials filled with carbon fiber.

In one embodiment, the gas sensor further includes conductive arms extending horizontally from the plurality of electrodes. A thickness of the electrode can be greater than a thickness of the conductive arms. The plurality of electrodes can be in electrical communication with an interconnect structure that is formed in the housing. The interconnect structures can include the conductive arms and a plurality of interconnects that extend at least partially through the lower portion from a top side of the lower portion.

In one embodiment, the housing includes a fill port that is sealed. The electrochemical solution can be disposed in the chamber through the fill port.

In one embodiment, the access port includes a membrane that allows gas communication between the chamber and the outside environs while preventing liquid communication between the chamber and the outside environs.

In one embodiment, the lower portion of the housing further includes a cavity that is separate from the chamber. The cavity can be configured to receive an electrical component. The cavity can be configured to receive a plurality of electrical components.

In one embodiment, the plurality of electrodes include or more of carbon black, iridium black, platinum black, gold black, or ruthenium black.

In one aspect, a gas sensor is disclosed. The gas sensor includes a housing that has an upper portion and a lower portion. The upper portion can include a molded lead frame. The gas sensor also includes a chamber that is formed in the lower portion of the housing. The chamber is configured to receive an electrochemical solution. The gas sensor also includes a lead frame structure that is formed in the upper portion of the housing. The lead frame structure can include a plurality of electrodes. The plurality of electrodes are at least partially exposed to the chamber. The gas sensor further includes an access port that is formed in the upper portion. The access port can be configured to provide fluid communication between an interior of the housing and the outside environs.

In one embodiment, the housing includes polymer or plastic molded over the plurality of electrodes.

In one embodiment, the access port is configured to provide fluid communication between the chamber and the outside environs.

In one embodiment, the access port includes a membrane that allows gas communication between the interior of the housing and the outside environs while preventing liquid communication between the interior of the housing and the outside environs.

In one embodiment, the plurality of electrodes are in electrical communication with an interconnect structure formed in the lower portion of the housing. The interconnect structures can include a plurality of interconnects extending at least partially through the lower portion from a top side of the lower portion.

In one embodiment, the lower portion of the housing further includes a cavity that is separate from the chamber. The cavity can be configured to receive an electrical component. At least a portion of the upper portion of the housing can be covered with the catalytic material.

In one aspect, a method of manufacturing a gas sensor is disclosed. The method includes providing a first element. The method also includes providing a second element that has a plurality of electrodes and an access port. The method further includes coupling the first element and the second element to define a chamber between the first element and the second element with the plurality of electrodes being at least partially exposed to the chamber. The chamber is configured to receive and retain an electrochemical solution. The access port is configured to provide fluid communication between the chamber and the outside environs.

The method further includes fabricating the first element by way of a molded lead frame fabrication process.

The method further includes fabricating the second element by way of a molded lead frame fabrication process.

The method further includes providing a membrane to the access port, wherein the membrane allows gas communication between the chamber and the outside environs while preventing liquid communication between the chamber and the outside environs.

BRIEF DESCRIPTION OF THE DRAWINGS

Embodiments of this disclosure will now be described, by way of non-limiting example, with reference to the accompanying drawings.

FIG. 9D is a schematic side view of the device illustrated in FIGS. 9A and 9B.

FIG. 14A is a schematic top plan view of a lead frame structure for an electrochemical sensor according to one embodiment.

DETAILED DESCRIPTION

Figure 1A:
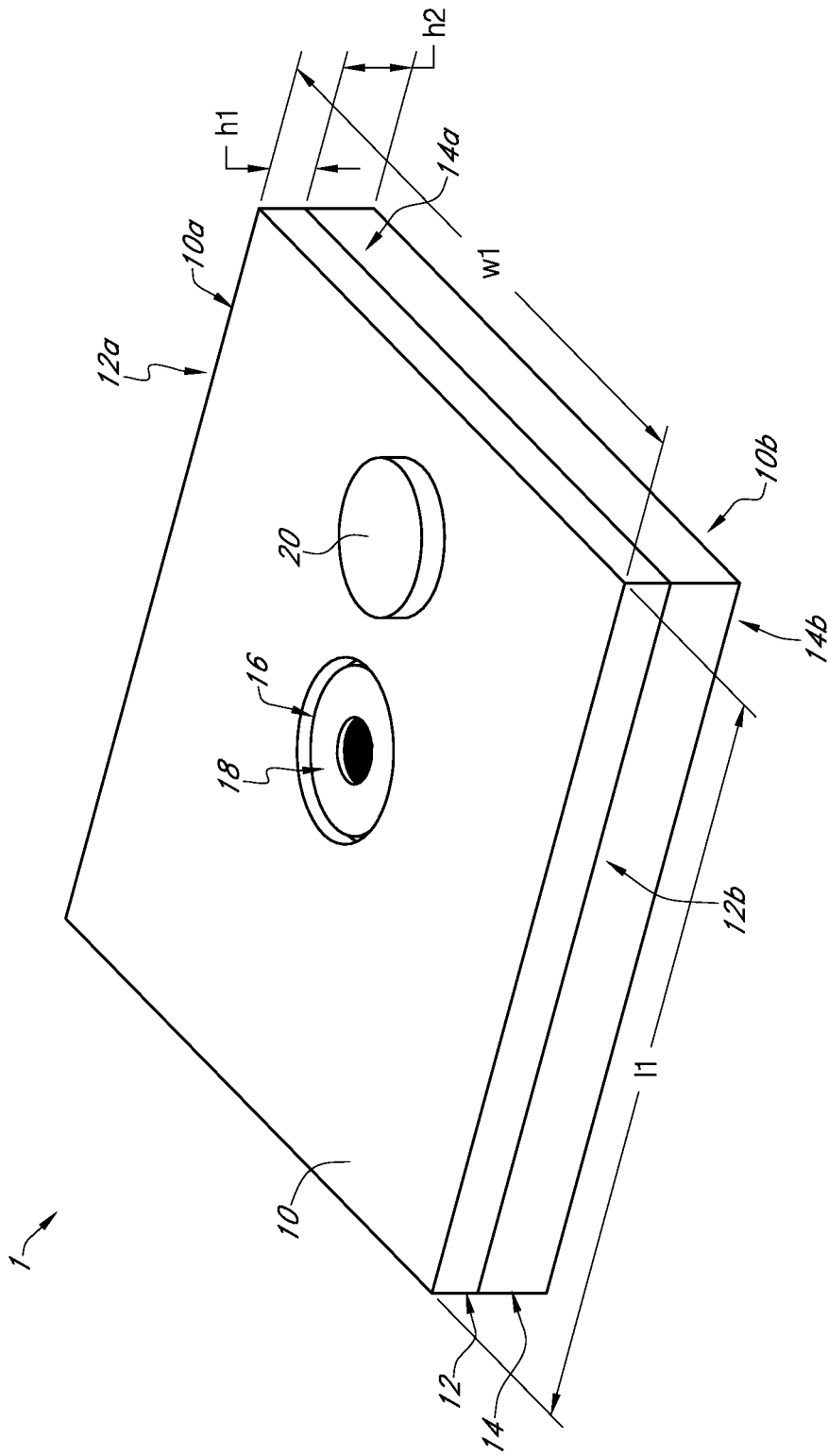
FIG. 1A is a schematic top perspective view of a device according to one embodiment.

Electrochemical devices disclosed herein may be used as sensors. For example, an electrochemical device disclosed herein can be a gas sensor. Electrochemical devices disclosed herein can be manufactured using, for example, compact packaging platforms, such as a lead frame package, a ball grid array (BGA) package, and a land grid array (LGA) package. The electrochemical device can be used in, for example, a mobile device.

An electrochemical device can include a chamber for receiving a liquid or wicking material. The chamber can receive, for example, an electrochemical material or solution (e.g., sulfuric acid). The electrochemical device can also include electrodes that are in contact with the electrochemical material. The electrodes can detect changes in electrical properties (e.g., voltage and current) of the electrochemical material due to an electrochemical material reaction. For example, the electrochemical material can react with gas. In some applications, the electrochemical device can be used to detect harmful gas (e.g., carbon monoxide) in an area.

In certain manufacturing processes, it can be difficult to manufacture relatively small electrochemical devices, and/or manufacture relatively small electrochemical devices with relatively low cost. Some electrochemical devices disclosed herein can include a housing that is at least partially defined by a molded lead frame. Such electrochemical devices with a molded lead frame can be manufactured using a relatively low cost manufacturing method, such as a molding process. Also, the molding process can be suitable for manufacturing relatively small electrochemical devices at much lower expense compared to other technologies for small electrochemical devices.

Various embodiments disclosed herein relate to an electrochemical device. In one aspect, an electrochemical device can include a housing that has an upper portion and a lower portion. The upper portion can be a first element and the lower portion can be a second element that is attached to the first element, in some embodiments. The electrochemical device can also include a chamber formed in the lower portion of the housing. The chamber can receive an electrochemical solution. In some embodiments, the electrochemical solution includes sulfuric acid, which advantageously has relatively high conductivity and water content for aiding electrochemical reactions. The electrochemical solution can react with molecules, such as gas molecules. The electrochemical solution can change its electrical properties (e.g., voltage or current) due to the reaction(s) with the molecules. In some embodiments, the electrochemical solution can react with the molecules indirectly via a catalyst. The electrochemical device can also include a plurality of electrodes formed in the upper portion of the housing. The plurality of electrodes can be exposed to the chamber. In some embodiments, the plurality of electrodes can include a sensing electrode, counter electrode, and/or a reference electrode. The plurality of electrodes can include a catalyst that react with the electrochemical solution and/or the target molecules. Oxidation and/or reduction reactions can occur at an interface between the catalyst and the electrochemical solution. The plurality of electrodes can detect or monitor the changes in electrical properties of the electrochemical solution. The monitored electrical properties can be analyzed and/or processed to determine the molecules that reacted with the electrochemical solution. The electrochemical device can further include an access port formed in the upper portion of the housing. The access port can provide fluid communication between the interior of the housing (e.g., the chamber) and the outside environs. Therefore, in some embodiments, the gas molecules can access the interior of the housing (e.g., the chamber or the electrode) through the access port.

Figure 1B:
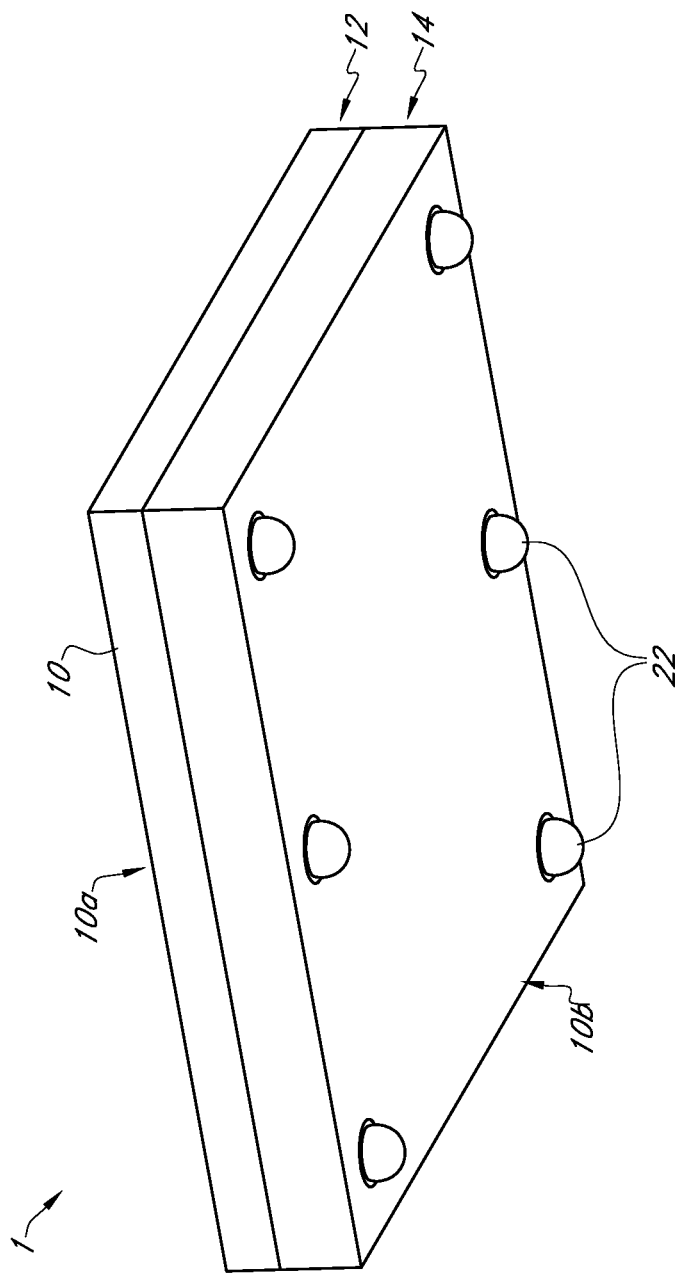
FIG. 1B is a schematic bottom perspective view of the device illustrated in FIG. 1A.

FIG. 1A is a schematic top perspective view of a device 1 according to one embodiment. FIG. 1B is a schematic bottom perspective view of the device 1 illustrated in FIG. 1A. For example, the device 1 can be used as an electrochemical device, such as a gas sensor. The device 1 can include a housing 10 that has an upper portion 12 and a lower portion 14. In the illustrated embodiment, the upper portion 12 and the lower portion 14 can be separate elements. For example, the upper portion 12 can be defined by a first element and the lower portion 14 can be defined by a second element that is coupled to the first element. In such embodiments, the upper portion 12 and the lower portion 14 can be bonded by an adhesive, and/or other bonding methods, such as ultrasonic bonding. The upper portion 12 and the lower portion 14 can be manufactured separately, in some embodiments.

The housing 10 can comprise any suitable material. In some embodiments, the housing 10 can comprise a molding material, such as plastic or polymer (e.g., liquid crystal polymer (LCP) or acrylonitrile butadiene styrene (ABS)). The housing 10 has a generally cuboid shape. However, the housing 10 can have any suitable shape. In some embodiments, the upper portion can comprise conductors integrated with the plastic, such as a molded metal lead frame, or a molded lead frame with conductive non-metal materials, such as conductive ABS, embedded in a non-conductive plastic mold.

The housing 10 of device 1 can have a length 11, a width w1, and a height (a height h1 of the upper portion 12 plus a height h2 of the lower portion 14). In some embodiments, the length 11 of the housing 10 can be in a range of, for example, 5 mm to 25 mm, in a range of, for example, 10 mm to 25 mm, in a range of, for example, 5 mm to 20 mm, or in a range of, for example, 10 mm to 20 mm. In some embodiments, the width w1 of the housing 10 can be in a range of, for example, 5 mm to 25 mm, in a range of, for example, 10 mm to 25 mm, in a range of, for example, 5 mm to 20 mm, or in a range of, for example, 10 mm to 20 mm. In some embodiments, the height h1 of the upper portion 12 can be in a range of, for example, 0.5 mm to 3 mm, in a range of, for example, 1 mm to 3 mm, in a range of, for example, 0.5 mm to 2 mm, or in a range of, for example, 1 mm to 2 mm. In some embodiments, the height h2 of the lower portion 14 can be in a range of, for example, 0.5 mm to 3 mm, in a range of, for example, 1 mm to 3 mm, in a range of, for example, 0.5 mm to 2 mm, or in a range of, for example, 1 mm to 2 mm.

The upper portion 12 of the housing 10 has a top side 12a and a bottom side 12b opposite the top side 12a. The lower portion 14 of the housing has a top side 14a and a bottom side 14b opposite the top side 14a. The bottom side 12b of the upper portion 12 and the top side 14a of the lower portion 14 can be coupled together. In some embodiments, the bottom side 12b of the upper portion 12 and the top side 14a of the lower portion 14 can be bonded by way of an adhesive, and/or other bonding methods, such as ultrasonic welding. In some embodiments, the top side 12a of the upper portion 12 can define a top side 10a of the housing 10. In some embodiments, the bottom side 14b of the lower portion 14 can define a bottom side 10b of the housing 10.

As illustrated in FIG. 1A, the device 1 can include an access port 16 formed in the upper portion 12 of the housing 10. In some embodiments, the device 1 can include more than one access port. The access port 16 can provide fluid communication between an interior of the device 1 and the outside environs. In some embodiments, a membrane 18 can be provided in the access port 16. In some applications, the membrane 18 can allow gas to pass through while preventing liquid from passing through, thus retaining electrolyte in the cavity, while allowing analyte gases to pass.

Figure 2A:
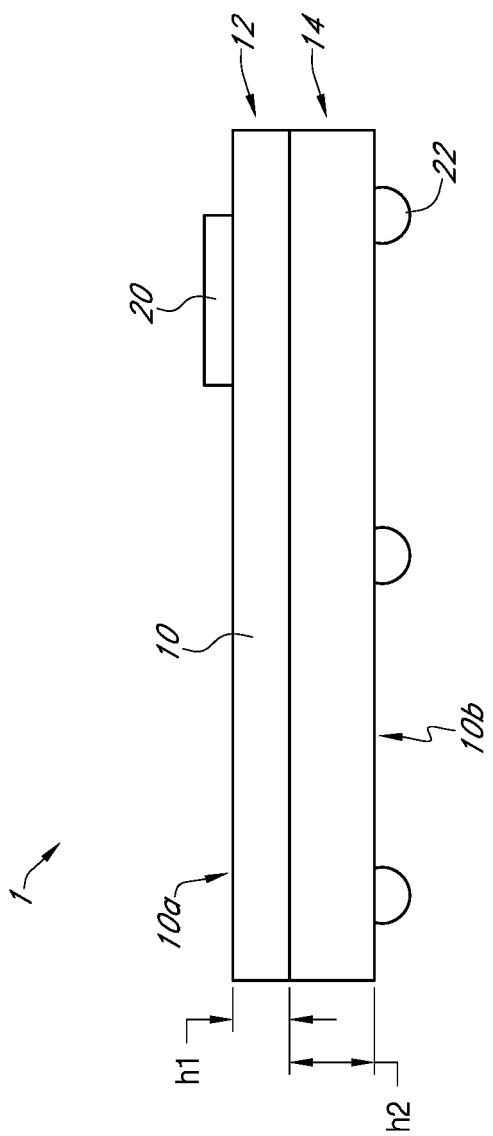
FIG. 2A is a schematic side view of the device illustrated in FIGS. 1A and 1B.
Figure 2B:
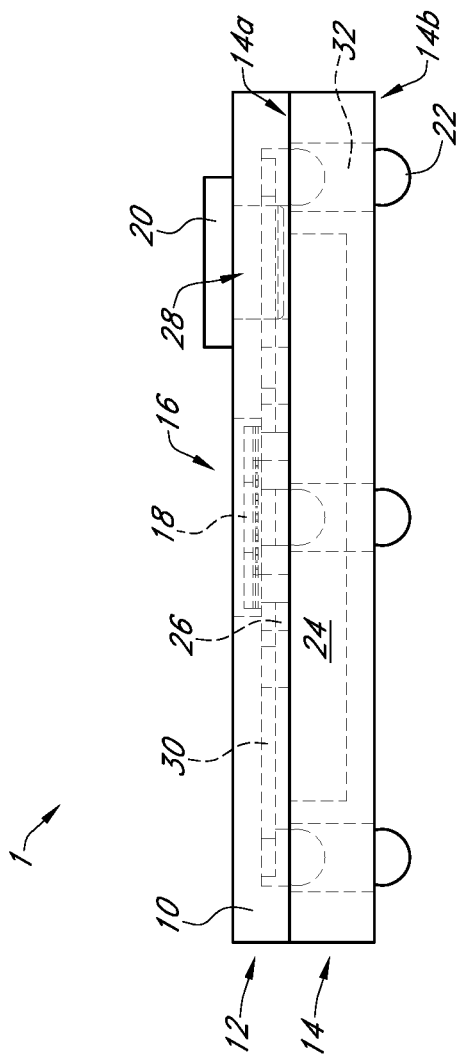
FIG. 2B is a schematic side view of the device illustrated in FIGS. 1A-2A with internal components of the device shown in dashed lines.

The device 1 can also include a plug 20 that seals a fill port 28 (see FIG. 2B). The plug 20 can be made of the same of a different material as the material of the housing 10. For example, the plug can comprise a molding material such as liquid crystal polymer (LCP) or acrylonitrile butadiene styrene (ABS). The fill port can be used for filling a filler material (e.g., an electrochemical solution) into a chamber defined in the device 1. The plug 20 can comprise epoxy or potting materials that are compatible or non-reactive with the electrochemical solution.

As illustrated in FIG. 1B, the device 1 can also include a plurality of leads 22 on the bottom side 10*b* of the housing 10. In some embodiments, the leads 22 can be configured to attach to a substrate (e.g., printed circuit board (PCB)), or another device, thereby connecting the device 1 with the substrate or the device. For example, the leads 22 can be formed of balls of solder material such that the bottom side 10*b* of the housing serves as a ball grid array (BGA) connection to lower elements of an electrical system, such as a circuit board.

FIG. 2A is a schematic side view of the device 1 illustrated in FIGS. 1A and 1B. The plug 20 can protrude relative to the top side 10*a* of the housing 10, in the device 1 illustrated in FIG. 2A. However, in some embodiments the plug 20 can be generally flush with the top side of 10*a* of the housing 10. The leads 22 can protrude relative to the bottom side 10*b* of the housing 10.

FIG. 2B is a schematic side view of the device 1 illustrated in FIGS. 1A-2A. As illustrated in FIG. 2B, the device 1 can include a chamber 24 that can be formed in the lower portion 14 of the housing 10. The device 1 can also include a plurality of electrodes 26 that can be formed in the upper portion 12 of the housing 10. Alternatively or in addition, the plurality of electrodes 26 can be formed in the lower portion 14 of the housing 10, in some embodiments. The plurality of electrodes 26 can be at least partially exposed to the chamber 24. In some embodiments, the electrodes 26 can include a sensing electrode, counter electrode, and/or a reference electrode, which are provided with separate interconnects to connect each sensor to an internal or external processor. In some embodiments, the electrodes can include a circle electrode and a half-moon electrode.

In some embodiments, the chamber 24 can receive a filler material (e.g., an electrochemical solution). The chamber 24 can be fully or partially filled with the electrochemical solution. The access port 16 can provide fluid communication between the chamber 24 and the outside environs. For example, gas (e.g., carbon monoxide) can enter the chamber 24 through the access port 16. In some embodiments, the access port 16 can allow gas transmission but prevent liquid transmission to keep the electrochemical solution within the device 1. The gas entering into the chamber 24 can react with the electrochemical solution disposed in the chamber 24. In some embodiments, the gas entering into the chamber 24 can react with the electrochemical solution disposed in the chamber 24 at a catalyst surface interface. The filler material can include a wicking material, which is typically a compressible material. The design of the interior surfaces of the housing can include features that compress the wicking material at the locations of the plurality of electrodes 26 (e.g., a surface of the catalyst of the electrodes), thereby ensuring wetting the plurality of electrodes 26 with the electrochemical solution. The wicking material can be applied to any of the electrodes disclosed herein.

In some embodiments, the electrochemical solution can be provided into the chamber 24 through a fill port 28 formed in the upper portion 12 of the housing 10. Alternatively or in addition, the fill port 28 can be formed in the lower portion 14 of the housing 10, in some embodiments. The fill port 28 can be sealed with the plug 20. In some embodiments, the plug 20 can comprise epoxy, potting materials, or tapes with an acid compatible adhesive that are compatible or non-reactive with the electrochemical solution, after the electrochemical solution has been provided into the chamber 24. In some embodiments, the electrochemical solution can be provided after the upper portion 12 and the lower portion 14 are bonded together to define the housing 10. Certain bonding processes apply heat with relatively high temperature for bonding. Therefore, in some embodiments, providing the electrochemical solution into the chamber 24 after bonding can prevent the electrochemical solution from being heated to a relatively high temperature during the bonding process.

As explained above, in some applications, the membrane 18 within the access port 16 can allow gas to pass through while preventing liquid from passing through. In some embodiments, the membrane 18 can prevent the electrochemical solution from leaking outside of the device 1. Therefore, the chamber 24 can be at least partially sealed by the membrane 18 from the outside environs while being fluidly communicative with the outside environ for gas sensing applications. The membrane 18 can comprise a commercially available gas-permeable and liquid impermeable membrane, such as those manufactured by W.L. Gore & Associates, Inc. (Newark, DE).

The plurality of electrodes 26 can be in contact with the electrochemical solution in the chamber 24. In some embodiments, the plurality of electrodes 26 can be used to monitor changes in electrical properties of the electrochemical solution due to chemical reactions. The observed changes in electrical properties of the electrochemical solution can be analyzed and/or processed to determine the molecules of the gas that enter the chamber 24.

In some embodiments, the plurality of electrodes 26 can comprise a metal lead frame (e.g., a copper lead frame), or a lead frame embedding conductive non-metallic materials, such as conductive ABS. In some embodiments, the plurality of electrodes 26 can be connected to an interconnect structure. The interconnect structure can include arms 30 that horizontally extend at least partially through the upper portion 12 of the housing 10. The interconnect structure can include vertical interconnects (e.g., solder plugs 32). The solder plugs 32 can extend at least partially through the lower portion 14 of the housing 10. In some embodiments, the solder plugs 32 can extend through the lower portion 14 of the housing from the top side 14*a* to the bottom side 14*b* of the lower portion 14. The leads 22 can be provided to the corresponding solder plugs 32. In some embodiments, the leads 22, such as BGA solder balls, can electrically and/or mechanically connect the solder plugs 32 to an external substrate (e.g., printed circuit board (PCB)) or another device.

Figure 3A:
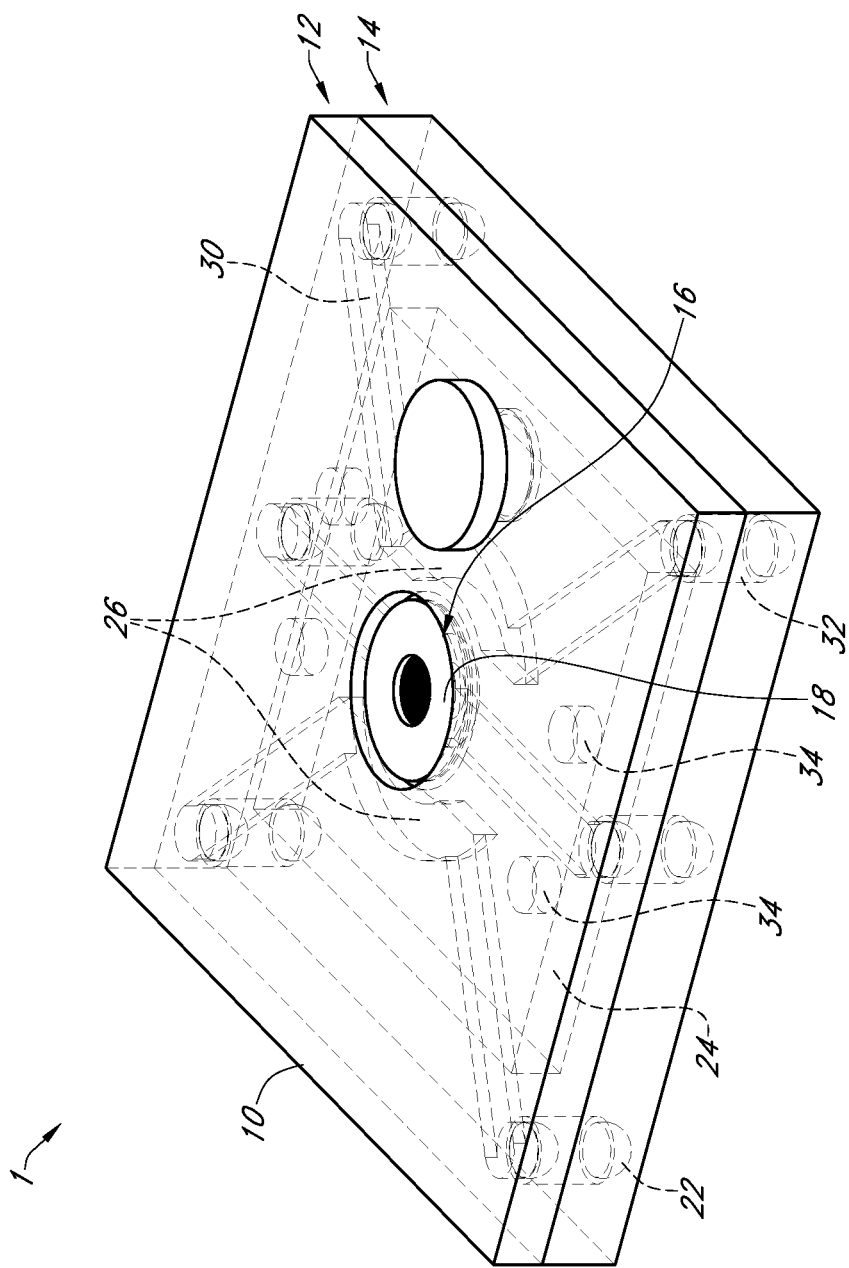
FIG. 3A is a schematic top perspective view of the device illustrated in FIGS. 1A-2B with internal components of the device shown in dashed lines.
Figure 3B:
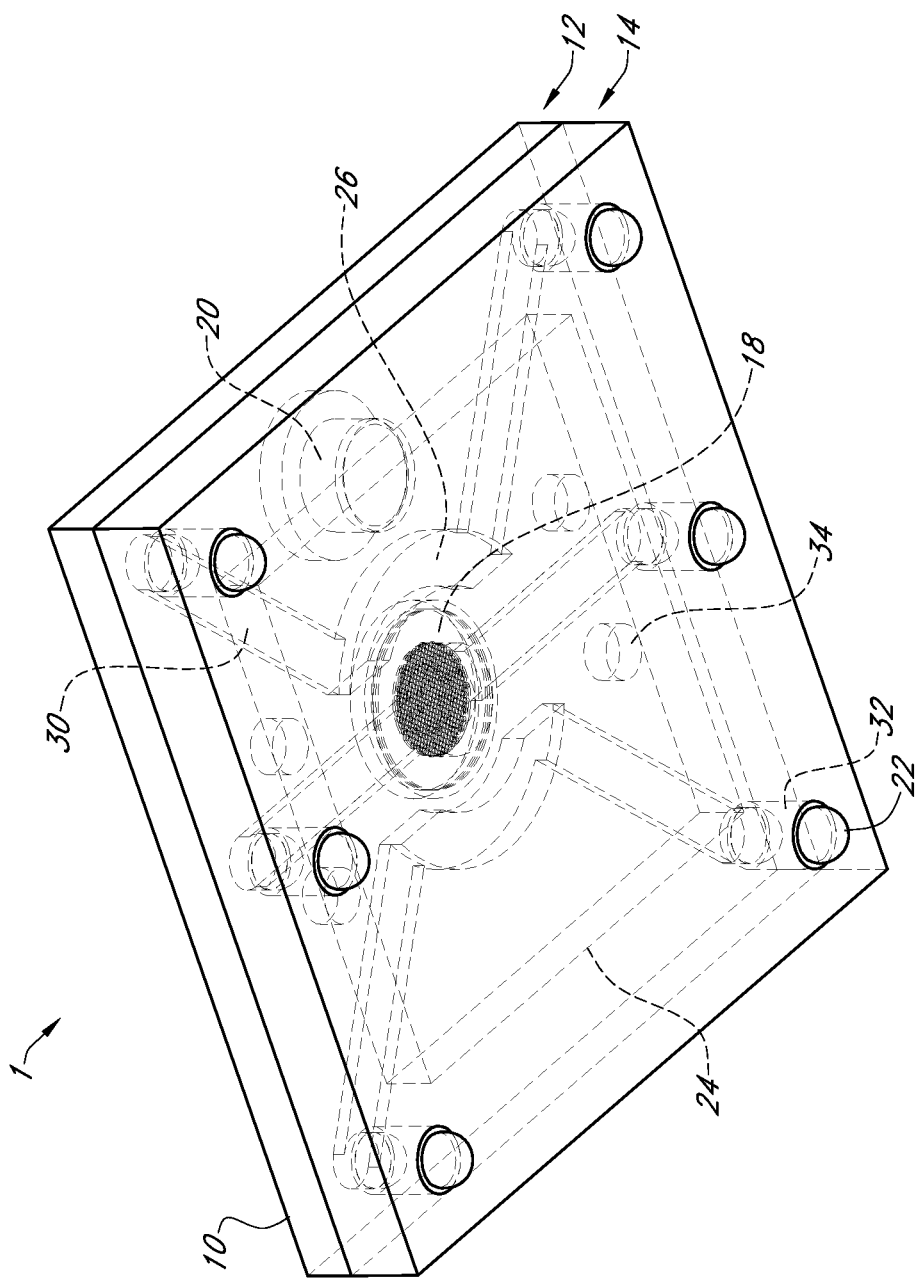
FIG. 3B is a schematic bottom perspective view of the device illustrated in FIGS. 1A-3A with internal components of the device shown in dashed lines.

FIG. 3A is a schematic top perspective view of the device 1 illustrated in FIGS. 1A-2B. FIG. 3B is a schematic bottom perspective view of the device 1 illustrated in FIGS. 1A-3A. The arms 30 that extend from the plurality of electrodes 26 can horizontally extend at least partially through the upper portion 12 of the housing 10 in various directions. For example, as illustrated in FIG. 3A, there can be three electrodes 26 and six arms 30 that extend outwardly from the three electrodes 26 to near edges of the housing 10 (e.g., between the chamber 24 and outer edges of the housing 10). As will be better understood from illustrations described below, for metal lead frame embodiments, the arms 30 can represent half-etched portions of a lead frame that are embedded in molding, whereas the electrode portions and contacts (arm ends 30a) to the vertical interconnects (solder plugs 32) can be thicker portions of the lead frame that are exposed by the mold material of the upper portion 12. In some embodiments where conductive non-metallic materials or conductively-filled plastics are used as the electrodes 26, the electrodes 26 and the housing 10 can be separately molded and bonded together, or double molded together (conductively-filled plastic can be first molded in the shape of the lead frame, and overmolded with an insulating plastic, or the insulating housing can be first molded and the conductive plastic interconnects and electrodes molded subsequently into voids in the housing). The conductive filler of the conductively-filled plastic can include, for example, carbon in the form of, for example, fibers or particles, or metal in the form of particles. The conductively-filled plastic can be applied to any of the electrodes disclosed herein in place of the metal of a conventional lead frame.

The device 1 can comprise a volume expansion feature 34. The volume expansion feature 34 can accommodate volume expansion of the electrochemical solution that is disposed in the chamber 24. For example, the electrochemical solution may expand when reacted with gas molecules. In some embodiments, the electrochemical solution can comprise a hygroscopic material and may change its volume due to change in, for example, humidity. For example, where the electrolyte comprises sulfuric acid, the volume may change with the ambient humidity. The expanded volume of the electrochemical solution can escape into the volume expansion feature 34 thereby mitigating the risk of, for example, excess pressure in the chamber, which might adversely affect the membrane 18 or plug 20. The volume expansion feature 34 can comprise a recess or cavity formed on the bottom side 12b of the upper portion 10. A size of the volume expansion feature 34 can be selected based at least in part on a difference between a volume of the electrochemical solution under maximum and minimum humidity conditions.

Figure 4A:
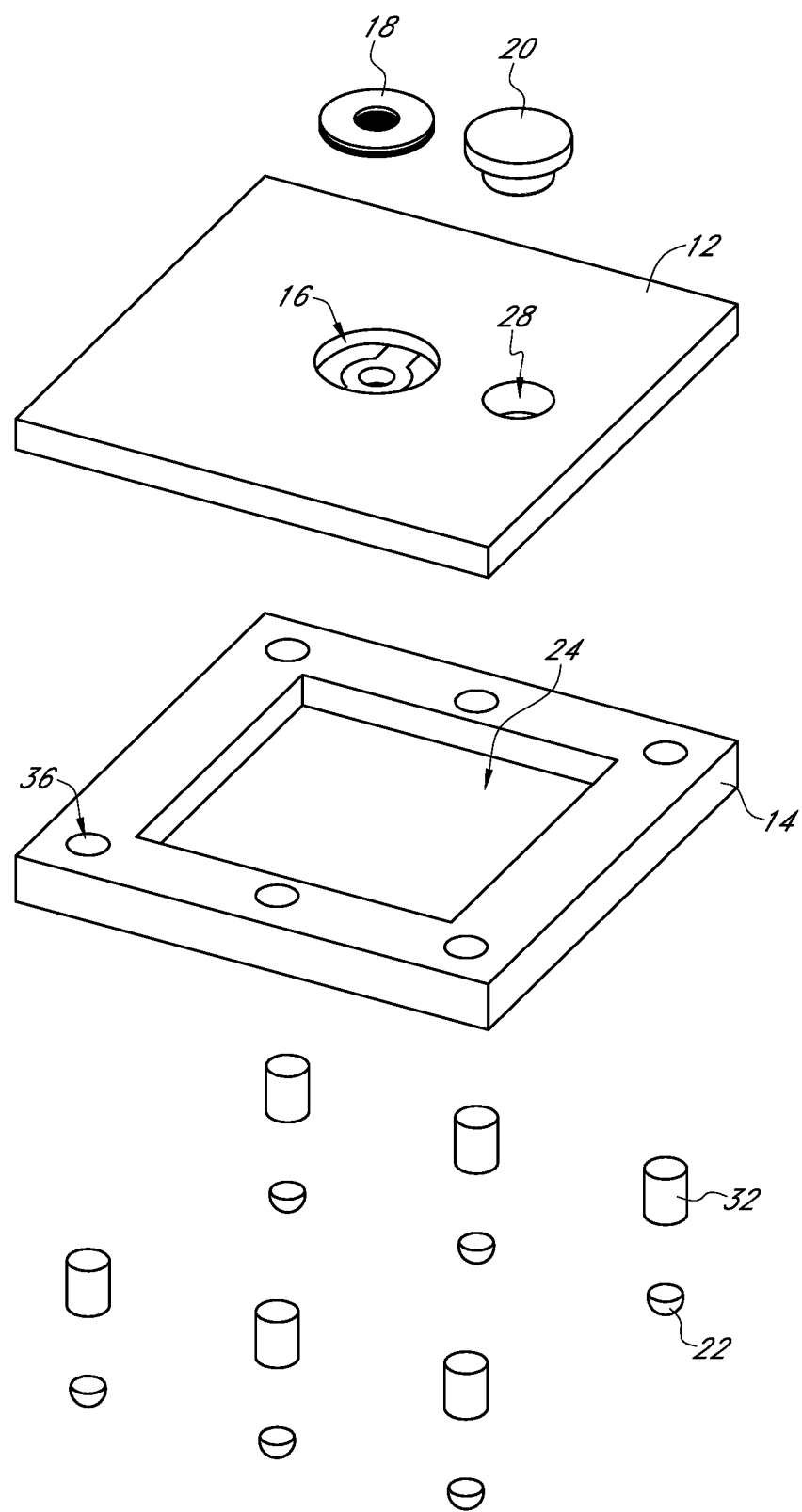
FIG. 4A is a schematic exploded view of the device illustrated in FIGS. 1A-3B as seen from a perspective view from above.
Figure 4B:
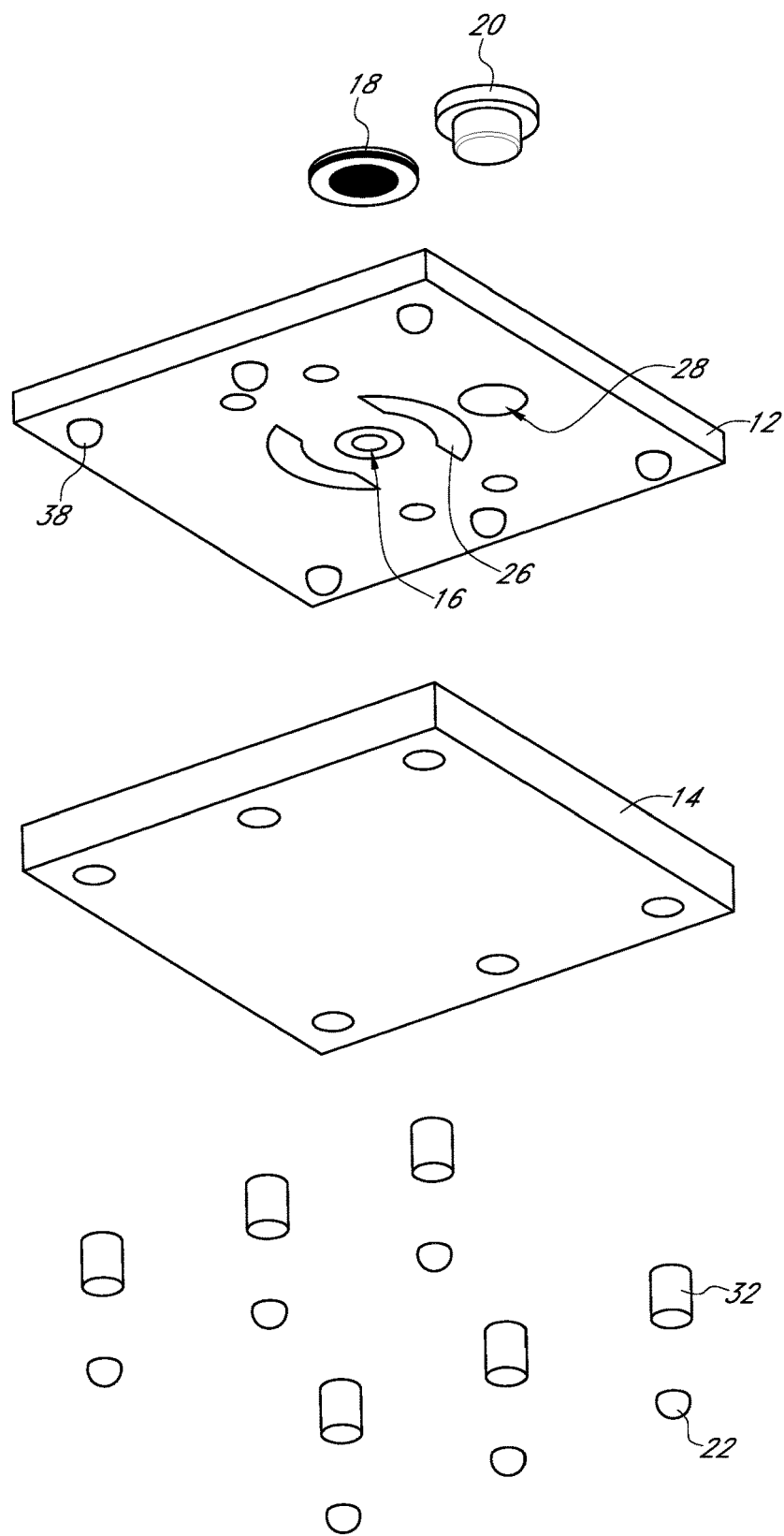
FIG. 4B is a schematic exploded view of the device illustrated in FIGS. 1A-4A as seen from a perspective view from below.

FIG. 4A is a schematic exploded view of the device 1 illustrated in FIGS. 1A-3B as seen from an angle. FIG. 4B is a schematic exploded view of the device 1 illustrated in FIGS. 1A-4A as seen from another angle. In some embodiments, the upper portion 12 and the lower portion 14 can comprise two separate elements. In such embodiments, the upper portion 12 and the lower portion 14 can be separately manufactured and bonded together to define the housing 10. In some embodiments, the upper portion 12 and the lower portion 14 can be bonded by way of an intervening adhesive, or some other methods, such as ultrasonic welding.

The chamber 24 can have any suitable shape. In some embodiments, the chamber 24 can include one or more protrusions to compress the wicking material (when the wicking material is used). The protrusion(s) can be located on the lower portion of the chamber, opposite the electrodes 26. By compressing the wicking material against the plurality of electrodes 26, an improved capillary/wicking action can be provided. This way, the electrode wetting can be more consistent than the chamber 24 without the protrusion, independently of the electrolyte state-of-health and device orientation.

The lower portion 14 can comprise a plurality of through holes 36 for the vertical interconnects (e.g., solder plugs 32). In some embodiments, the through holes 36 can be formed prior to providing the solder plugs 32. For example, the through holes 36 can be formed by way of drilling. In some embodiments, the through holes 36 can be formed as the lower portion 14 is formed. For example, the vertical interconnects can be first formed and then overmolded when the lower portion 14 is formed, similar to the embedded lead frame of the upper portion 12.

The upper portion 12 of the housing 10 can include connectors 38 (e.g., solder balls) on the bottom side 12b. The connectors 38 can be provided to corresponding ends of the arm 30 (see, for example, FIGS. 6B and 6C). The connectors 38 can electrically and/or mechanically connect with the vertical interconnects (solder plugs 32). In some embodiments, the connectors 38 can help bonding the upper portion 12 and the lower portion 14.

Figure 5A:
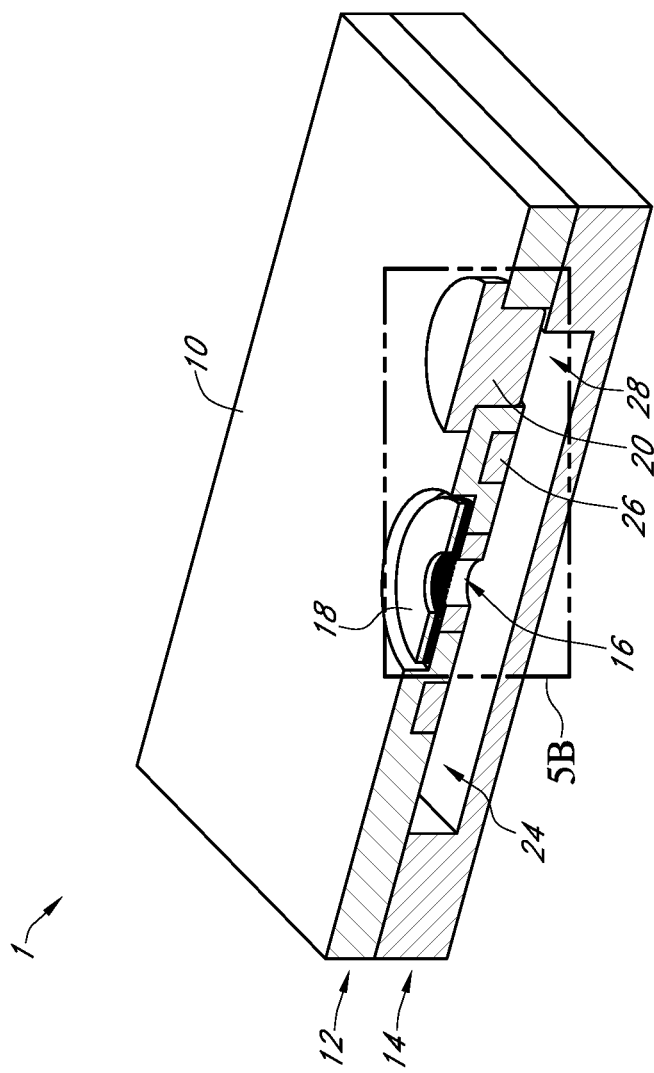
FIG. 5A is a schematic perspective cut-away view of the device of FIGS. 1A-4B.
Figure 5B:
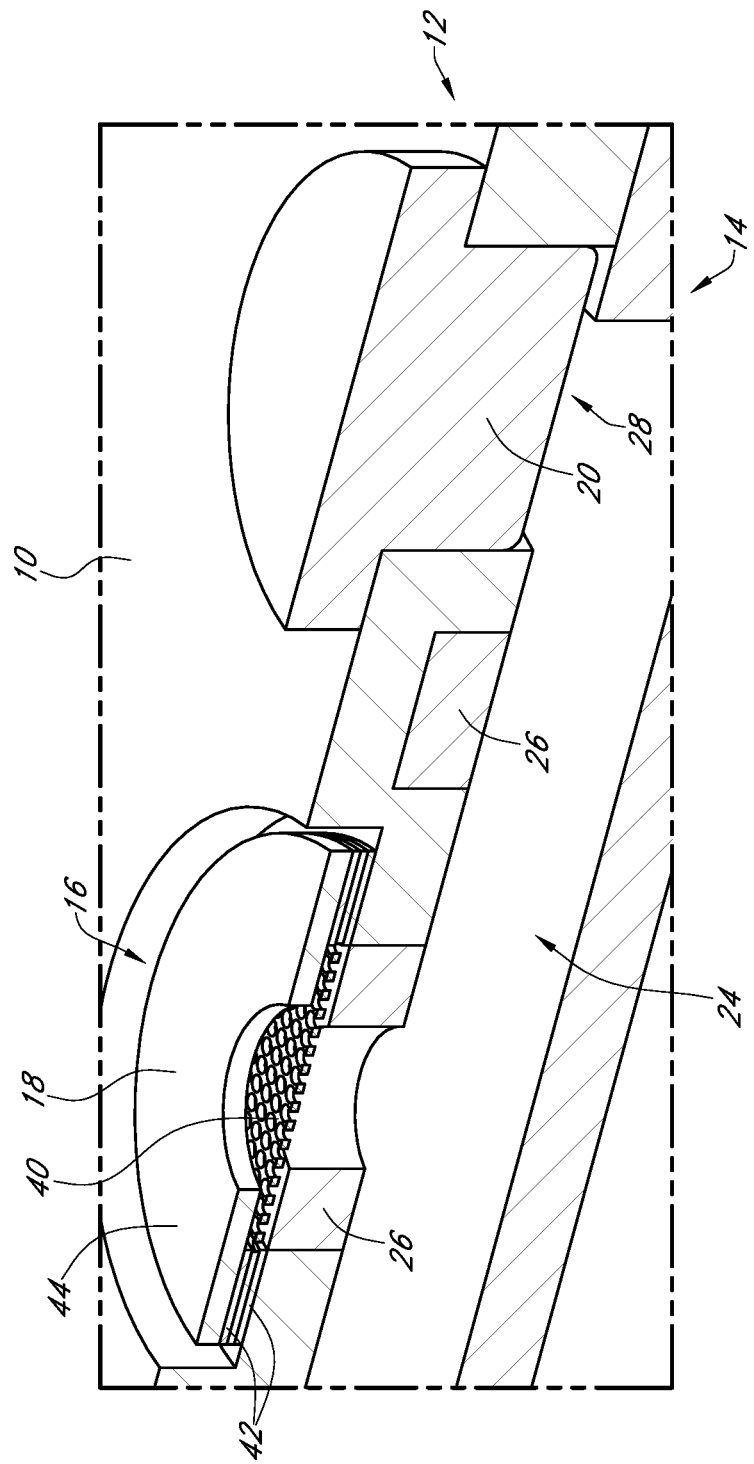
FIG. 5B is an enlarged view of a portion of FIG. 5A.

FIG. 5A is a schematic perspective cut-away view of the device 1. FIG. 5B is an enlarged view of a portion of FIG. 5A. The cross section of the device 1 shows the chamber 24 formed in the lower portion 14 of the housing 10, the electrodes 26 formed in the upper portion 12 of the housing 10, the filter 18 provided in the access port 16 formed in the upper portion 12, and the plug 20 that seals the fill port 28 formed in the upper portion 12.

As illustrated in FIGS. 5A and 5B, the electrodes 26 can be at least partially exposed to the chamber 24. At least a portion of the electrodes 26 that is not exposed to the chamber 24 can be embedded in the molding of the upper portion 12. The arms 30 shown in FIGS. 3A and 3B can be thinner than the electrodes 26 and thus embedded in the molding of the upper portion 12. In some embodiments, the electrodes 26 can be positioned near the access port 16. The electrodes 26 can be spaced apart by the molding material of the upper portion 12 of the housing 10. In some embodiments, the electrodes 26 can be generally flush with the bottom side 12b of the upper portion 12. In some embodiments, the electrodes 26 can protrude relative to the bottom side 12b of the upper portion 12, such that at least a portion of the electrodes 26 is disposed within the chamber 24. While not illustrated in FIGS. 4B-5B, it will be understood from the description below that a catalyst layer can coat the underside of the electrodes and can also coat portions of the underside of the insulating plastic of the upper portion 12.

In some embodiments, the membrane 18 can comprise a plurality of layers. For example, the membrane 18 can include a membrane body 40 (e.g., a polytetrafluoroethylene (PTFE) membrane), adhesive layers 42, and a protective layer 44. In some embodiments, a cross-interference filter (not illustrated for this embodiment) can also be located at the access port outside the membrane 18. One of the adhesive layers 42 can adhere the membrane 18 to the upper portion 12 of the housing 10. In some embodiments, as illustrated, the adhesive layer 42 can adhere the membrane 18 to the top side 12a of the upper portion 12. In some other embodiments, the adhesive layer 42 can adhere the membrane 18 to the bottom side 12b of the upper portion 12. The adhesive layer 42 can be strong enough to prevent leakage of the electrochemical solution provided in the chamber 24.

The plug 20 can seal the chamber from outside environs after disposing the electrochemical solution into the chamber 24. In some embodiments, an adhesive (not illustrated) can be provided between the plug 20 and the upper portion 12 of the housing 10. In some embodiments, the plug 20 can include an encapsulation (not illustrated) to mitigate a risk of leakage of the electrochemical solution. In some other embodiments, epoxy or potting materials that are not reactive with the electrochemical solution can be used to seal the chamber.

Figure 6A:
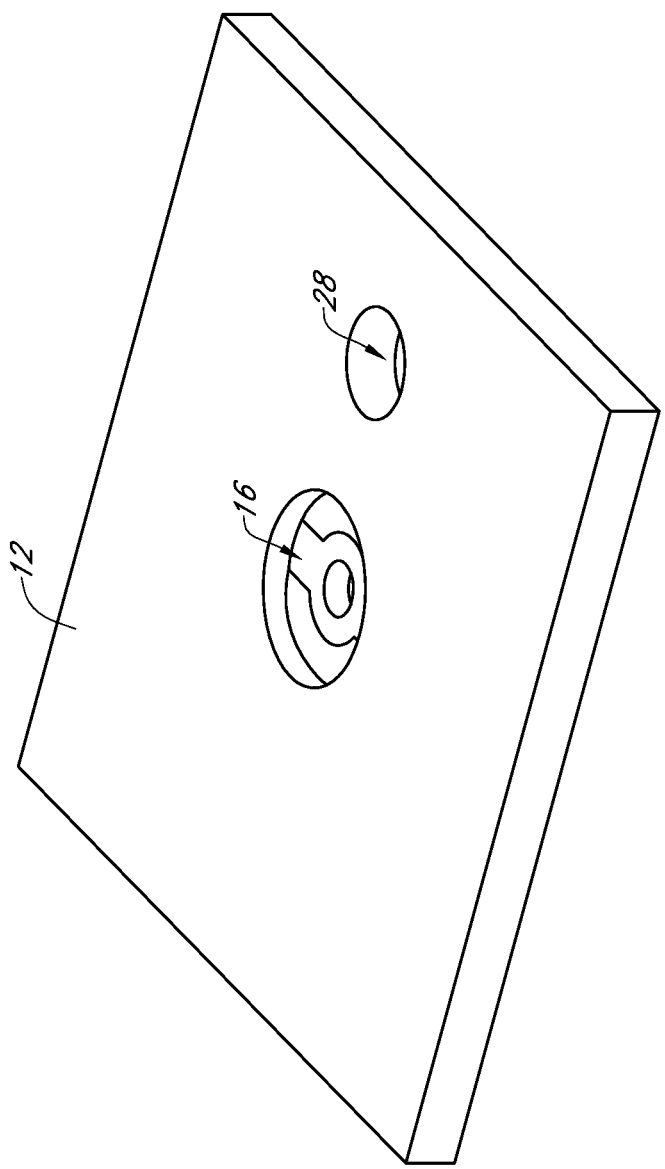
FIG. 6A is a schematic top perspective view of an upper portion of a housing.
Figure 6B:
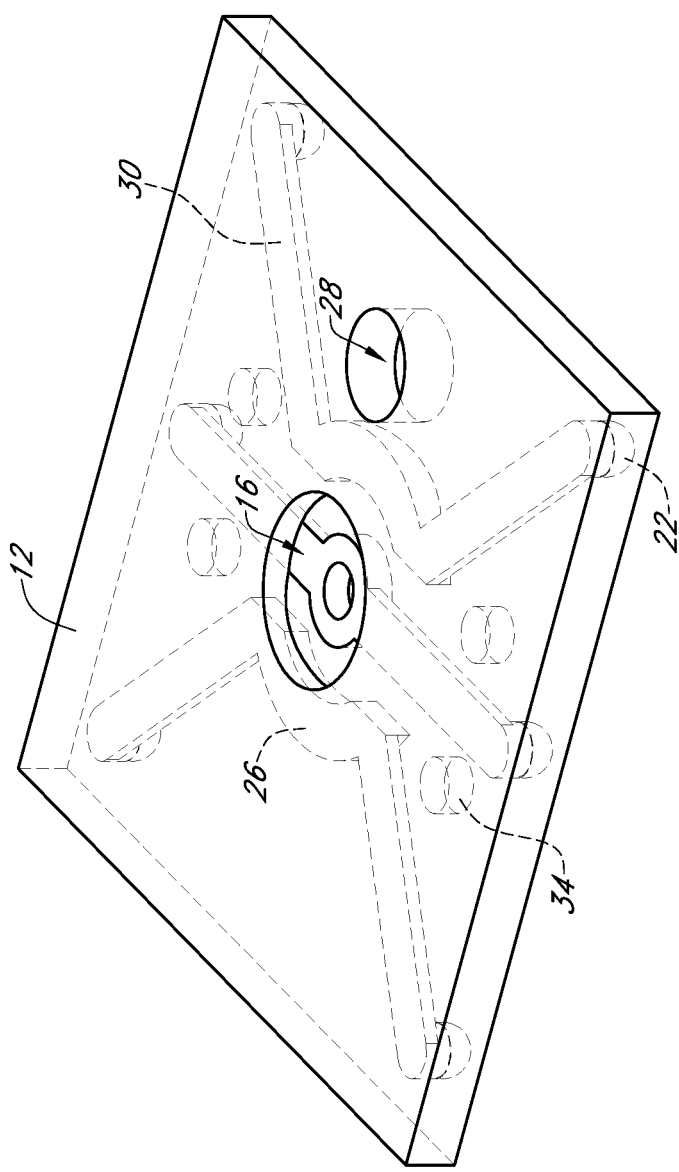
FIG. 6B is a view of the upper portion of FIG. 6A with components within the upper portion shown in dashed lines.

FIG. 6A is a schematic perspective view of the upper portion 12 of the housing 10 without the membrane 18 and the plug 20. The access port 16 (defined in part by a central working or sensing ring electrode embedded in plastic), the fill port 28, the plurality of electrodes 26, and the arms 30 can be formed in the upper portion 12. The electrodes 26 and the arms 30 can be at least partially embedded (e.g., molded) in the upper portion 12.

Figure 6C:
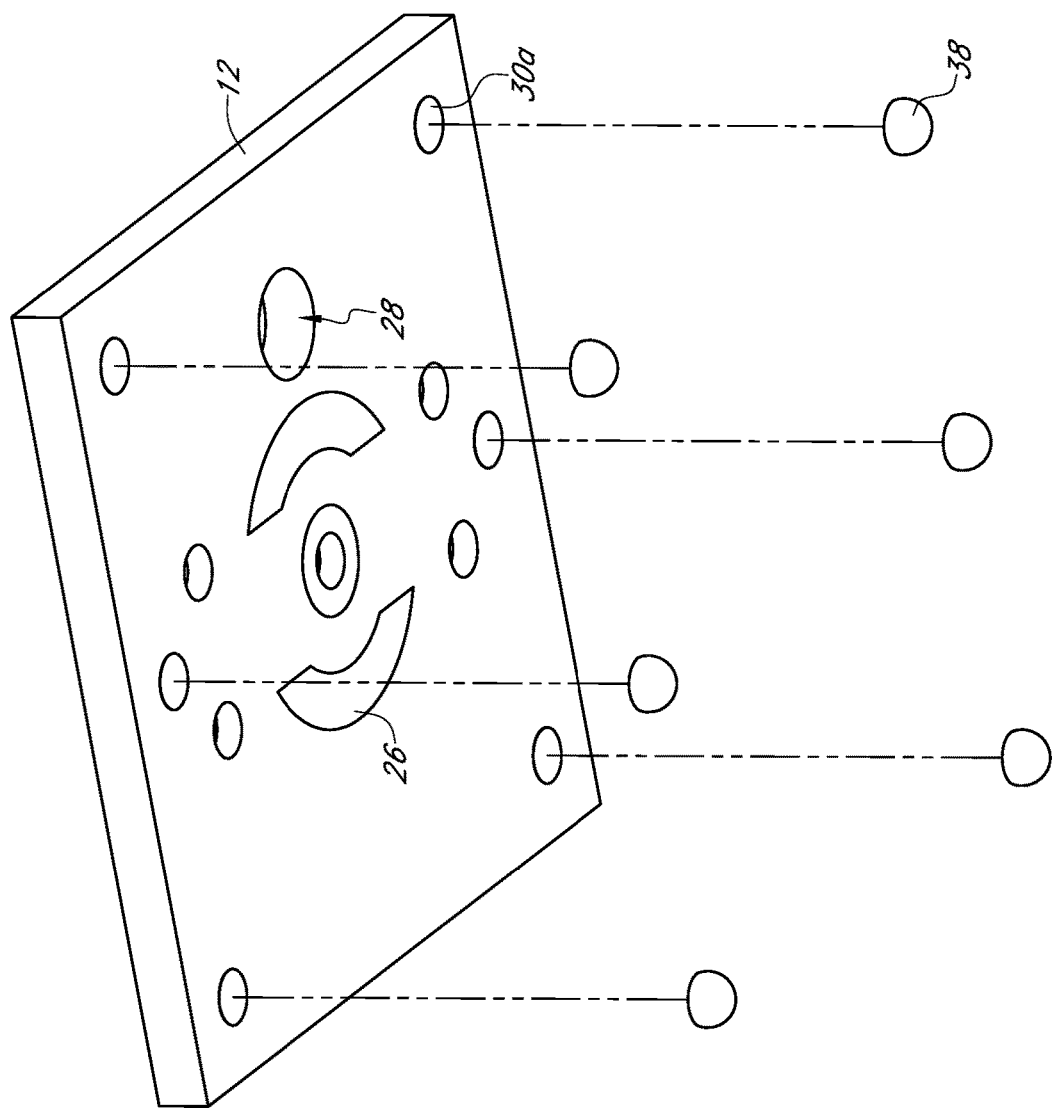
FIG. 6C is a schematic bottom, exploded perspective view of the upper portion of FIG. 6A with solder balls separated from the upper portion.

FIG. 6C is a schematic perspective view of the upper portion 12 and the connectors 38 (e.g. solder balls). The connectors 38 can be provided to corresponding ends 30a of the arms 30 shown in FIG. 6C. In some embodiments, the ends 30a of the arms 30 and/or the electrodes 26 can be coated with a protective layer (e.g., a gold layer). The gold layer can help prevent the base material of lead frame that forms the arm and the electrodes from oxidation. In some embodiments, a coating material can comprise catalyst. In some embodiments, the electrodes 26 can be aluminum or copper base material coated with a catalytic material such as carbon black, iridium black, a platinum black gold black, and/or ruthenium black. The catalytic material can enhance the performance of the electrode 26, in some applications. In some embodiments, different coating material(s) can be selected based at least in part on the gas(es) interested to be sensed. The coating material can be coated on the electrodes 26 in any suitable manner. For example, a coating material (e.g., platinum black) can be coated on the electrodes 26 by way of screen printing or stencil printing. In such processes, the coating material can be applied as an ink and can be applied over both the undersides of the electrodes and the insulating plastic of the upper part 18 after assembly of the upper part (including placement of the membrane 138 illustrated below). The ink can include hydrophobic particles, such as polytetrafluoroethylene (PTFE) or the line materials. The catalytic layer is illustrated below as the lowest layer of the electrodes exposed to the cavity, for example, in FIGS. 11A and 13B, among others. The Catalyst layer can be applied in any of the embodiments disclosed herein. Though the catalyst material is not illustrated with the plurality of electrodes 26 in FIGS. 1A-9E, the catalyst material can be provided for the electrodes 26 as illustrated and described in various embodiments disclosed herein. The catalyst material can be coated onto the inner surface of the housing in illustrated embodiments, including FIGS. 1A-9E, after assembly of the upper portion of the housing, including the membrane and the filter (if present). The timing of the coating is such that the catalytic material individually coats each electrically separate electrode along with surrounding portions of insulating mold material. In the case of the working or sensing electrode, the catalytic coating can also cover and contact the membrane, ensuring contact of the analyte gas with the catalytic coating that serves as the working electrode.

Figure 7A:
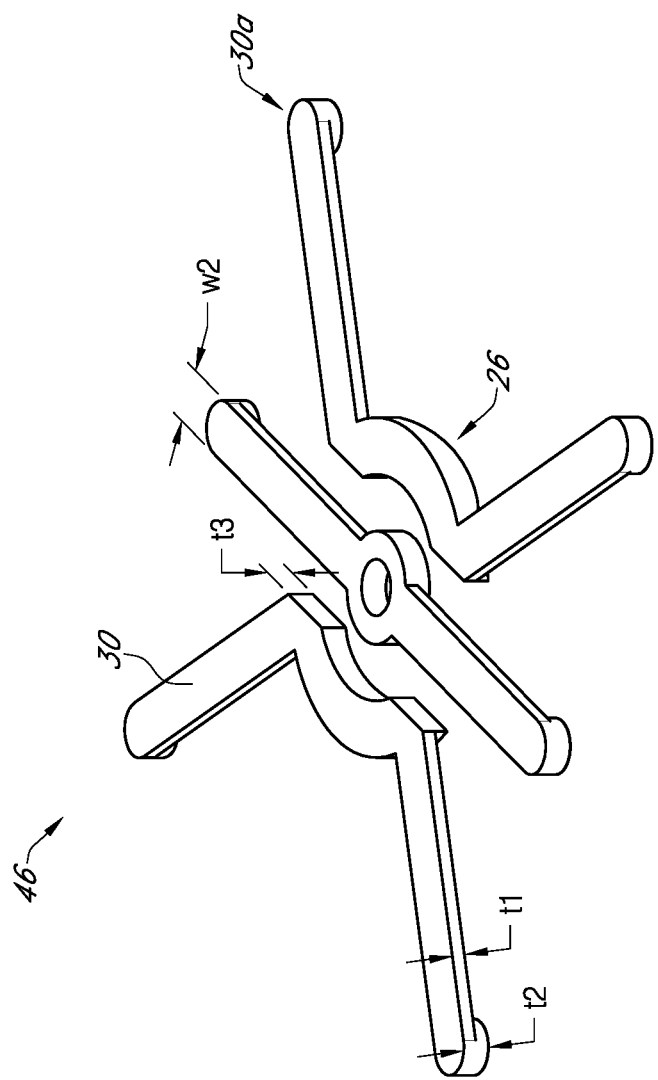
FIG. 7A is a schematic top perspective view of a lead frame that includes electrodes and arms for use within the housing of FIGS. 1A-6C, according to one embodiment.
Figure 7B:
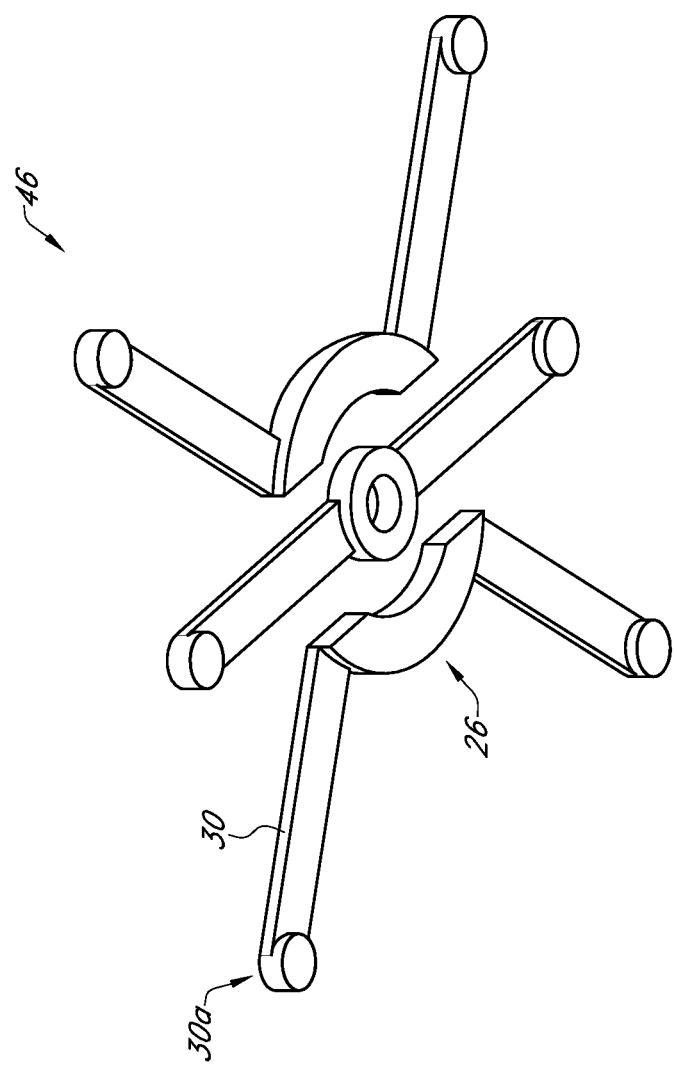
FIG. 7B is a schematic bottom perspective view of the lead frame illustrated in FIG. 7A.

FIG. 7A is a schematic top perspective view of a lead frame 46 that includes the electrodes 26 and arms 30, according to one embodiment. In some embodiments, the lead frame 46 can comprise a copper lead frame. In some embodiments, the lead frame 46 can comprise a conductive plastic lead frame. The conductive plastic lead frame can include a lead frame that comprises plastic (e.g., liquid crystal polymer (LCP) or acrylonitrile butadiene styrene (ABS)) and carbon fiber. In some embodiments, the carbon fiber or other conductive filler material can be mixed, embedded, or otherwise integrated with the plastic. FIG. 7B is a schematic bottom perspective view of the lead frame 46 illustrated in FIG. 7A. The lead frame 46 can be at least partially embedded (e.g., molded) in the upper portion 12 of the housing 10. In some embodiments, the electrode 26 can have a curvature. For example, the electrode 26 can have a round shape, a half-moon shape, and/or a circular shape. In some embodiments, a curved electrode can provide a shorter path through the electrolyte between electrodes (a first electrode and a second electrode) than with an electrode without curvature. When the path between the electrodes is shorter, there can be less resistance than with a longer path between the electrodes, thereby enhancing the accuracy of measurement of changes on electrical properties in the device.

The arms 30 of the lead frame 46 have a width w2. In some embodiments, the width w2 can be in a range of, for example, 0.5 mm to 5 mm, in a range of, for example, 0.5 mm to 3 mm, or in a range of, for example, 0.8 mm to 1.2 mm. The arms 30 of the leadframe 46 have a thickness t1 between the electrodes 26 and the ends 30a of the arms 30. The ends 30a of the arms 30 have a thickness t2. The electrodes 26 of the lead frame 46 have a thickness t3. In some embodiments, the thickness t1 of the arms 30 can be less than the thickness t2 of the ends 30a and/or the thickness t3 of the electrodes 26. Such an arrangement can be achieved by half-etching the arms 30 during lead frame fabrication so that they may be embedded during molding in polymer, such as LCP or ABS. In some embodiments, the thickness t1 of the arms 30 can be less than seventy percent (70%), between twenty percent (20%) to seventy percent (70%), or between forty percent (40%) to sixty percent (60%), of the thickness t2 of the ends 30a and/or the thickness t3 of the electrodes 26. For example, the thickness t1 of the arms 30 can be about fifty percent (50%). In some embodiments, the thickness t1 of the arms 30 can be in a range of, for example, 0.1 mm to 0.5 mm, in a range of, for example, 0.2 mm to 0.5 mm, or in a range of, for example, 0.1 mm to 0.3 mm. In some embodiments, the thickness t2 of the ends 30a of the arms 30 can be in a range of, for example, 0.1 mm to 1 mm, in a range of, for example, 0.2 mm to 0.5 mm, or in a range of, for example, 0.3 mm to 0.7 mm. In some embodiments, the thickness t3 of the electrodes 26 can be in a range of, for example, 0.1 mm to 1 mm, in a range of, for example, 0.2 mm to 0.5 mm, or in a range of, for example, 0.3 mm to 0.7 mm. As noted above, the electrodes 26 also include a catalytic layer (not shown in FIG. 7B), such that the thicker portions of the lead frame 46 shown in FIGS. 7A and 7B may be viewed as contacts for catalytic electrodes.

Figure 8A:
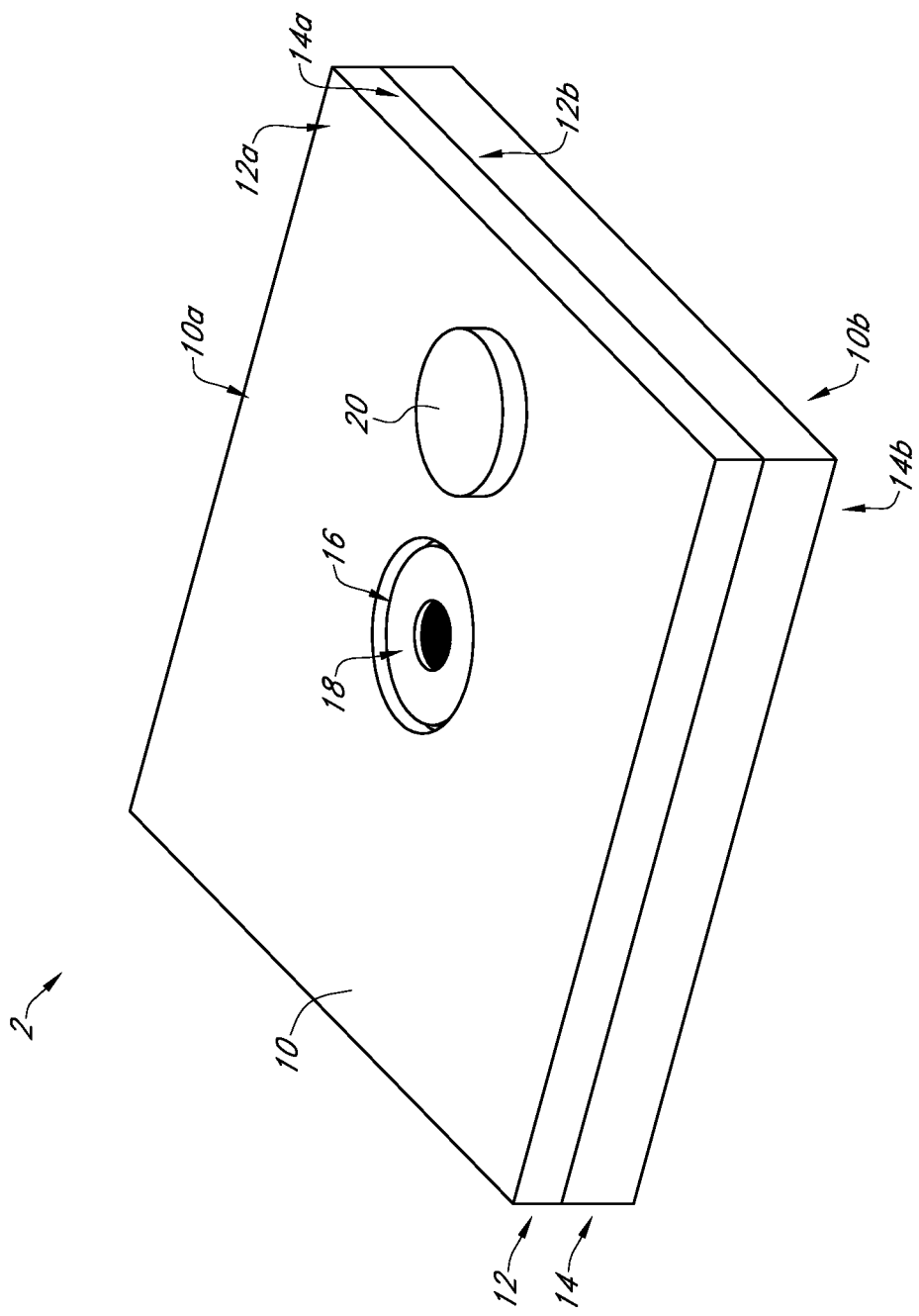
FIG. 8A is a schematic top perspective view of a device according to another embodiment.
Figure 8B:
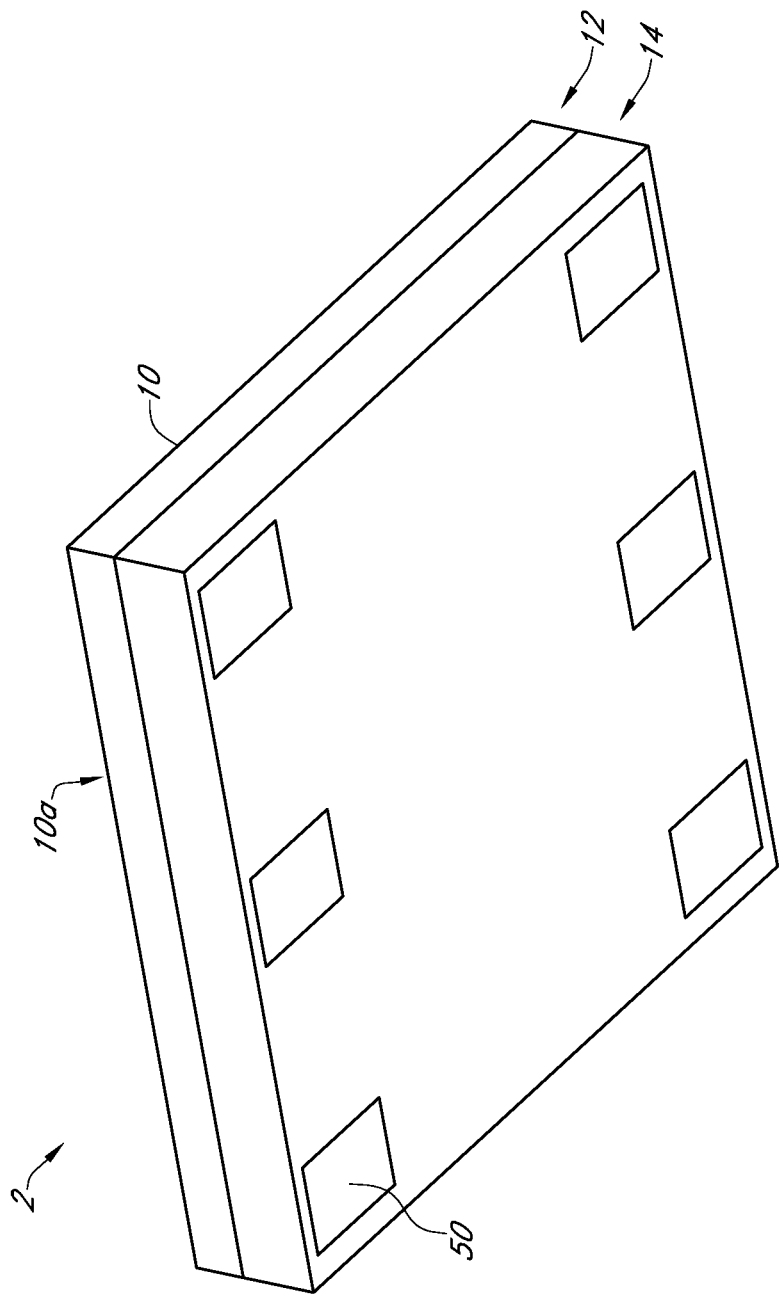
FIG. 8B is a schematic bottom perspective view of the device illustrated in FIG. 8A.
Figure 8C:
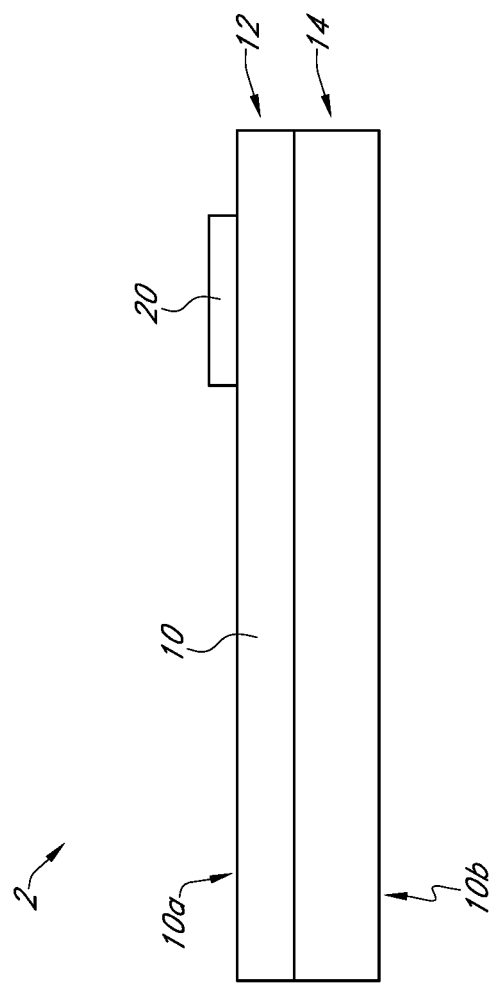
FIG. 8C is a schematic side view of the device illustrated in FIGS. 8A and 8B.
Figure 8D:
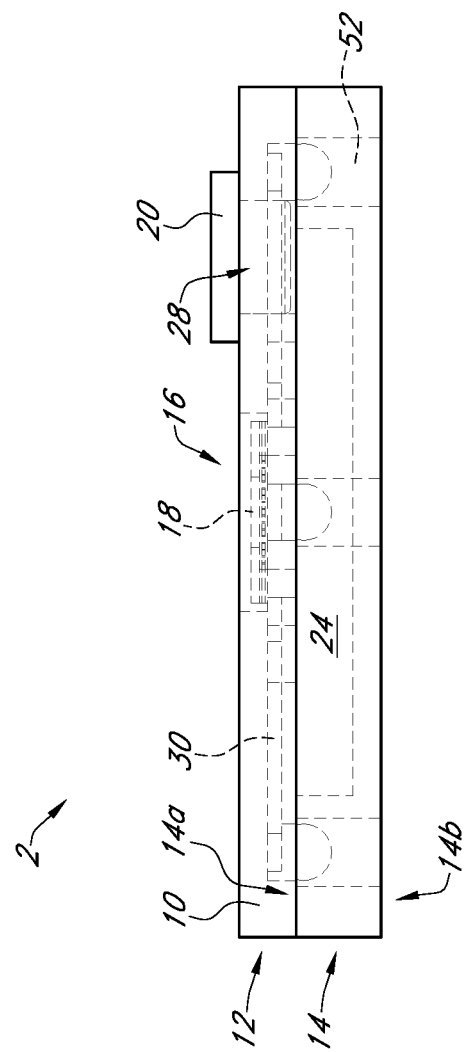
FIG. 8D is a schematic side view of the device with internal components of the device shown in dashed lines.

FIG. 8A is a schematic top perspective view of a device 2 according to one embodiment. FIG. 8B is a schematic bottom perspective view of the device 2 illustrated in FIG. 8A. FIG. 8C is a schematic side view of the device 2 illustrated in FIGS. 8A and 8B. Unless otherwise noted, components of the device 2 may refer to components that are the same as or generally similar to like components of the device 1. The device 2 is generally similar to the device 1. Instead of having a BGA structure of device 1, the device 2 has a land grid array (LGA) structure. In other words, instead of having the BGA balls as the leads 22 on the bottom side 10b of the housing 10, the device 2 comprises a plurality of LGA pads 50 that are exposed on the bottom side 10b of the housing 10.

The device 2 can include a housing 10 that has an upper portion 12 and a lower portion 14, an access port 16 formed in the upper portion 12 of the housing 10, a chamber 24 formed in the lower portion 14 of the housing 10, and a plurality of electrodes 26 formed in the upper portion 12 of the housing 10. The device 2 can also include a membrane 18 in a topside recess surrounding the access port 16. The device can also include a plug 20 that can seal a fill port 28. The plug 20 can protrude relative to the top side 10a of the housing 10. However, in some embodiments the plug 20 can be generally flush with the top side of 10a of the housing 10. Alternatively, the plug can comprise epoxy or potting materials that are compatible or non-reactive with the electrochemical solution. The bottom side 10b of the housing 10 can be generally planar.

Interconnects 52 can be formed in the lower portion 14 of the housing 10. In some embodiments, the interconnects 52 can extend through the lower portion 14 of the housing 10 from the top side 14a to the bottom side 14b of the lower portion 14. The exposed portion of the interconnects 52 on the bottom side 14b of the lower portion 14 can define the LGA pads 50. In some embodiments, the LGA pads 50 can be coated with a protective layer (e.g., a gold layer). The embodiment of FIGS. 8A-8B can be otherwise similar to the embodiment of FIGS. 1A-7B.

Figure 9A:
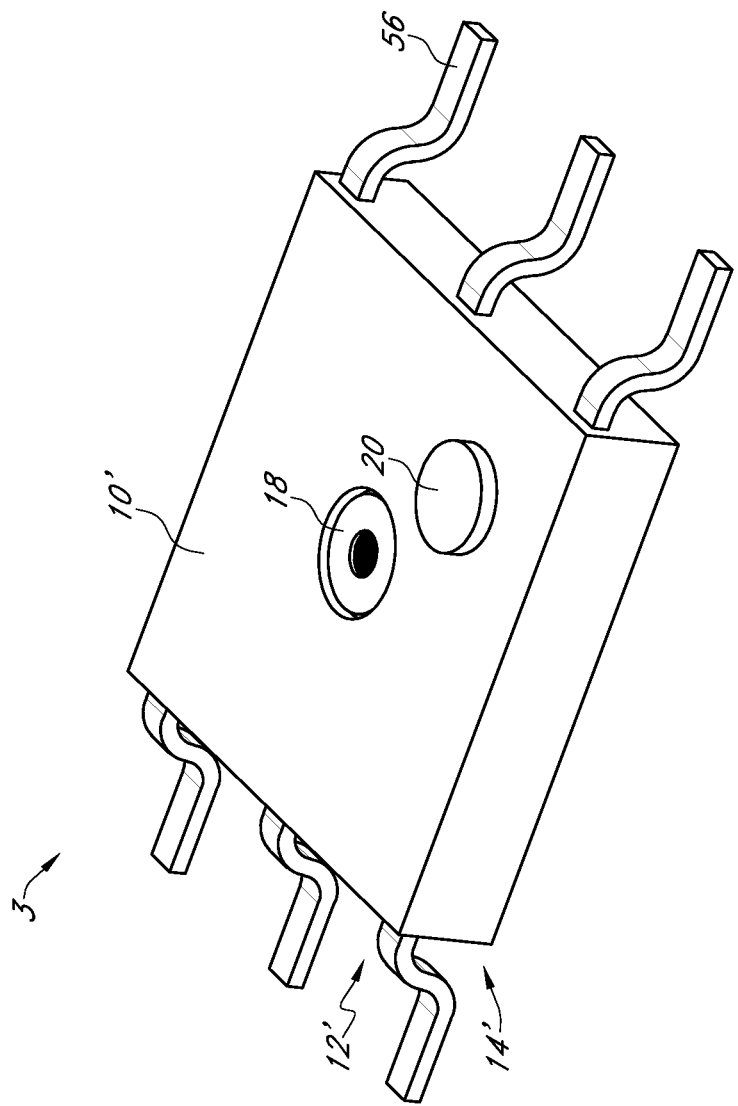
FIG. 9A is a schematic top perspective view of a device according to another embodiment.
Figure 9B:
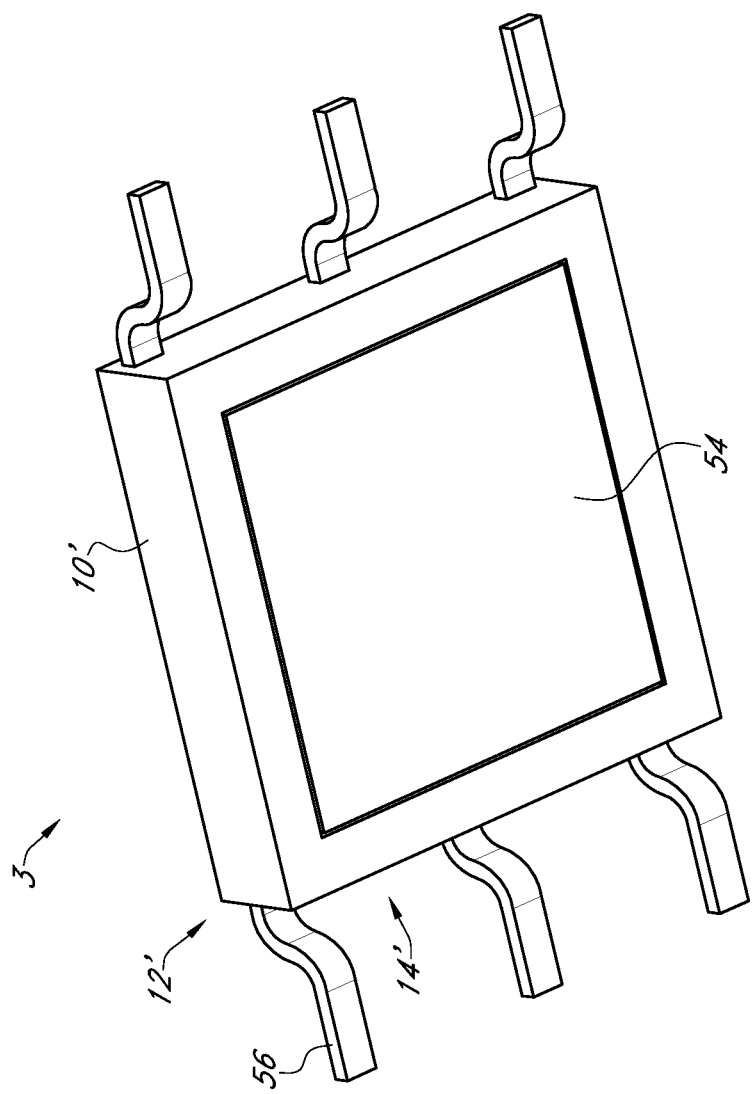
FIG. 9B is a schematic bottom perspective view of the device illustrated in FIG. 9A.
Figure 9C:
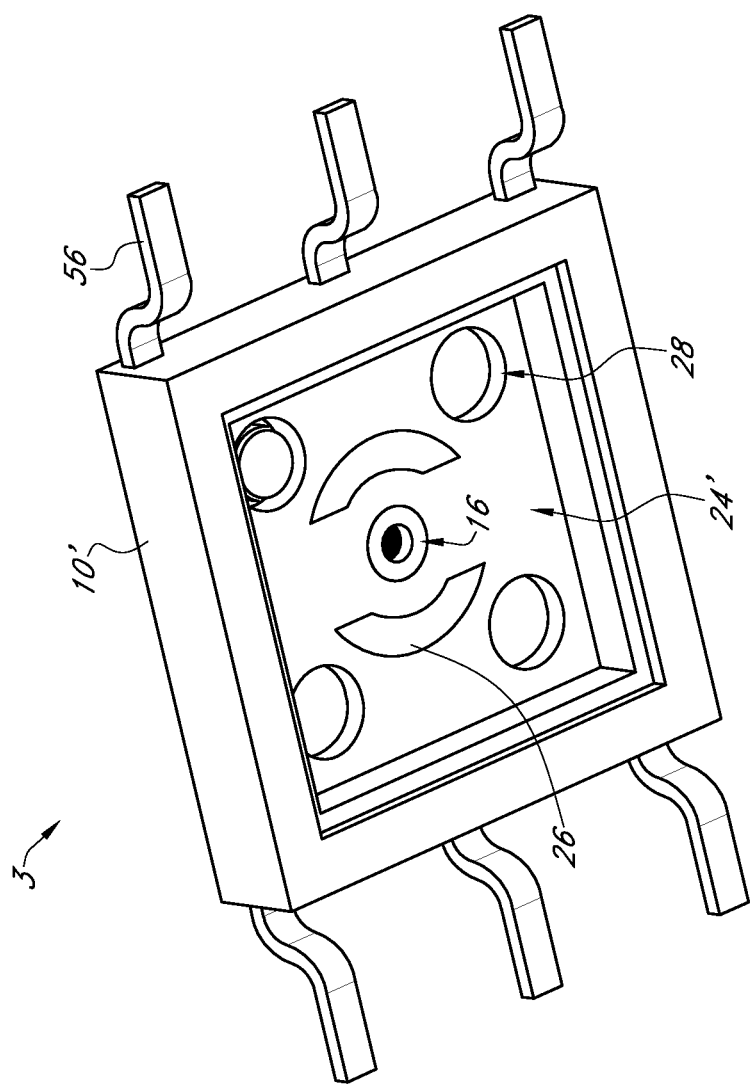
FIG. 9C is a schematic bottom perspective view of the device illustrated in FIGS. 9A and 9B with a lower seal plate omitted.
Figure 9E:
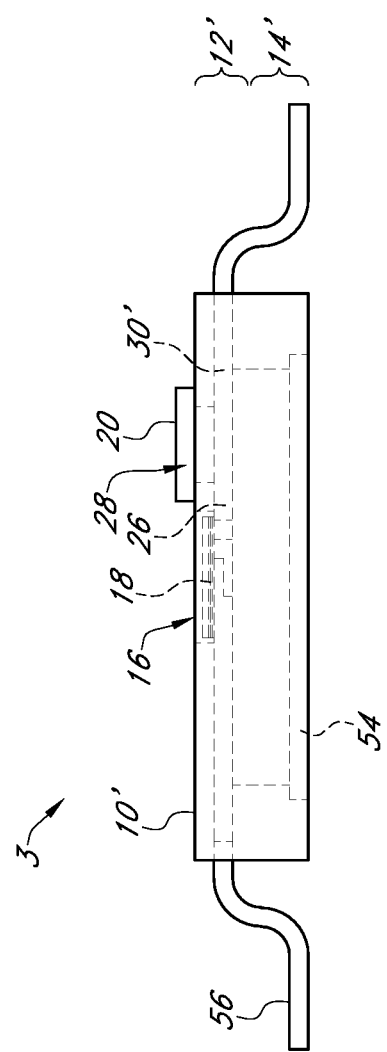
FIG. 9E is a schematic side view of the device with internal components of the device shown in dashed lines.

FIG. 9A is a schematic top perspective view of a device 3 according to one embodiment. FIG. 9B is a schematic bottom perspective view of the device 3 illustrated in FIG. 9A. FIG. 9C is a schematic bottom perspective view of the device 3 illustrated in FIGS. 9A and 9B without a seal plate 54 and without the catalytic layers coating the electrodes and covering the access port 16. FIG. 9D is a schematic side view of the device 3 illustrated in FIGS. 9A and 9B. Unless otherwise noted, components of the device 3 may refer to components that are the same as or generally similar to like components of the devices 1 and 2. Instead of having a BGA structure of device 1 or a LGA structure of device 2, the device 3 comprises a dual flat package (DFP) structure. In other words, instead of having the solder plugs and the BGA balls as the leads 22 (FIGS. 1A-7B) or the interconnects 52 and the LGA pads 50 (FIGS. 8A-8D), the device 3 comprises leads formed by legs 56 that extend from the housing 10'.

The device 3 can include a housing 10' that has an upper portion 12' and a lower portion 14', an access port 16 formed in the upper portion 12' of the housing 10', a chamber 24' formed in the lower portion 14' of the housing 10', and a plurality of electrodes 26 formed in the upper portion 12' of the housing 10'. The device 3 can also include a membrane 18 and a filter (not shown) in the access port 16. The device can also include a plug 20 that can seal a fill port 28. The plug 20 can protrude relative to the top side 10a' of the housing 10'. However, in some embodiments the plug 20 can be generally flush with the top side of 10a' of the housing 10'. The bottom side 10b' of the housing 10' can be generally planar. Alternatively, the plug 20 can comprise epoxy or potting materials that are compatible or non-reactive with the electrochemical solution. The device 3 can also include the seal plate 54.

The upper portion 12' and the lower portion 14' of the housing 10' can be monolithically formed. In some embodiments the upper portion 12' and at least part of the lower portion 14' can be manufactured by a single molding process. The lower portion 14' can include the seal plate 54 as a separate piece that can at least partially seal the chamber 24' from the outside environs.

The legs 56 can extend from the upper portion 12' of the housing 10'. The legs 56 can be connected to the arms 30' and indeed can be integrally formed from the same lead frame. The legs 56 can be configured to connect to an external substrate (e.g., a printed circuit board (PCB)) or an external device. In some embodiments, the arms 30' and the legs 56 can provide electrical pathway between the electrodes 26 and the external substrate or the external device. Advantageously, all conductors for routing signals to and from the electrodes 26 can be integrally formed by a single lead frame separate conductors and attendant fabrication steps for the lower portion 14' can be omitted.

Figure 10A:
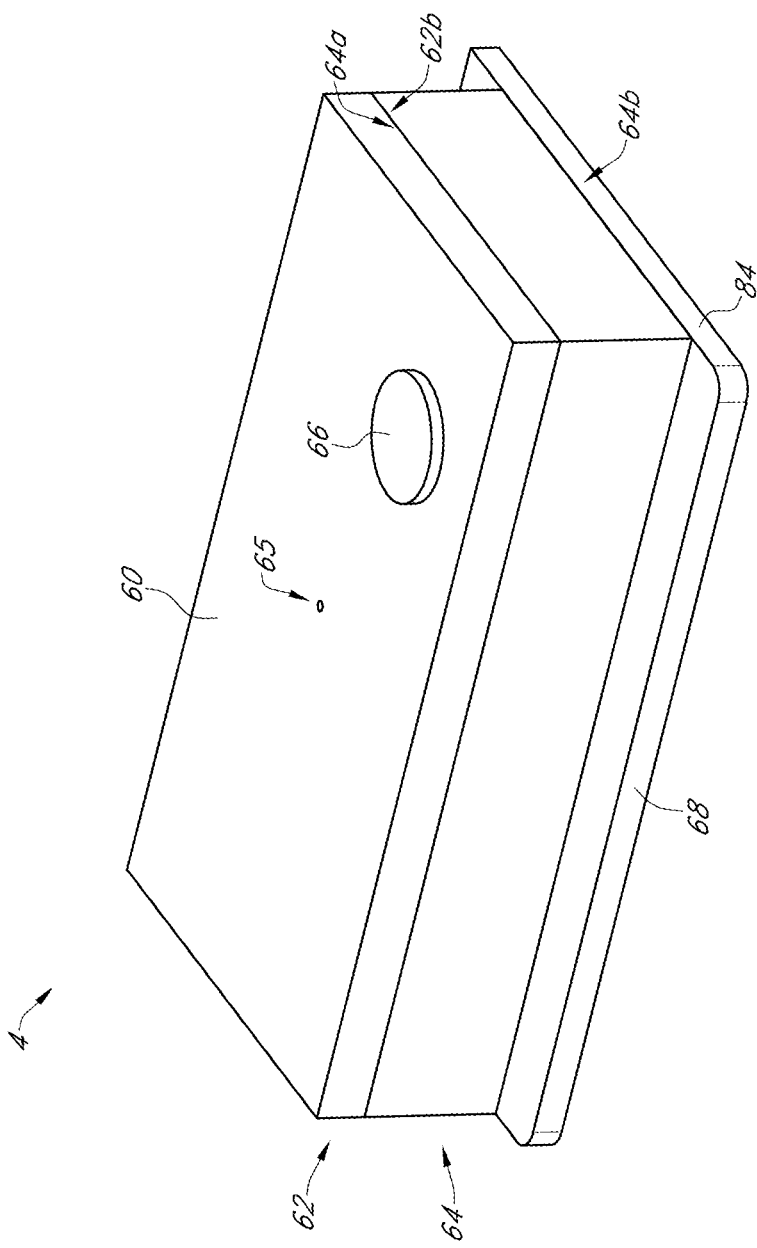
FIG. 10A is a schematic top perspective view of a device according to another embodiment.
Figure 10B:
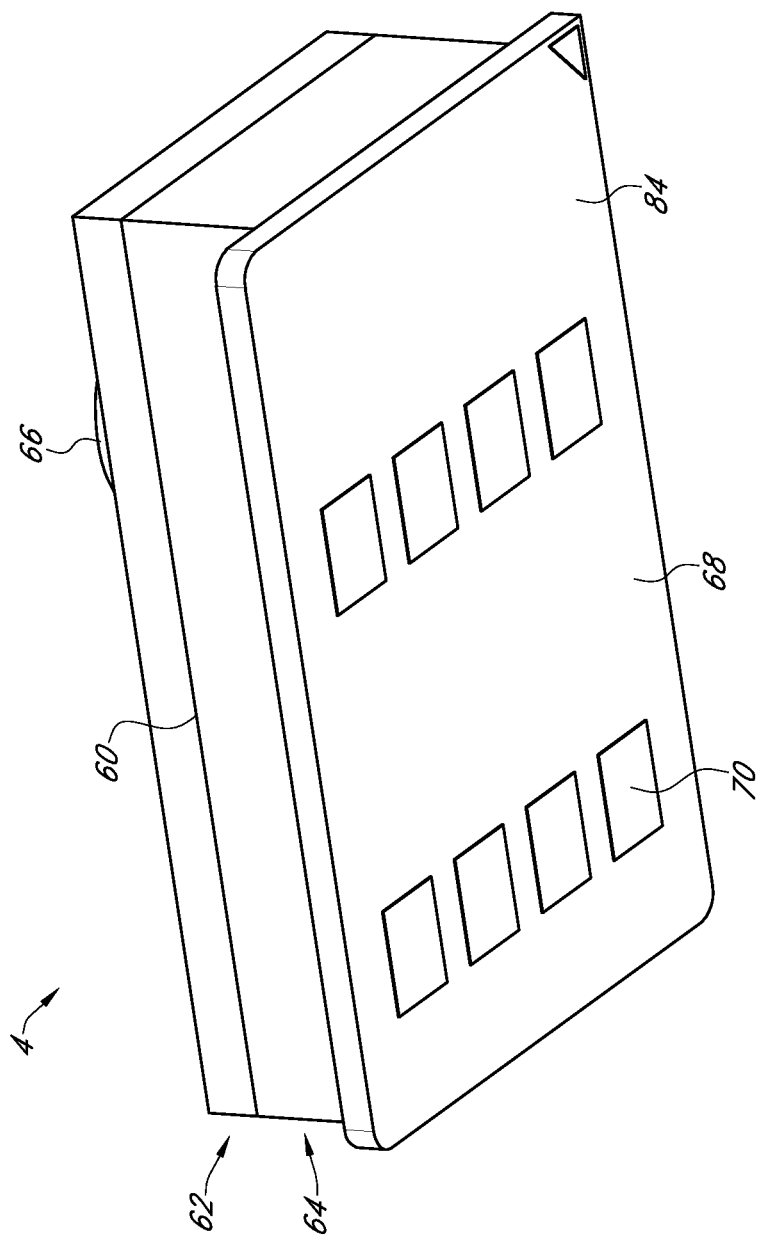
FIG. 10B is a schematic bottom perspective view of the device illustrated in FIG. 10A.

FIG. 10A is a schematic top perspective view of a device 4 according to one embodiment. FIG. 10B is a schematic bottom perspective view of the device 4 illustrated in FIG. 10A. Unless otherwise noted, components of the device 4 may refer to components that are the same as or generally similar to like components of the devices 1, 2, and 3. The device 4 can include a housing 60 that has an upper portion 62 and a lower portion 64, an access port 65 formed in the upper portion 64 of the housing 60, a plug 66 that can seal a fill port 80 (see FIG. 10C) formed in the upper portion 64, and a printed circuit board assembly (PCBA) 68. The housing 60 can be coupled to a top side 68a of the PCBA 68. The PCBA 68 can have contact pads 70 at a bottom side 68b of the PCBA 68. In some embodiments, the device 4 can be configured to fit in a micro subscriber identification module (SIM) card socket.

Figure 10C:
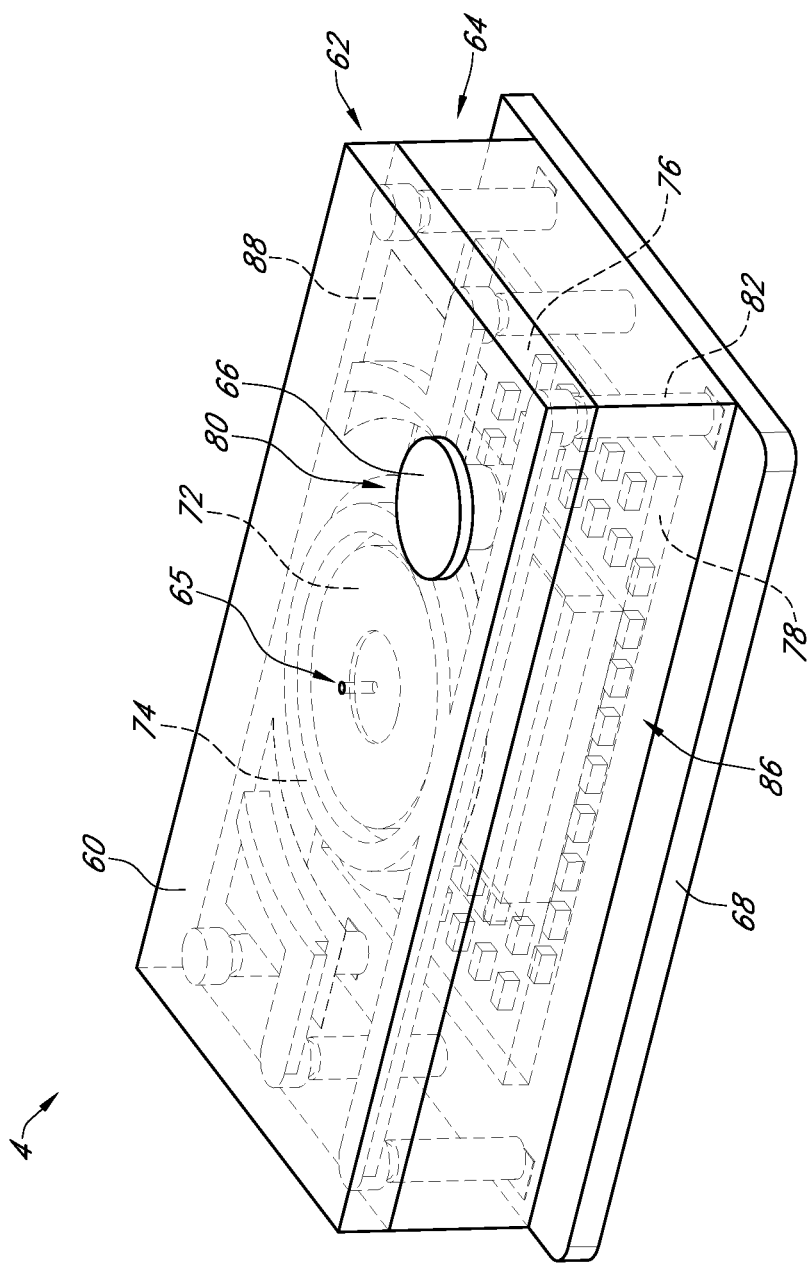
FIG. 10C is a schematic top perspective view of the device with internal components of the device shown in dashed lines.
Figure 10D:
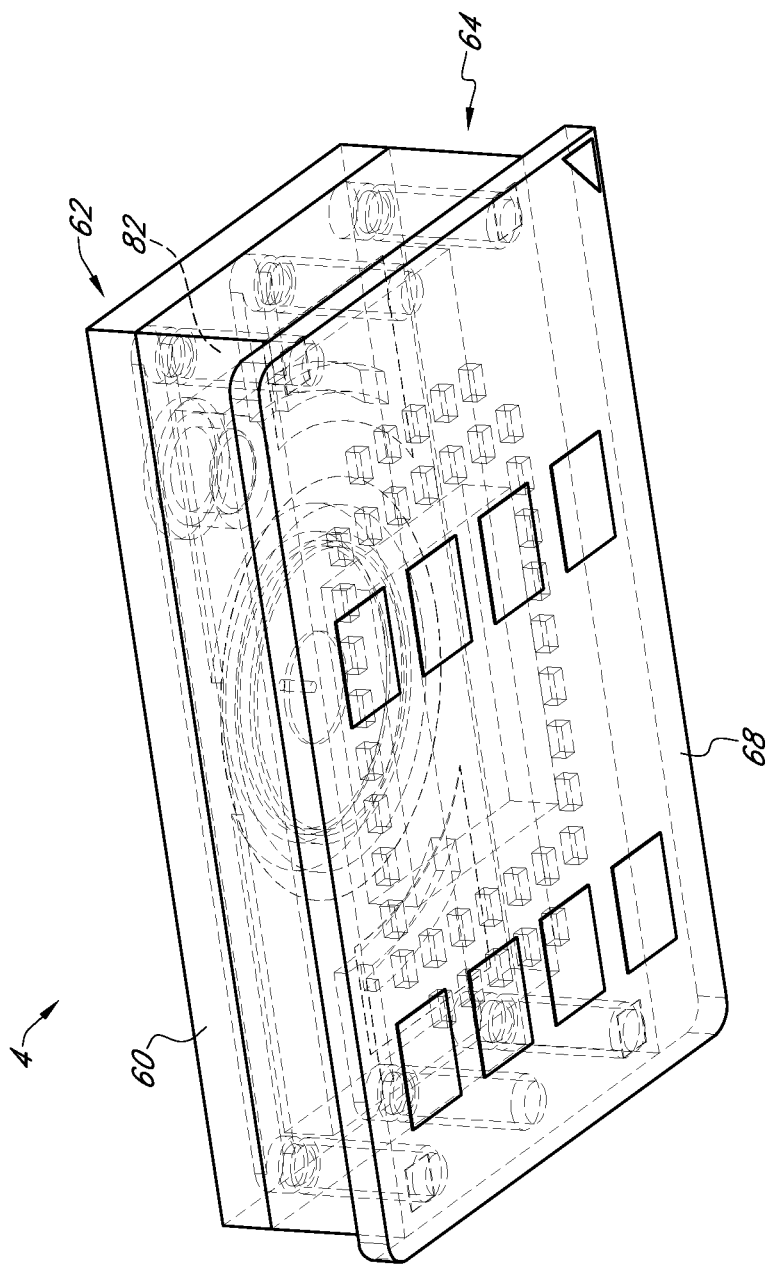
FIG. 10D is a schematic bottom perspective view of the device with a lower portion and a printed circuit board assembly (PCBA) and internal components in the device shown in dashed lines.

FIG. 10C is a schematic top perspective view of the device 4 with internal components of the device 4. FIG. 10D is a schematic bottom perspective view of the device 4 with the lower portion 64 and the dielectric portions of the PCBA 68. The device 4 can also include a membrane 72 formed in the upper portion 62 of the housing 60, a plurality of electrodes 74 formed in the upper portion 62, a chamber 76 formed in the upper part of the lower portion 64, and a cavity 78 formed in the lower part of the lower portion 64. In some embodiments, the membrane 72 can include an adhesive layer.

The upper portion 62 can be provided as a molded lead frame. The electrodes 74 can be exposed to the chamber 76. The chamber 76 can receive an electrochemical solution. The electrochemical solution can be disposed into the chamber 76 through the fill port 80. The fill port 80 can be sealed by way of the plug 66. Alternatively, the plug can comprise epoxy or potting materials that are compatible or non-reactive with the electrochemical solution. The access port 65 can provide fluid communication between the chamber 76 and the outside environs through a gas-permeable and liquid impermeable membrane and a catalytic layer.

The chamber 76 and the cavity 78 can be formed at different locations of the second portion 64. In some embodiments, the chamber 76 can be formed at the top side 64a of the lower portion 64, and the cavity 78 can be formed at the bottom side 64b of the lower portion 64. The cavity 78 can be configured to receive components disposed on the PCBA 68, such as processors and/or passive electronic components (e.g., resistors, capacitors, etc.). For example the PCBA can include a precision analog microcontroller with chemical sensor interface (e.g., ADuCM355 manufactured by Analog Devices Inc.). The lower portion 64 can also include interconnects 82 that extend at least partially through the lower portion 64 from the top side 64a. In some embodiments, the interconnects 82 can extend through the lower portion 64 from the top side 64a to the bottom side 64b.

In some embodiments, the PCBA 68 can include a printed circuit board (PCB) 84 and a plurality of components 86 disposed on the PCB. The components 86 can include passive components and/or active components. In some embodiments, the components 86 can process data acquired through the electrodes 74. In some embodiments, one or more of the components 86 can be electrically connected through an interconnect structure. The interconnect structure can include lead frame arms 88 that horizontally extends at least partially through the upper portion 62, and the interconnects 82. In some embodiments, ends 88a of arms 88 can be exposed on the bottom side 62 of the upper portion 62. In some embodiments, the interconnect structure can also include a trace (not illustrated) formed in or on the PCB 84.

Figure 11A:
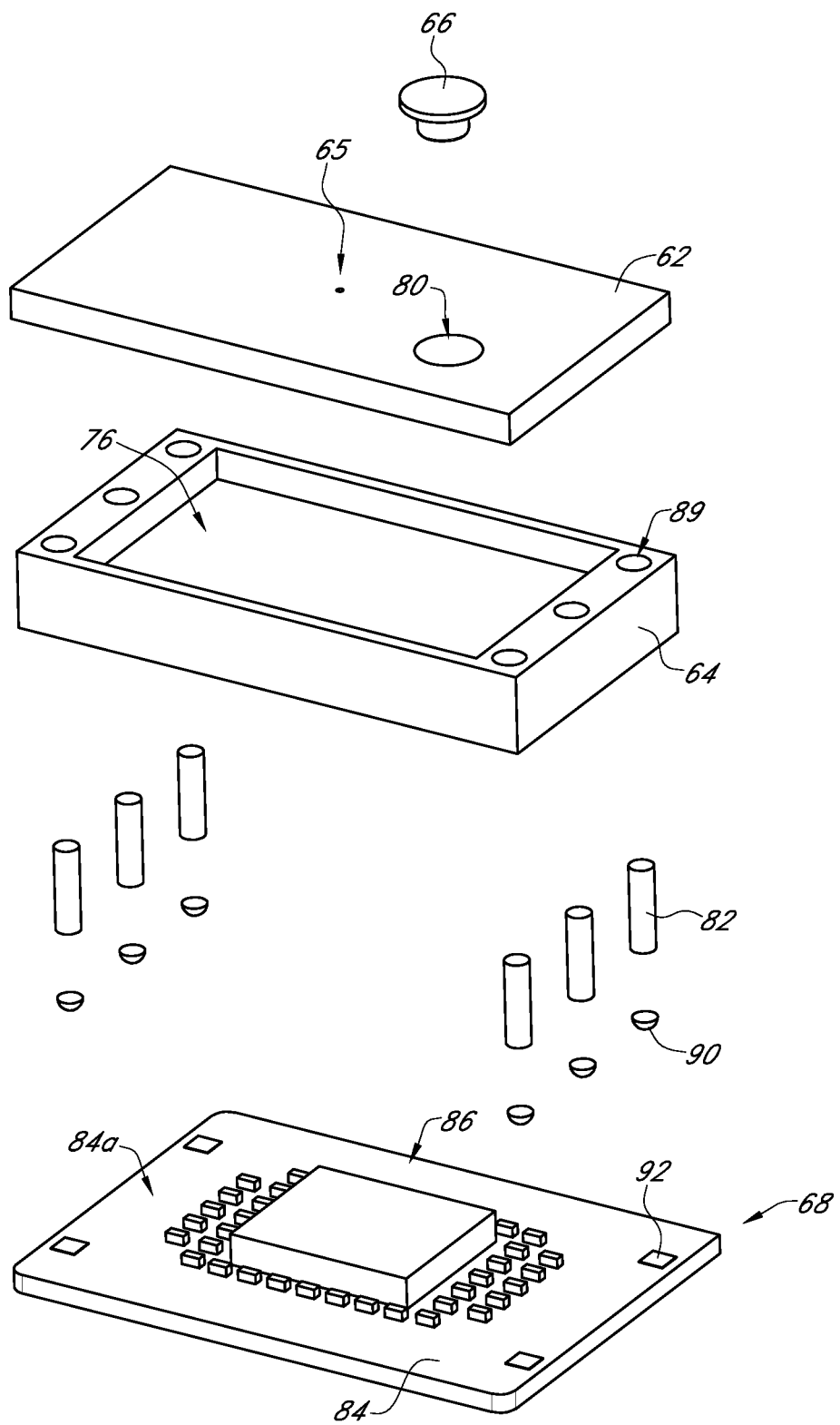
FIG. 11A is a schematic exploded view of the device illustrated in FIGS. 10A-10D as seen from a perspective view from above.
Figure 11B:
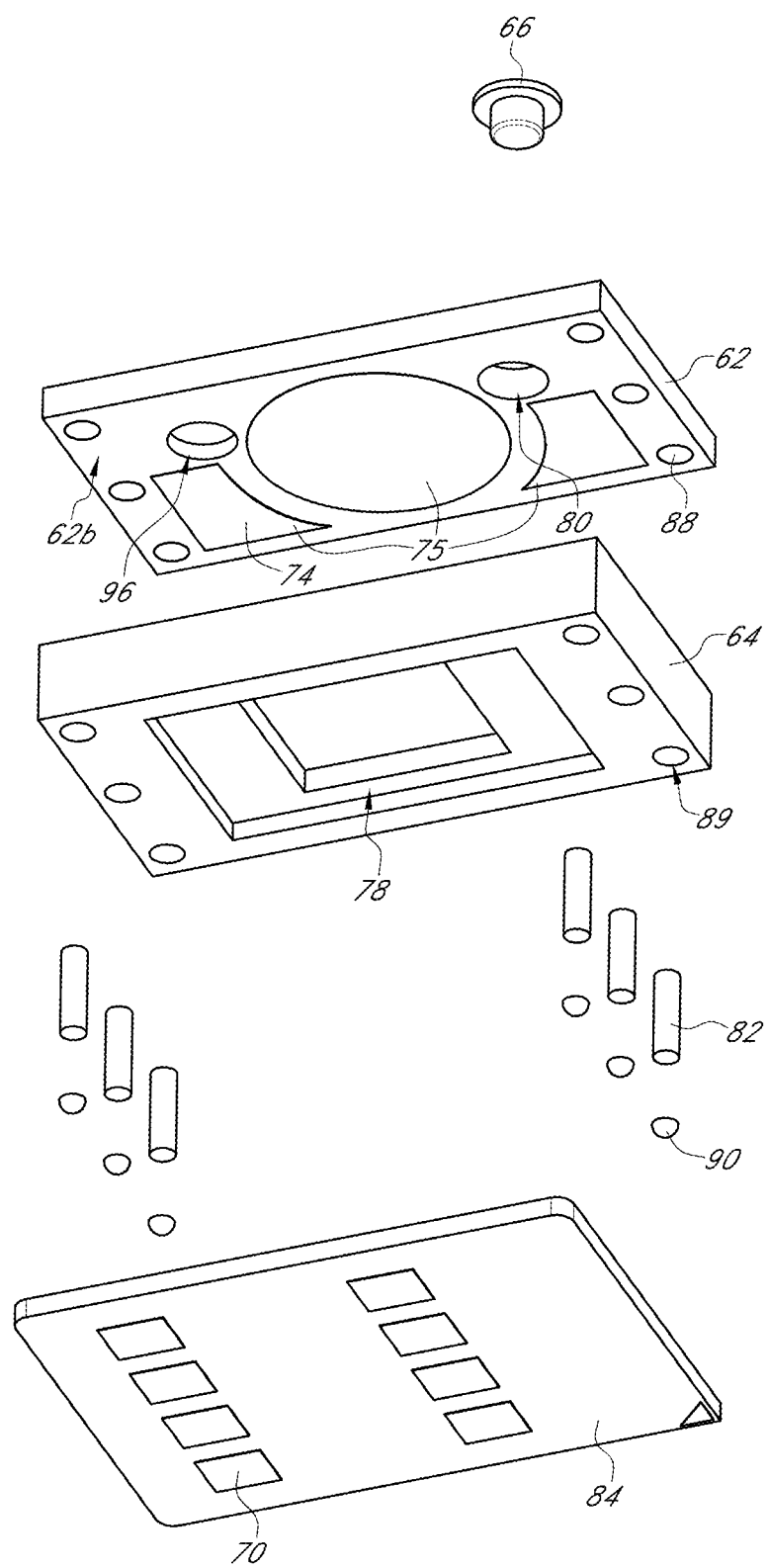
FIG. 11B is a schematic exploded view of the device illustrated in FIGS. 10A-10D as seen from a perspective view from below.

FIG. 11A is a schematic exploded view of the device 4 illustrated in FIGS. 10A-10D as seen from above. FIG. 11B is a schematic exploded view of the device 4 illustrated in FIGS. 10A-10D as seen from below. The lower portion can comprise holes 89 for receiving the interconnects 82. In some embodiments, solder balls 90 can be provided to connect the interconnects 82 and pads 92 on a top side 84a of the PCB 84. The upper portion 62 can comprise a volume expansion feature 96, as explained above.

The bottom side 62b of the upper portion 62 can comprise a coating material 75. In some embodiments, the coating material 75 can comprise a catalyst such as carbon black, iridium black, platinum black gold black, and/or ruthenium black. Thus, the electrodes 74 can include the conductors of the lead frame coated with catalytic material. The catalytic layer can enhance the performance of the electrode 74, in some applications. In some embodiments, different coating material(s) 75 can be selected based at least in part on the gas(es) interested to be sensed. The coating material 75 can be coated on the electrodes 74 in any suitable manner. For example, the coating material 75 (e.g., platinum black) can be coated on the electrodes 74 and the plastic underside of the upper portion 62 of the housing by way of screen printing or stencil printing. In such processes, the coating material 75 can be applied as an ink. The ink can include hydrophobic particles, such as polytetrafluoroethylene (PTFE) or the line materials. The catalytic coating material 75 can also cover the underside of the membrane 72 that communicates with the access port 65.

Figure 12:
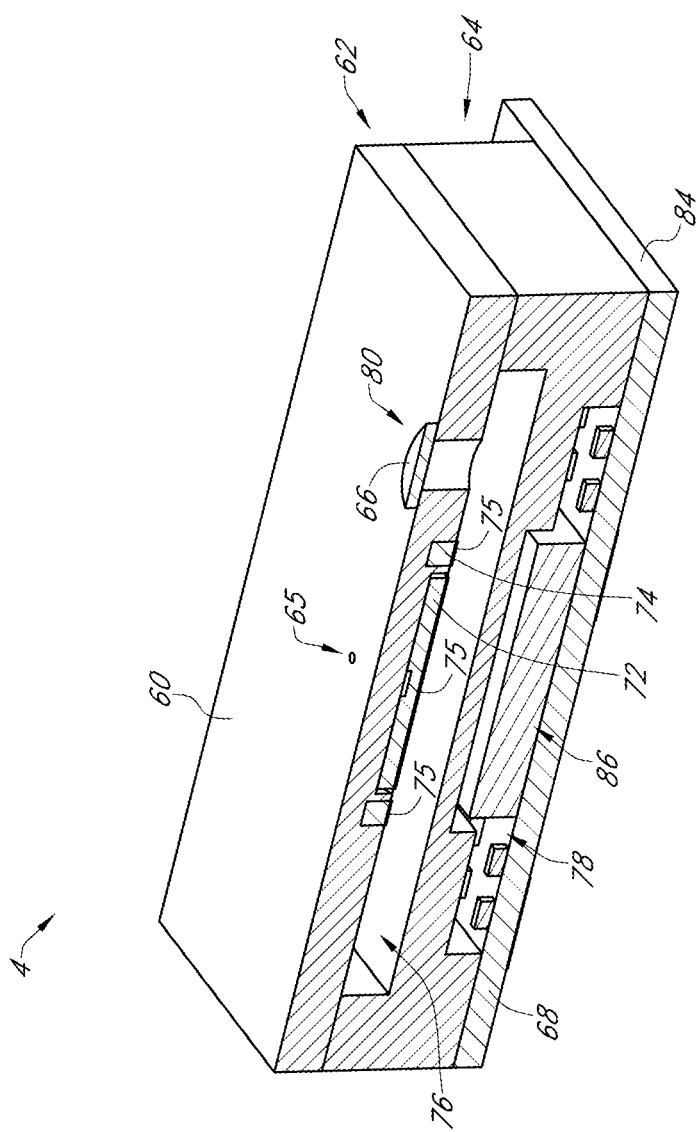
FIG. 12 is a schematic perspective cut-away view of the device of FIGS. 10A-11B.

FIG. 12 is a schematic perspective cut-away view of the device 4. The cross section of the device 4 includes the chamber 76 formed at the top side 64a of the lower portion 64, the electrodes 74 formed in the upper portion 62, a cavity 78 formed at the bottom side 64b of the lower portion 64, and the plug 66 that seals the fill port 80 formed in the upper portion 62. In some embodiments, the cavity 78 can have varying depths or heights for receiving different components having different heights.

Figure 13A:
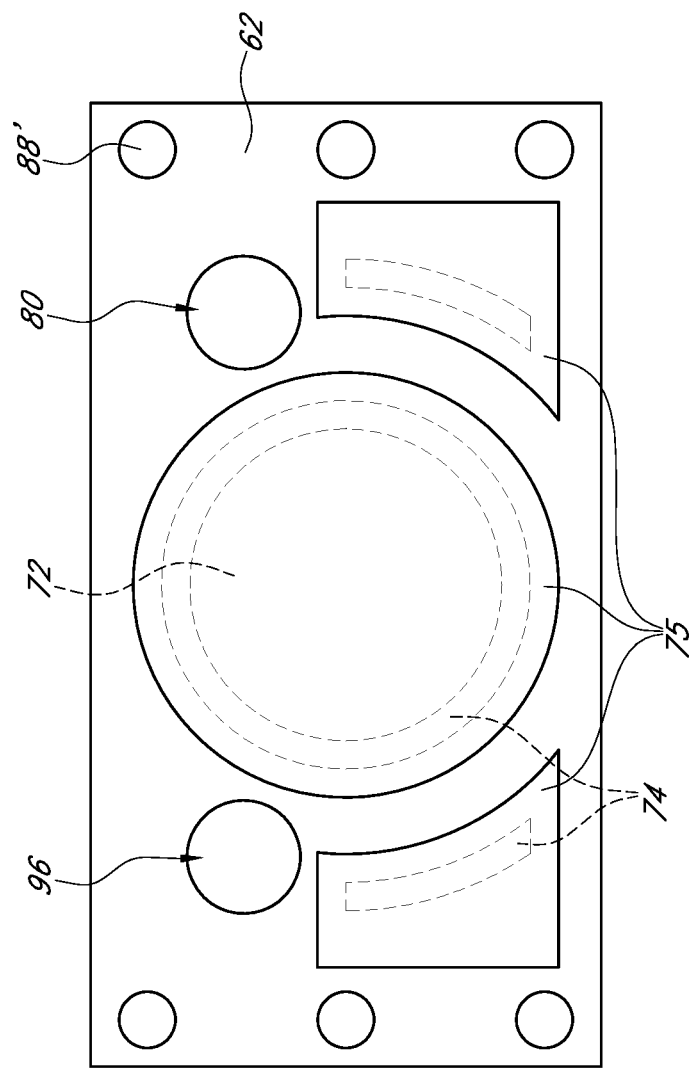
FIG. 13A is a bottom plan view of an upper portion of the device of FIGS. 10A-11B.
Figure 13B:
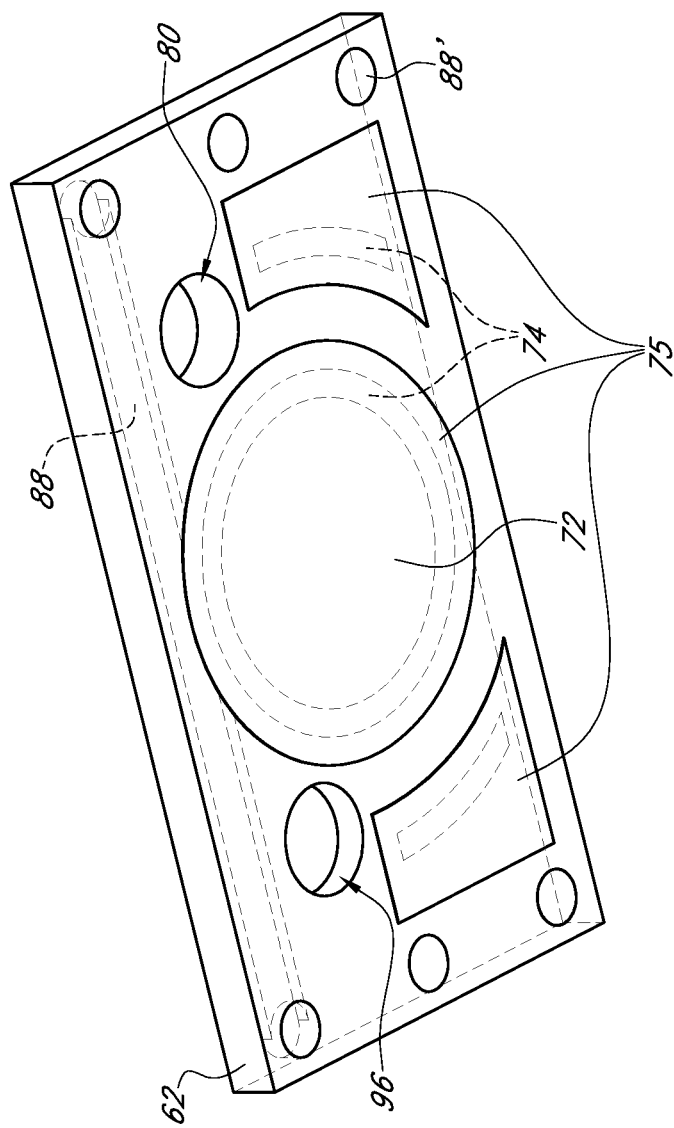
FIG. 13B is a schematic perspective view of the upper portion illustrated in FIG. 13A with internal components of the upper portion shown in dashed lines.

FIG. 13A is a bottom plan view of the upper portion 62 of the device 4 without the plug 66. FIG. 13B is a schematic perspective view of the upper portion 62 illustrated in FIG. 13A with the molding of the upper portion 62. The upper portion 62 can include the membrane 72, the electrodes 74, the arms 88 that extends from the electrodes 74 having arm ends 88', the fill port 80, and a volume expansion feature 96. In some embodiments, as illustrated, the electrodes 74 can include the coating material 75 (such as carbon black), and the coating material 75 can also cover the membrane 72. In some embodiments, the ends 88' of the arms 88 can be coated with a protective layer (e.g., a gold layer). As in the prior embodiments, the arms 88 can be half-etched portions of a lead frame, while the arm ends 88' and electrodes 74 represent unetched thicker portions of the lead frame, or a conductively-filled plastic can be molded in these shapes.

Figure 13C:
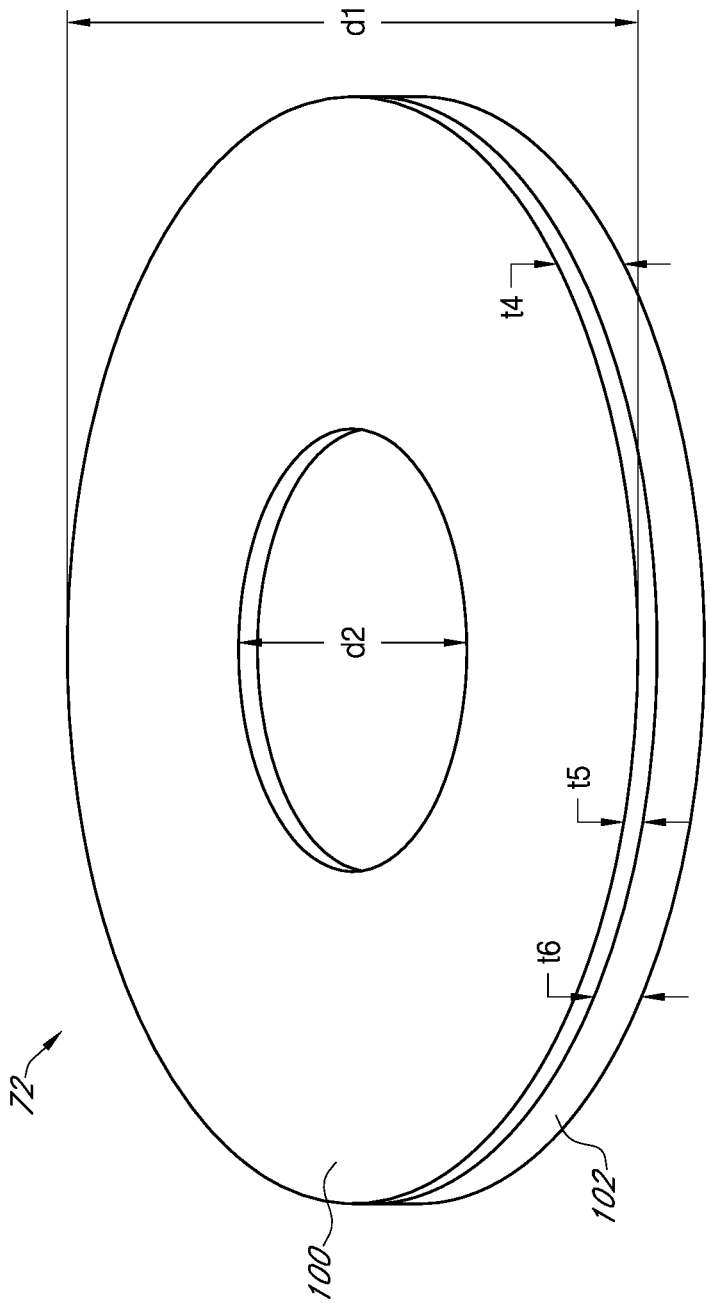
FIG. 13C is a schematic perspective view of a membrane according to one embodiment.

FIG. 13C is a schematic perspective view of the membrane 72 according to one embodiment. The membrane 72 can include an adhesive layer 100 and a membrane body 102. The membrane 72 can also include a protective layer (not illustrated). The dimension of the membrane 72 can be selected such that the filter effectively seals the chamber 78 when provided in the upper portion 62. The membrane 72 can also be embedded in the mold (e.g., LCP or ABS) of the molded lead frame that defines the upper portion 62

The membrane 72 has a diameter d1. In some embodiments, the diameter d1 of the membrane 72 can be in a range of, for example, 2.5 mm to 10 mm, in a range of, for example, 3 mm to 10 mm, in a range of, for example, 2.5 mm to 5 mm, or in a range of, for example, 3 mm to 5 mm. The membrane 72 has a thickness t4. In some embodiments, the thickness t4 of the membrane 72 can be in a range of, for example, 0.2 mm to 0.5 mm, in a range of, for example, 0.3 mm to 0.5 mm, in a range of, for example, 0.2 mm to 0.4 mm, or in a range of, for example, 0.3 mm to 0.4 mm.

The adhesive layer 100 has an inner diameter d2. In some embodiments, the inner diameter d2 of the adhesive layer 100 can be in a range of, for example, 1 mm to 5 mm, in a range of, for example, 1.5 mm to 5 mm, in a range of, for example, 0.5 mm to 3 mm, or in a range of, for example, 1.5 mm to 3 mm.

The adhesive layer 100 has a thickness t5. In some embodiments, the thickness t5 of the adhesive layer 100 can be in a range of, for example, 0.05 mm to 0.5 mm, in a range of, for example, 0.08 mm to 0.5 mm, in a range of, for example, 0.05 mm to 0.2 mm, or in a range of, for example, 0.08 mm to 0.2 mm.

The membrane body 102 has a thickness t6. In some embodiments, the thickness t6 of the membrane body 102 can be in a range of, for example, 0.2 mm to 0.5 mm, in a range of, for example, 0.3 mm to 0.5 mm, in a range of, for example, 0.2 mm to 0.4 mm, or in a range of, for example, 0.3 mm to 0.4 mm.

Figure 14B:
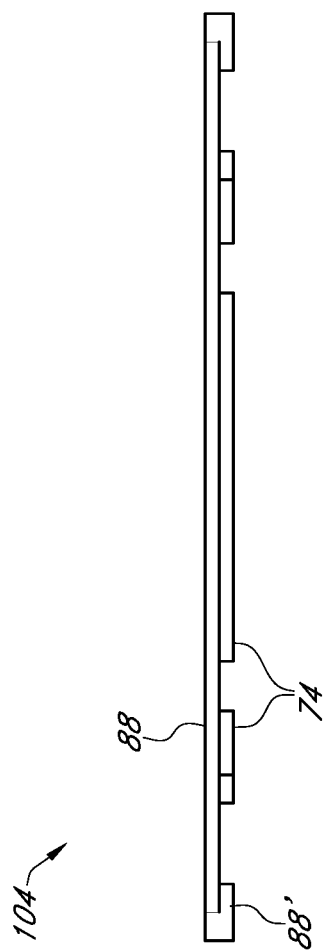
FIG. 14B is a schematic side view of the lead frame structure illustrated in FIG. 14A.
Figure 14C:
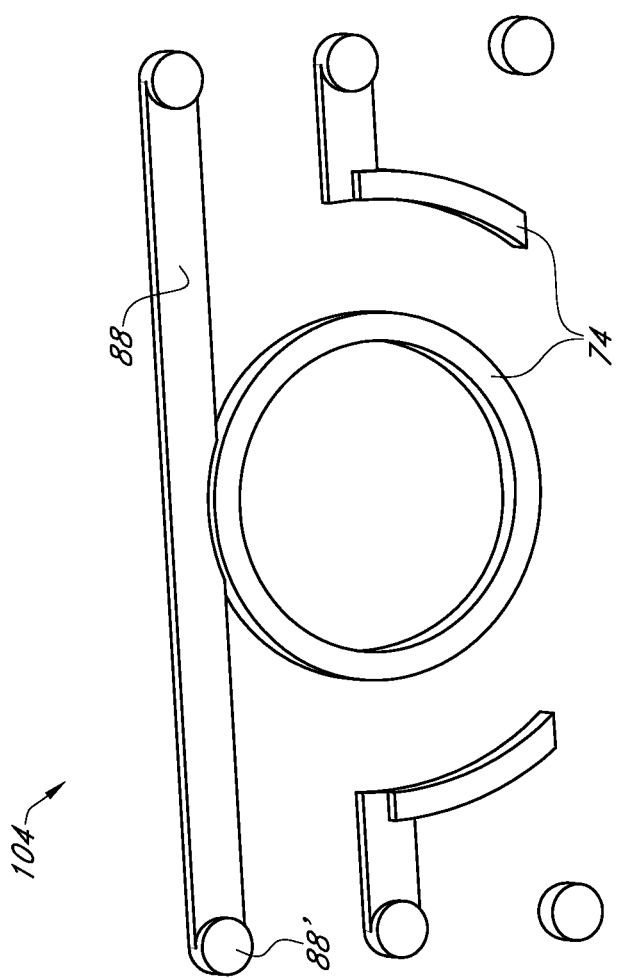
FIG. 14C is a schematic bottom perspective view of the lead frame structure illustrated in FIGS. 14A and 14B.

FIG. 14A is a schematic top plan view of a lead frame structure 104 that can be included in any devices discloses herein. FIG. 14B is a schematic side view of the lead frame structure 104 illustrated in FIG. 14A. FIG. 14C is a schematic bottom perspective view of the lead frame structure 104 illustrated in FIGS. 14A and 14B. The lead frame structure 104 can have similar functionality as the lead frame 46. The lead frame structure 104 can comprise the plurality of electrodes 74 (thicker portions of the lead frame structure 104 in ring and arc shapes, as best seen in FIG. 14C), and the arms 88 that extend from the electrodes 74. In some embodiments, the ends 88a of the arms 88 and/or the electrodes 74 can be coated with a protective layer (e.g., a gold layer). In some embodiments, the electrodes 74 can be coated with a carbon black layer, an iridium black layer, a platinum black layer gold black, ruthenium black or a mixture of such catalytic materials, such that the illustrated electrodes 74 can be considered contacts to electrodes formed by the catalytic layer.

Figure 15A:
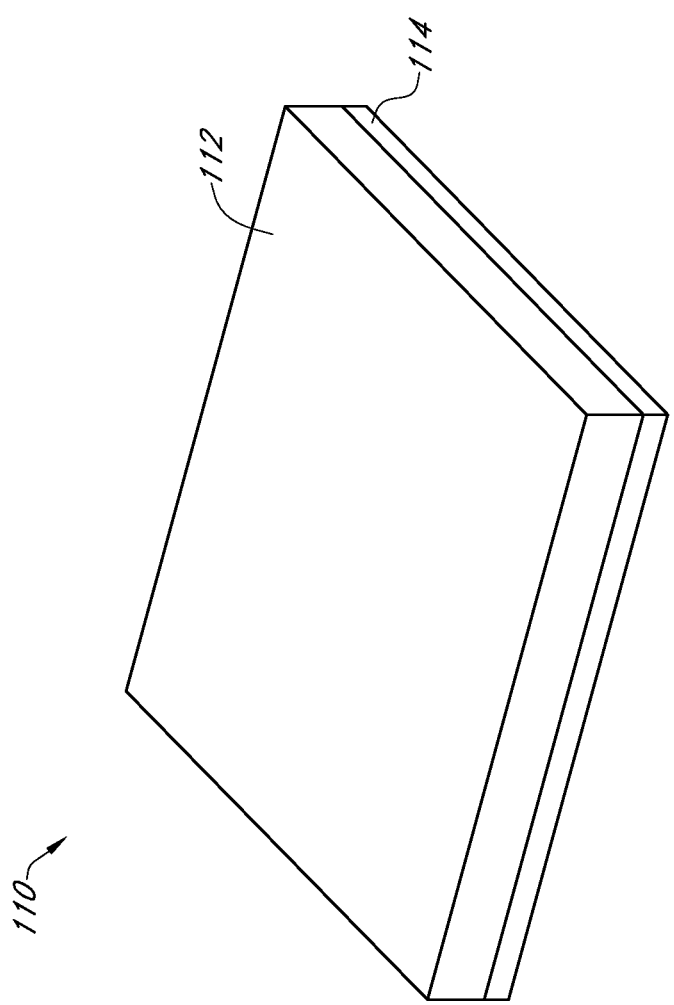
FIG. 15A is a schematic perspective view of a system in package (SiP) according to one embodiment.
Figure 15B:
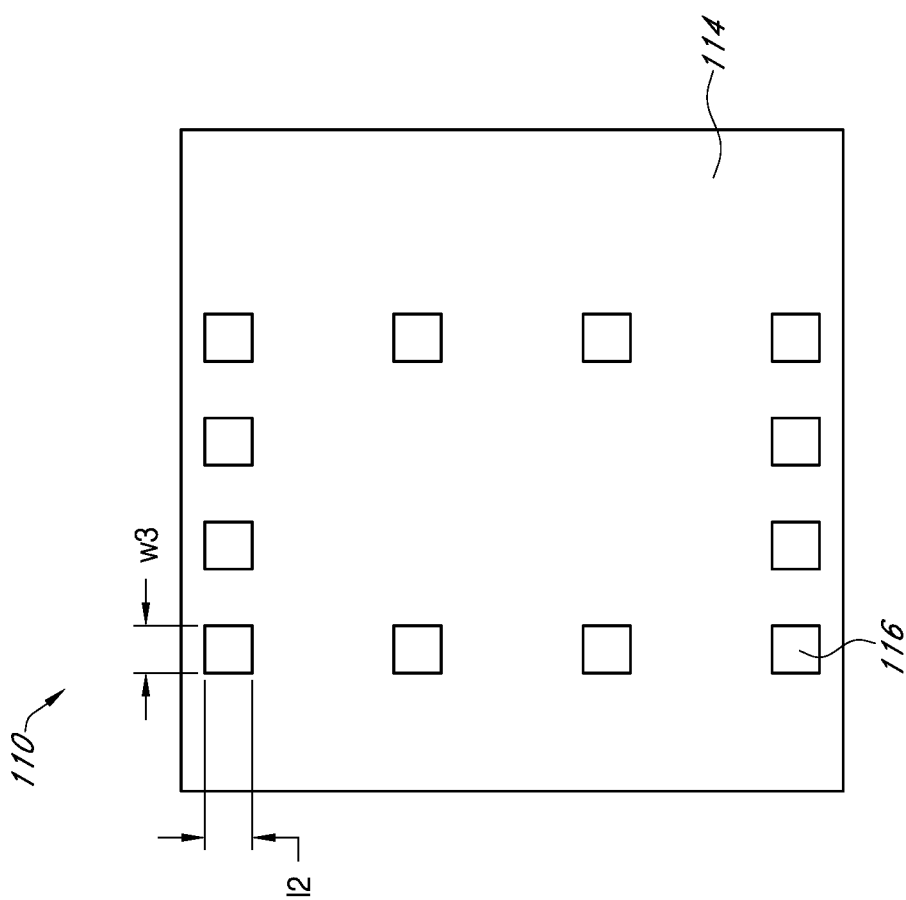
FIG. 15B is a schematic bottom plan view of the SiP illustrated in FIG. 15A.
Figure 15C:
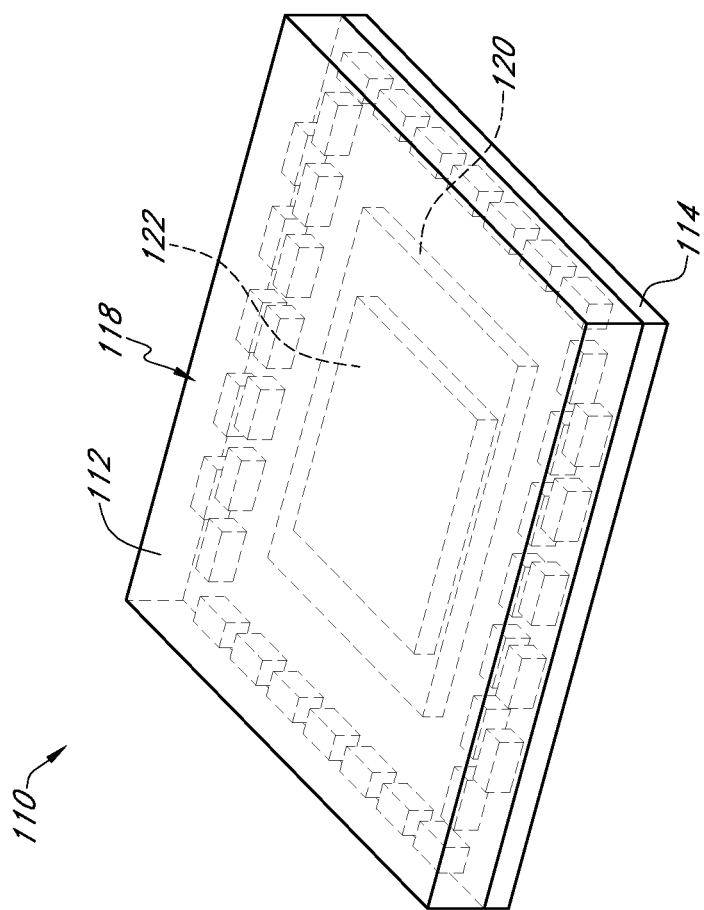
FIG. 15C is a schematic perspective view of the SiP of FIGS. 15A-15B with internal components in the SiP shown in dashed lines.

FIG. 15A is a schematic perspective view of a system in package (SiP) 110 that can be used with any of the devices disclosed herein, according to one embodiment. FIG. 15B is a schematic bottom plan view of the SiP 110 illustrated in FIG. 15A. FIG. 15C is a schematic perspective view of the SiP 110 with an overmold 112.

The SiP 110 includes a substrate 114 (e.g., a laminate substrate), components 118 disposed on the substrate 114, and the overmold 112 over the components 118. In some embodiments, the components 118 can include stacked dies. For example, a first die 120 can be mounted on a top side of the substrate 114, and a second die 122 can be mounted on the first die 120. In some embodiments one or more of the components 118 of the SiP 110 can analyze, process, and/or pre-process the monitored changes in electrical properties (e.g., voltage or current) of the electrochemical solution. In such embodiments, the one or more of the components 118 of the SiP 110 can connect to the electrodes in the device.

The SiP 110 can comprise contact pads 116 on a bottom side of the SiP 110. The number, the shape, and/or the locations of the contact pads 116 can vary. In some embodiments, the contact pads 116 can be distributed symmetrically or asymmetrically on the bottom side of the SiP 110. In some embodiments, sizes of the contact pads 116 can vary. The contact pads 116 have a width w3, and a length 12. In some embodiments, the contact pads 116 can comprise square pads. In such embodiments, the width w3 and the length 12 can be the same. In some embodiments, the width w3 of a contact pad 116 can be in a range of, for example, 0.1 mm to 1 mm, in a range of, for example, 0.3 mm to 1 mm, in a range of, for example, 0.1 mm to 0.7 mm, or in a range of, for example, 0.3 mm to 0.7 mm. In some embodiments, the length 12 of a contact pad 116 can be in a range of, for example, 0.1 mm to 1 mm, in a range of, for example, 0.3 mm to 1 mm, in a range of, for example, 0.1 mm to 0.7 mm, or in a range of, for example, 0.3 mm to 0.7 mm.

Figure 16A:
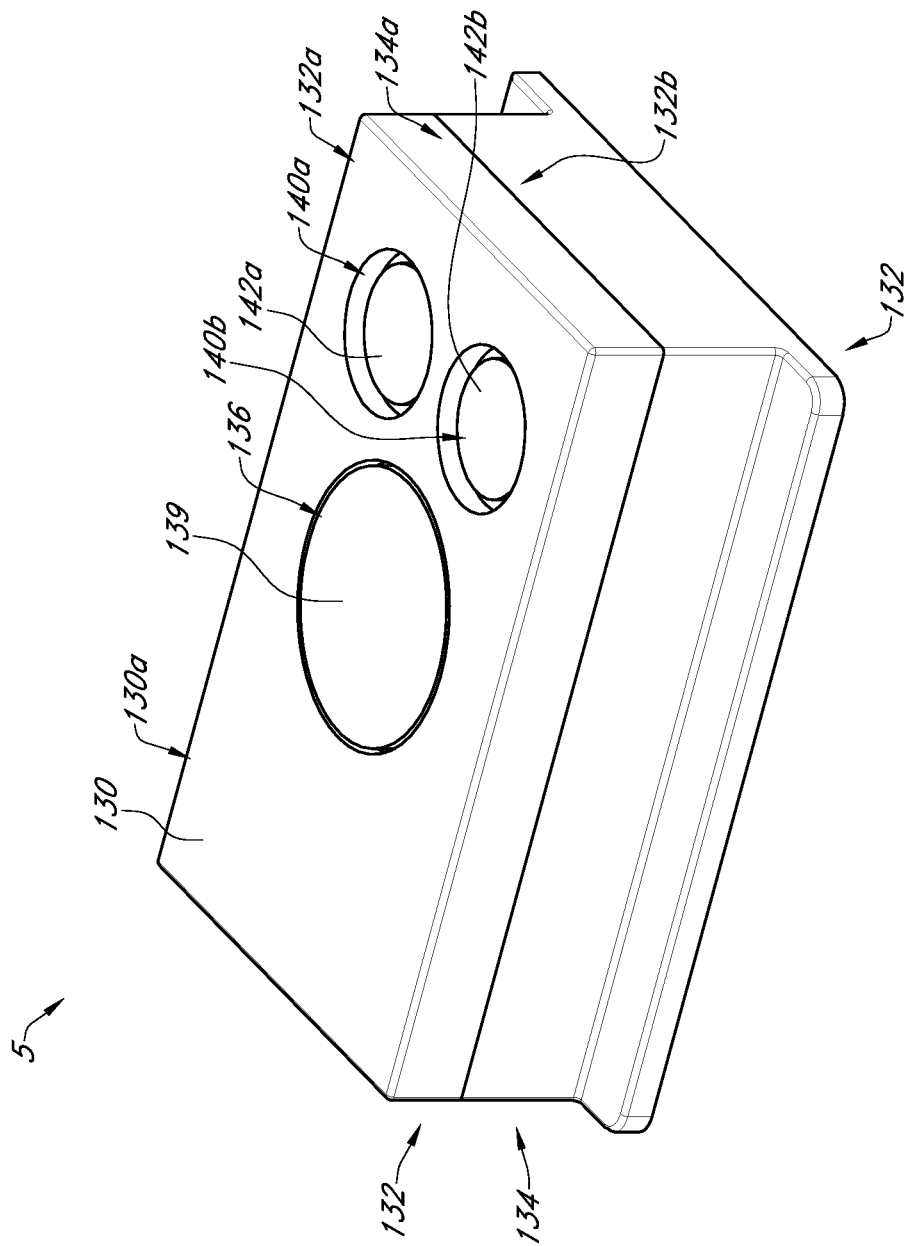
FIG. 16A is a schematic top perspective view of a device according to another embodiment.
Figure 16B:
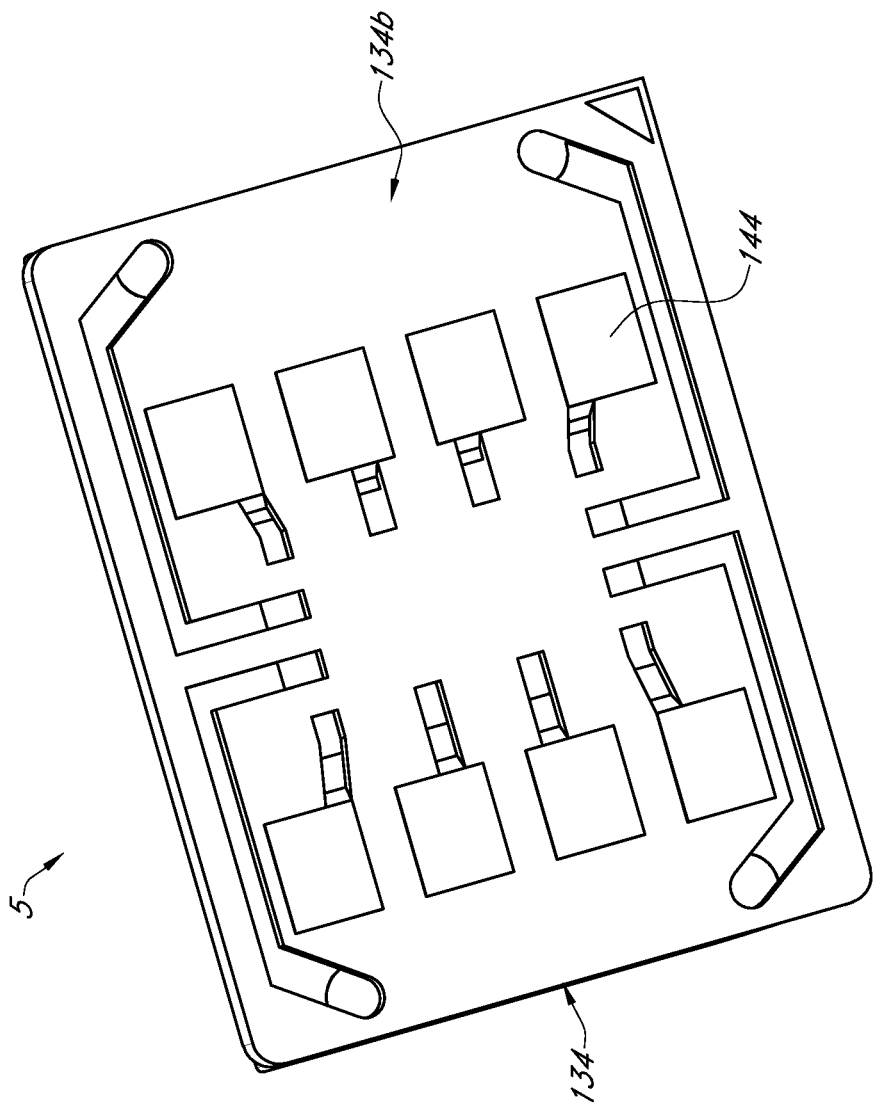
FIG. 16B is a schematic bottom perspective view of the device illustrated in FIG. 16A.
Figure 16C:
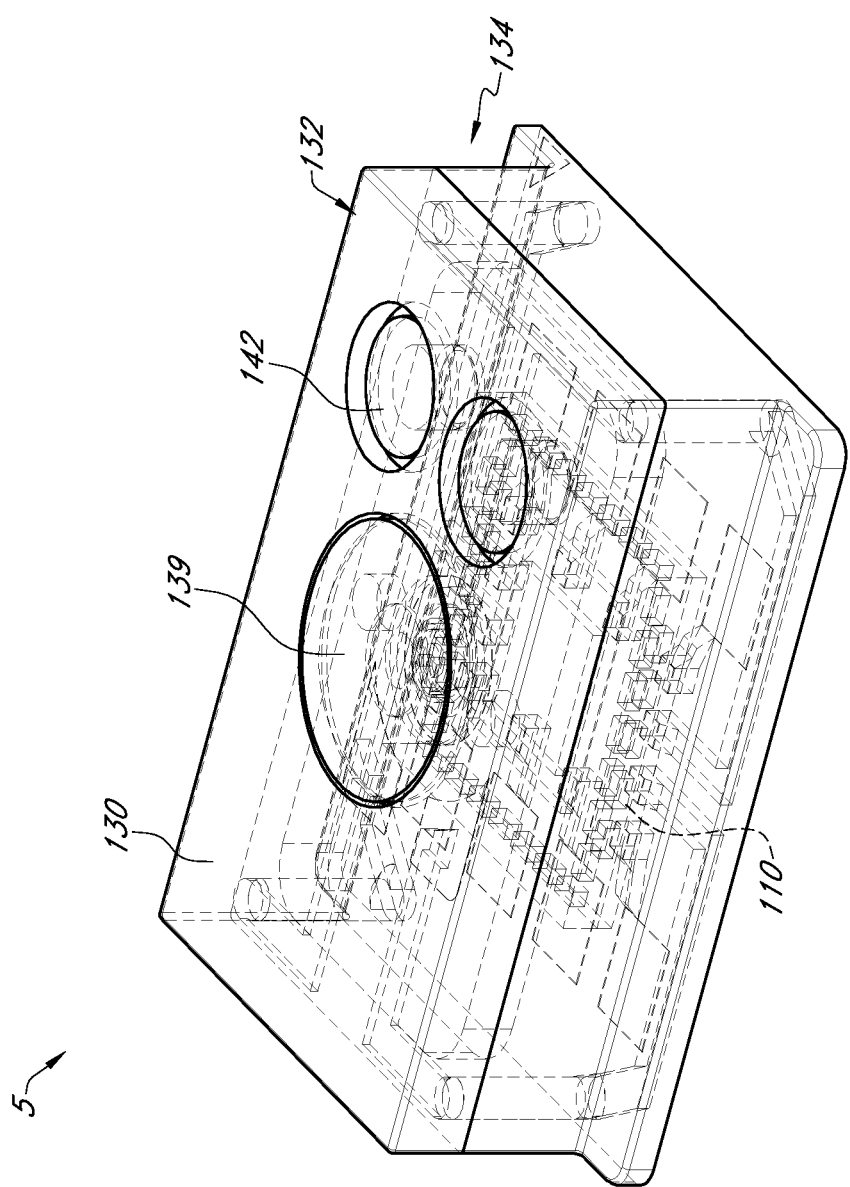
FIG. 16C is a schematic top perspective view of the device of FIGS. 16A-16B with internal components of the device shown in dashed lines.
Figure 16D:
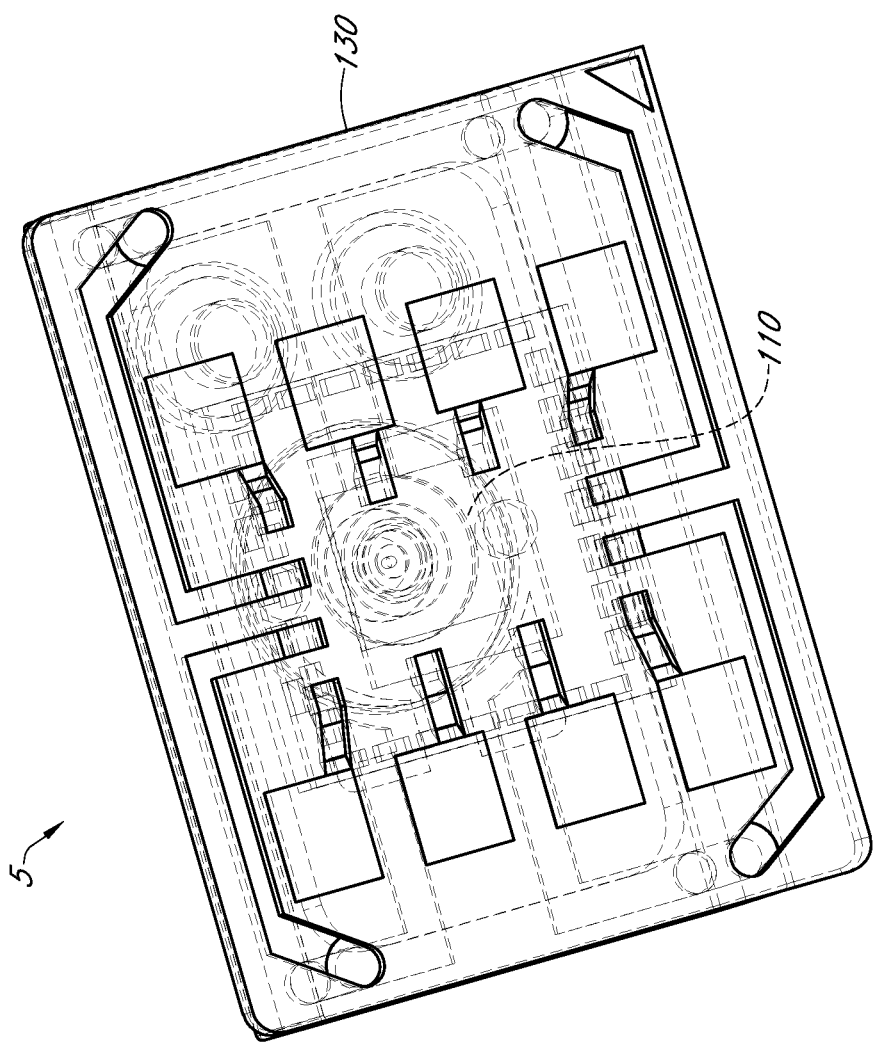
FIG. 16D is a schematic bottom perspective view of the device of FIGS. 16A-16C with internal components of the device shown in dashed lines.
Figure 16E:
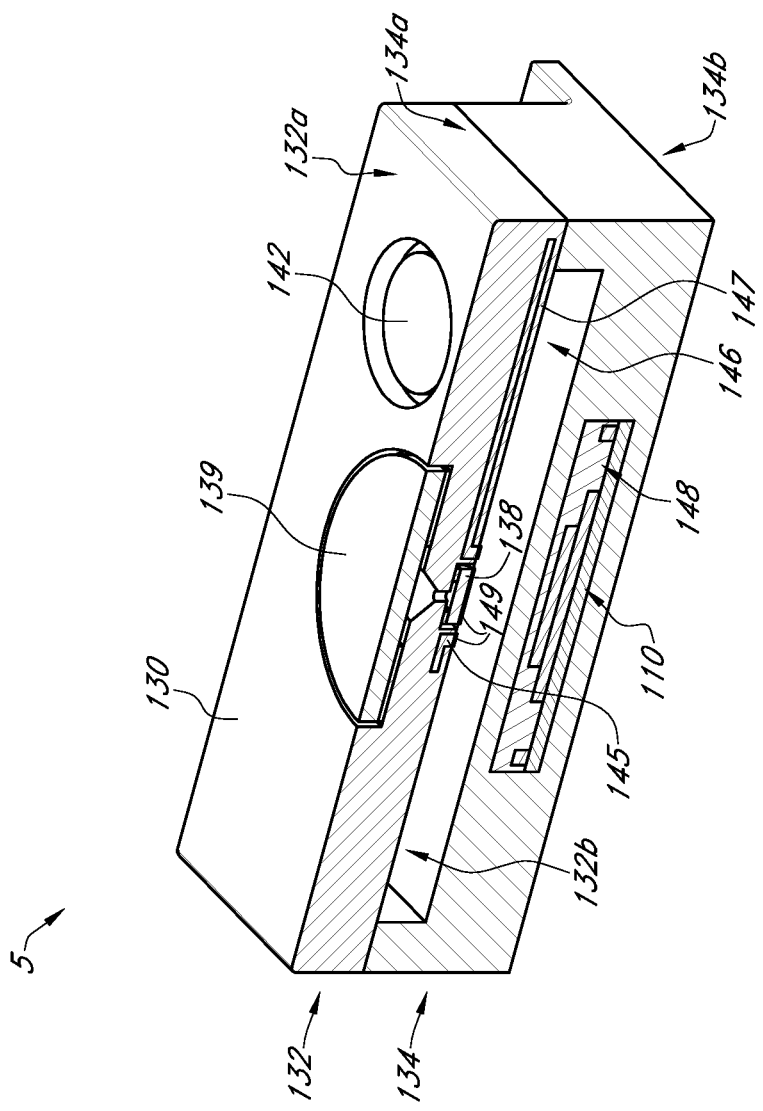
FIG. 16E is a schematic perspective cut-away view of the device of FIGS. 16A-16D.
Figure 16F:
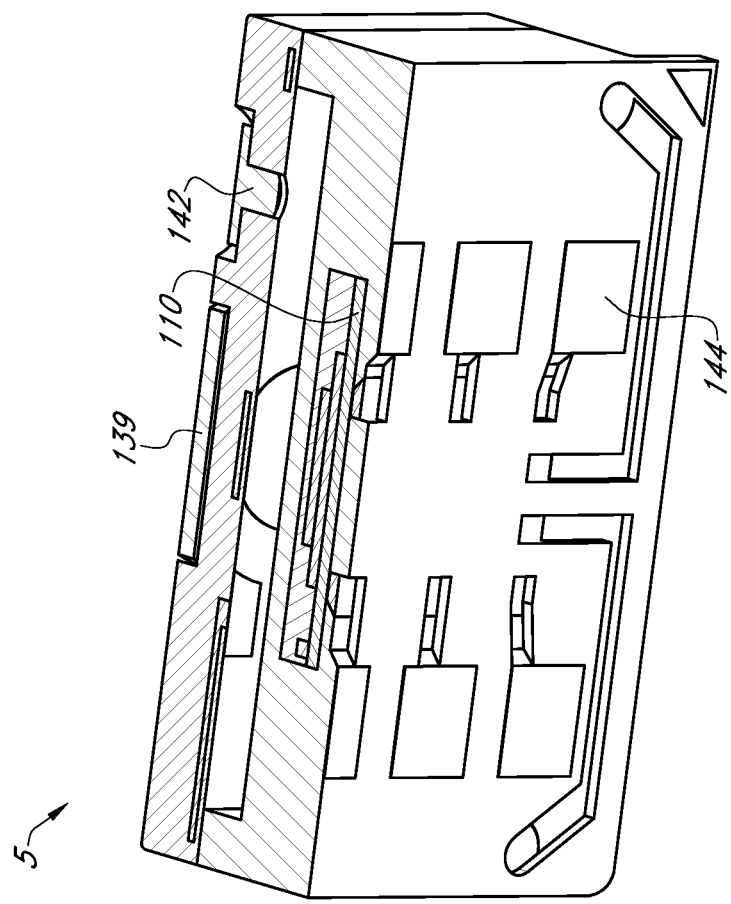
FIG. 16F is a schematic perspective view of another cut-away view of the device of FIGS. 16A-16E.

FIG. 16A is a schematic top perspective view of a device 5 according to one embodiment. FIG. 16B is a schematic bottom perspective view of the device 5 illustrated in FIG. 16A. FIG. 16C is a schematic top perspective view of the device 5 with the mold material of a housing 130. FIG. 16D is a schematic bottom perspective view of the device 5 with the mold material of the housing 130. FIG. 16E is a schematic perspective cut-away view of the device 5. FIG. 16F is a schematic perspective view of a different cut-away of the device 5. Unless otherwise noted, components of the device 5 may refer to components that are the same as or generally similar to like components of the devices 1, 2, 3, and 4.

The device 5 can include a housing 130 that has an upper portion 132 and a lower portion 134. The device 5 can also include an access port 136 formed in the upper portion 132, a membrane 138 in the access port 136 at or near a bottom side 132b of the upper portion 132, a filter 139 in the access port 136 at or near a top side 132a of the upper portion 132, a first fill port 140a and a second fill port 140b formed in the upper portion 132, and a first plug 142a and a second plug 142b in the respective fill ports 140a, 140b. The bottom side 132b of the upper portion 132 can comprise a coating material 149. In some embodiments, the coating material 149 can comprise catalyst. The device 5 can comprise contact pads 144 on a bottom side 134b of the lower portion 134. The contact pads can be made, in some embodiments, by molded interconnect method that involves selective laser ablation followed by electroless plating of conductive materials, such as Ni/Au. The device 5 can include a plurality of electrodes 145 formed in the upper portion 132, and arms 147 that horizontally extend at least partially through the upper portion 132. The upper portion can be formed as a molded lead frame, with the lead frame providing the electrodes 145 and arms. Alternatively, the electrodes can be made of conductive non-metal materials, such as conductive ABS.

The device 5 can include a chamber 146 formed in the lower portion 134 of the housing 130, and a cavity 148 formed in the lower portion 134. In some embodiments, the chamber 146 can receive an electrochemical solution. In some embodiments, the cavity 148 can receive components, such as processors and/or passive components. In some embodiments, the cavity can receive system in package (SiP) 110. SiP can also be overmolded into the lower portion 134 instead of being put into a pre-made cavity.

In some embodiments, the electrochemical solution can be provided into the chamber 146 through the first fill port 140a or the second fill port 140b formed in the upper portion 132 of the housing 130. The first fill port 140a and the second fill port 140b can be generally similar to the fill ports 28, 80 described above. However, in the device 5, one of the two fill ports 140a, 140b can act as a vent hole. For example, the electrochemical solution can be injected from one of the fill ports (e.g., the first fill port 140a) and the other fill port (the second fill port) can act as a vent hole.

Figure 17A:
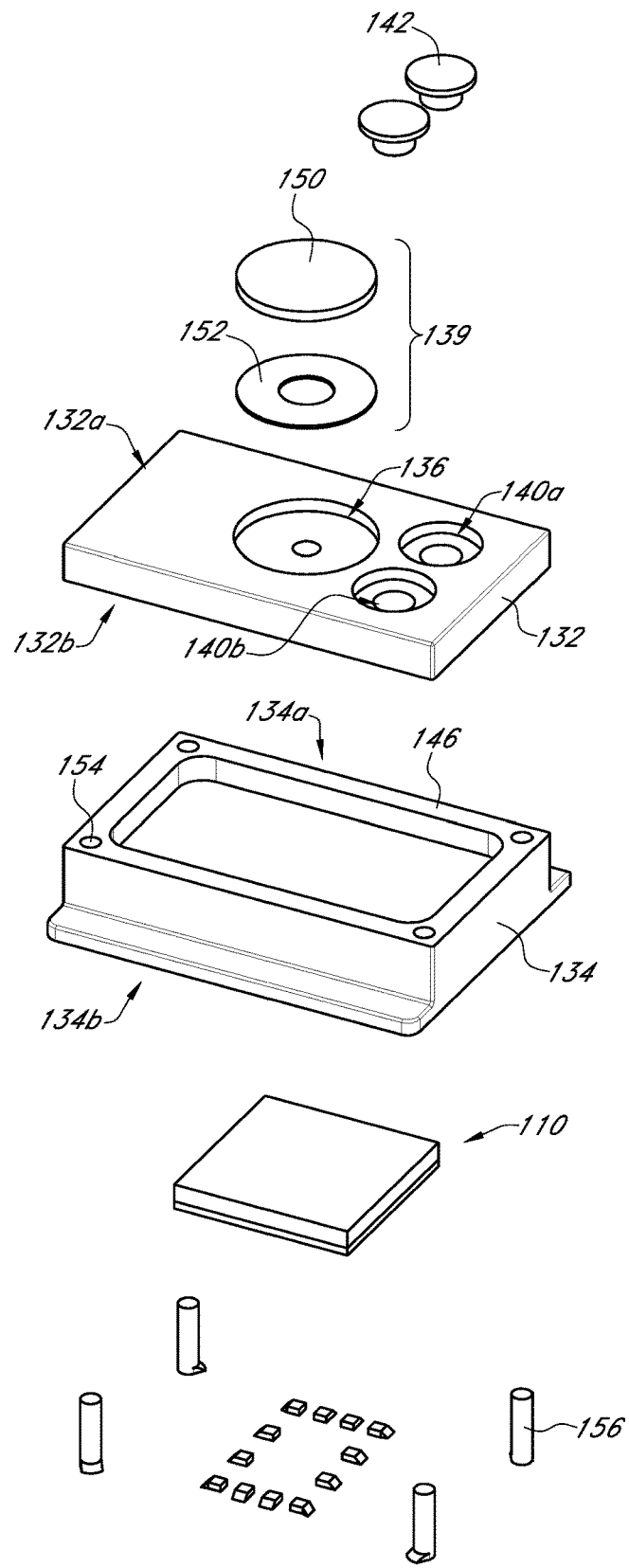
FIG. 17A is a schematic exploded view of the device illustrated in FIGS. 16A-16F as seen from an angle.
Figure 17B:
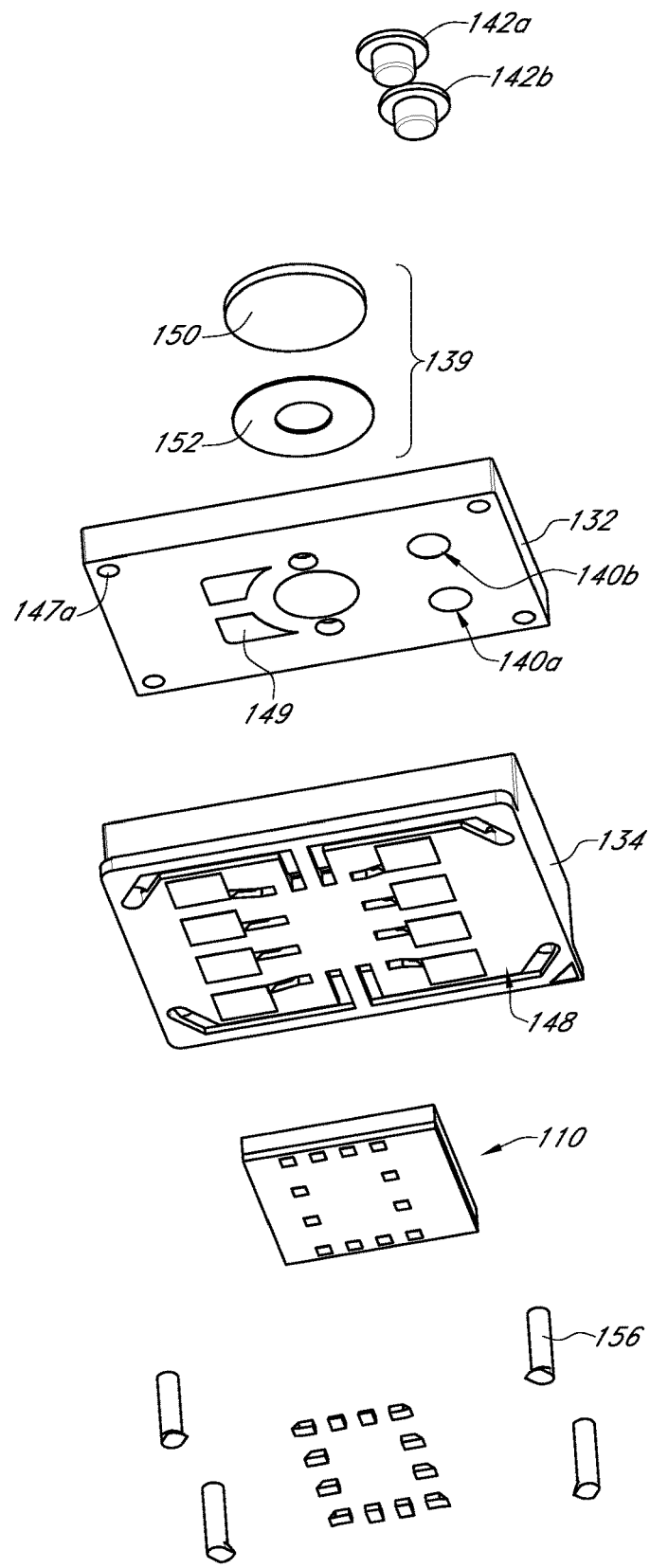
FIG. 17B is a schematic exploded view of the device illustrated in FIGS. 16A-16F as seen from another angle.
Figure 18A:
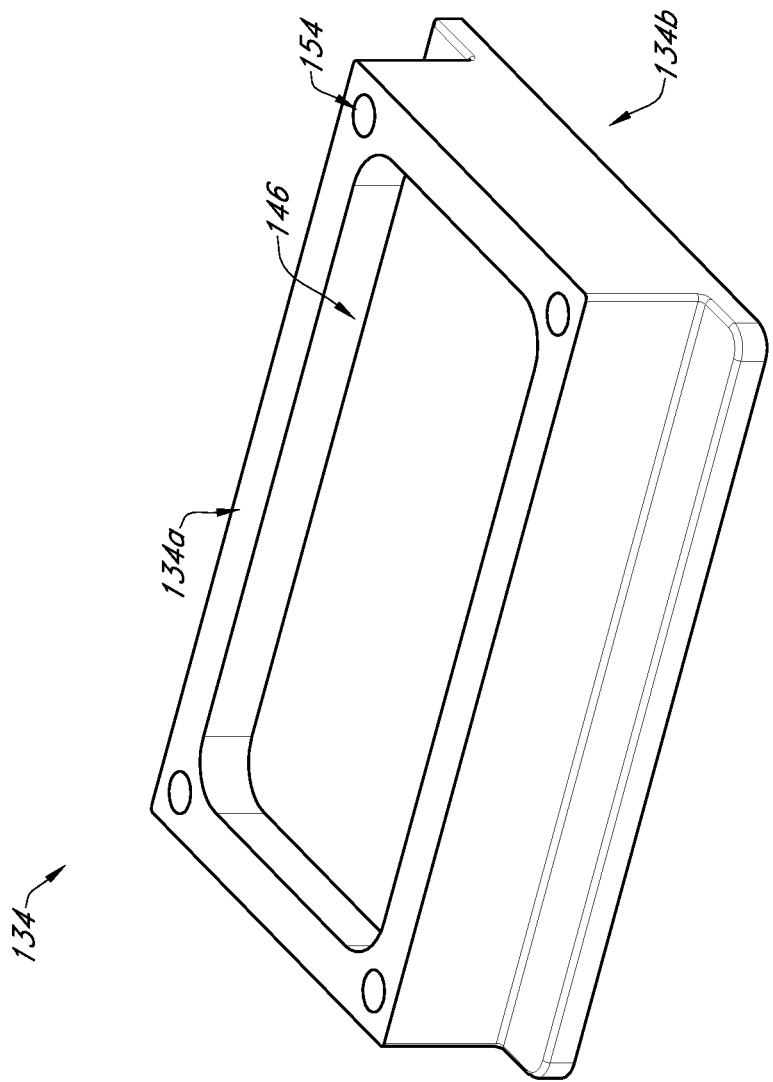
FIG. 18A is a schematic perspective view of a lower portion of the device illustrated in FIGS. 16A-17B.
Figure 18B:
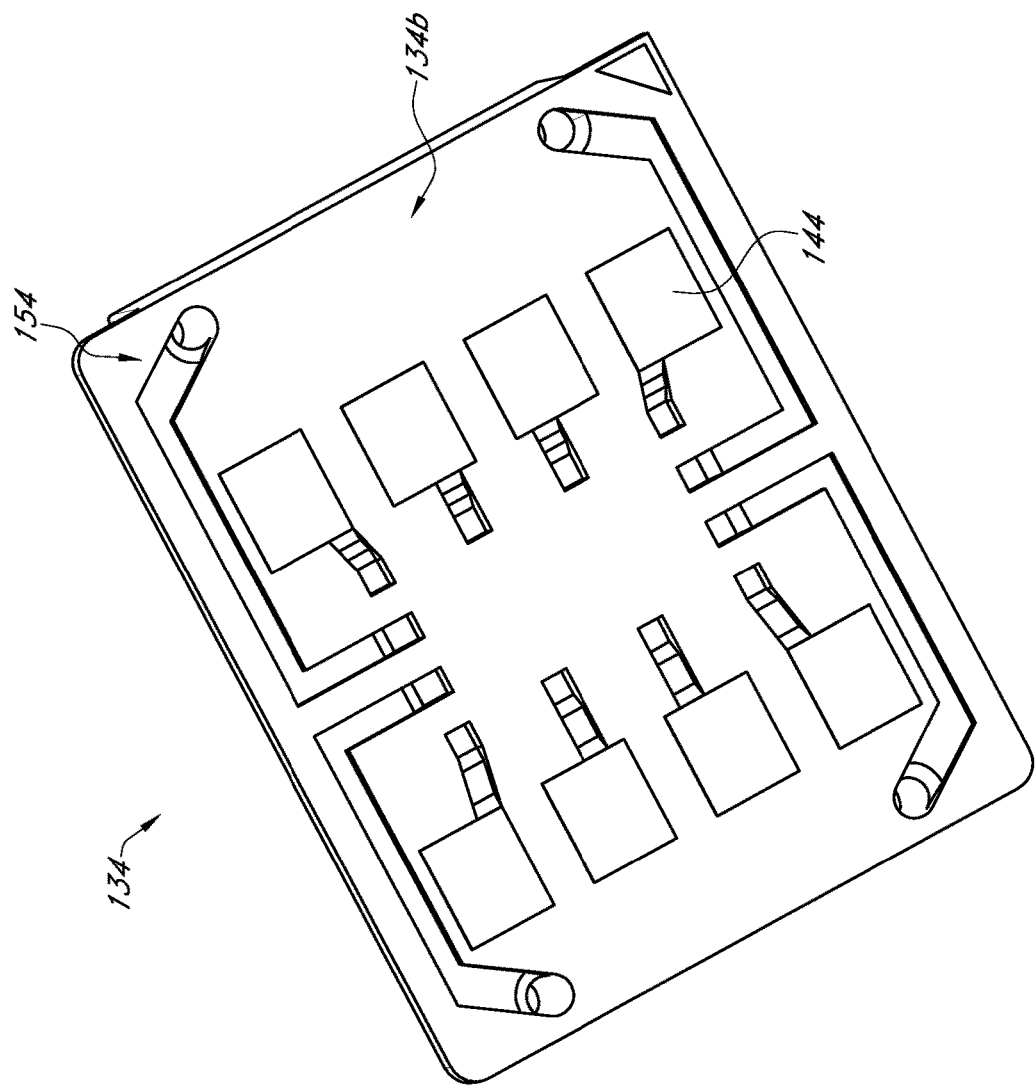
FIG. 18B is a schematic bottom plan view of the lower portion illustrated in FIG. 18A.
Figure 18C:
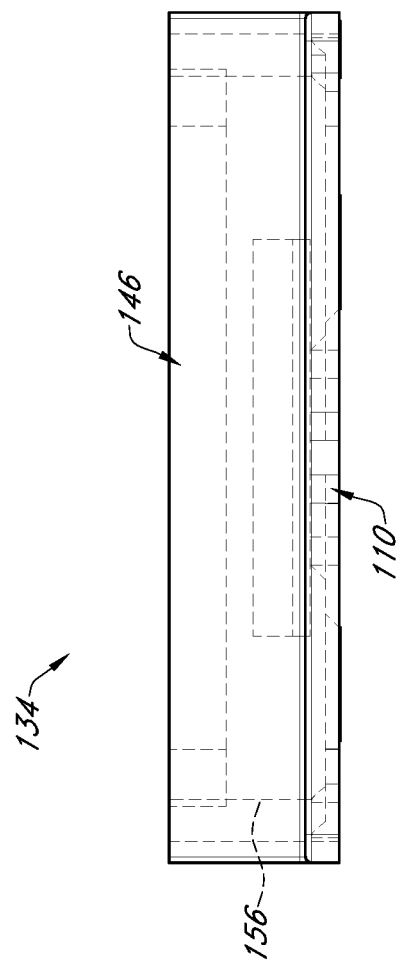
FIG. 18C is a schematic side view of the device illustrated in FIGS. 16A-17B with internal components of the device shown in dashed lines.
Figure 19A:
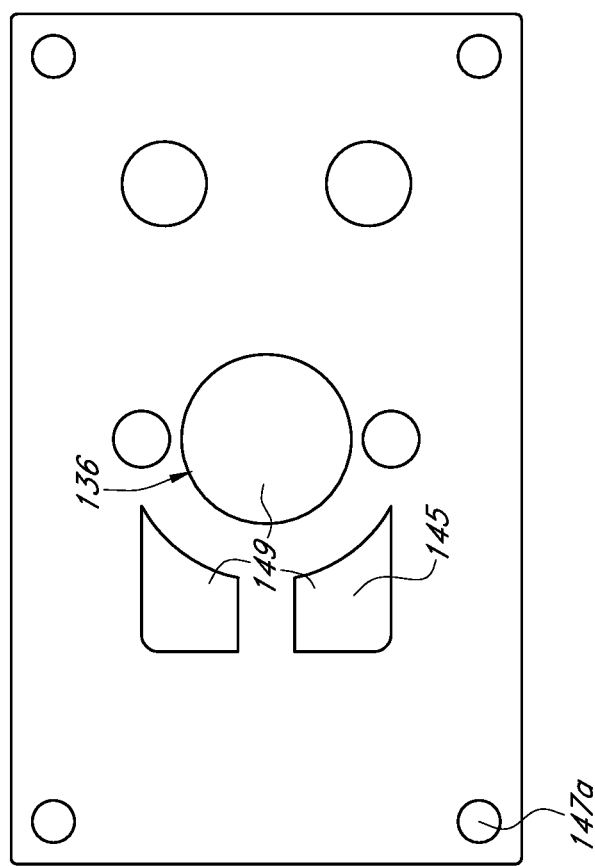
FIG. 19A is a schematic bottom plan view of the upper portion of the device illustrated in FIGS. 16A-17B.
Figure 19B:
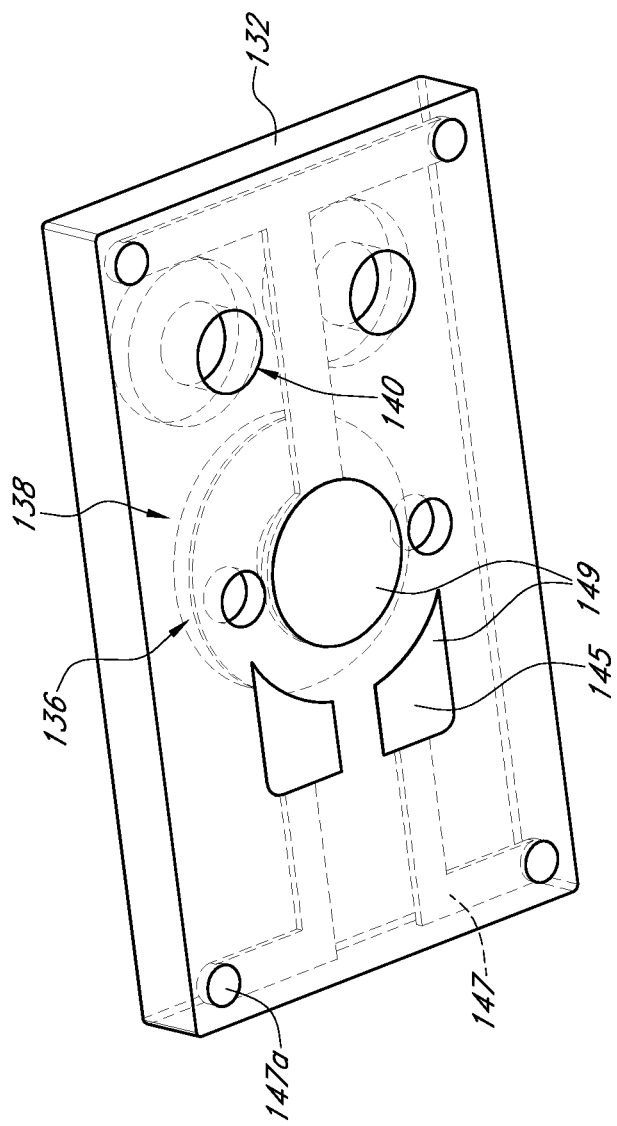
FIG. 19B is a schematic perspective view of the upper portion illustrated in FIG. 19A, with internal components of the upper portion shown in dashed lines.
Figure 19C:
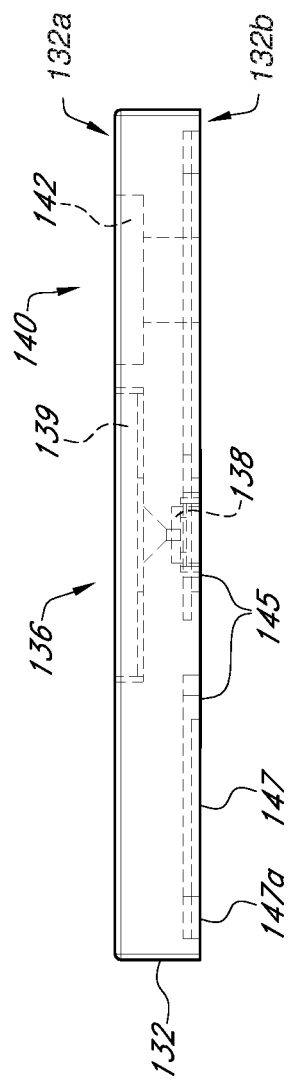
FIG. 19C is a schematic side view of the upper portion illustrated in FIGS. 19A and 19B with internal components of the device shown in dashed lines.
Figure 20A:
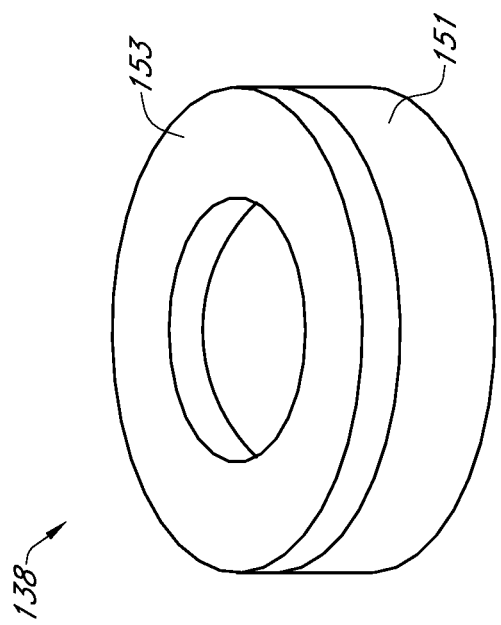
FIG. 20A is a schematic perspective view of a membrane for the device illustrated in FIGS. 16A-17B.
Figure 20B:
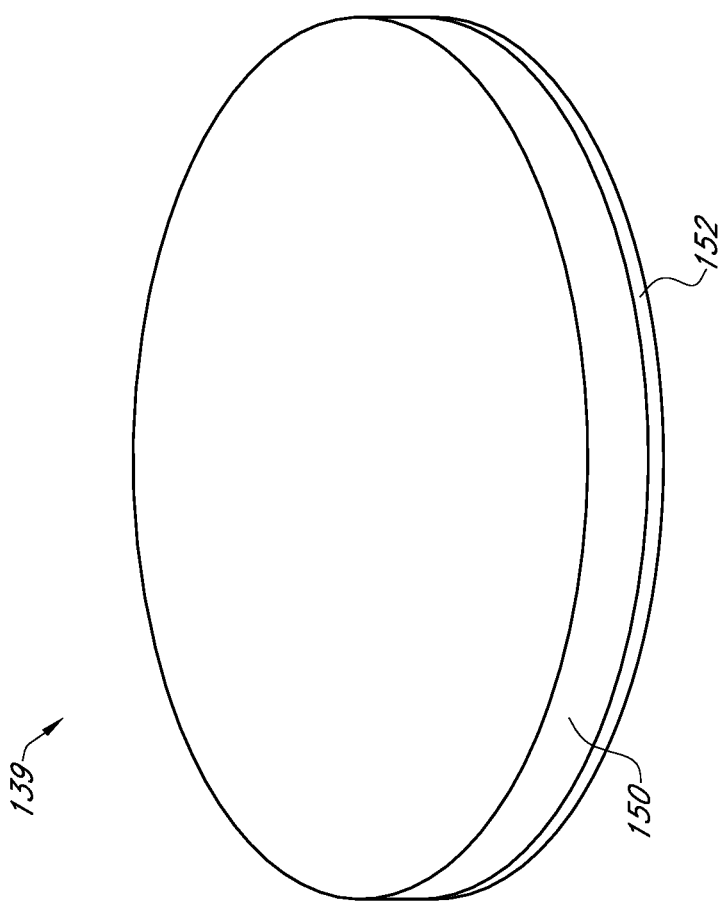
FIG. 20B is a schematic perspective view of a filter of the device illustrated in FIGS. 16A-17B.

FIG. 17A is a schematic exploded view of the device 5 illustrated in FIGS. 16A-16F as seen from above. FIG. 17B is a schematic exploded view of the device 5 illustrated in FIGS. 16A-16F as seen from below. FIG. 18A is a schematic perspective view of the lower portion 134 of the device 5 illustrated in FIGS. 16A-17B. FIG. 18B is a schematic bottom plan view of the lower portion 134 illustrated in FIG. 18A. FIG. 18C is a schematic side view of the lower portion 134 illustrated in FIGS. 18A and 18B with the molding. FIG. 19A is a schematic bottom plan view of the upper portion 132 of the device 5 illustrated in FIGS. 16A-17B. FIG. 19B is a schematic perspective view of the upper portion 132 illustrated in FIG. 19A. FIG. 19C is a schematic side view of the upper portion 132 illustrated in FIGS. 19A and 19B. FIG. 20A is a schematic perspective view of the membrane 138 of the device 5 illustrated in FIGS. 16A-17B. FIG. 20B is a schematic perspective view of the filter 139 of the device 5 illustrated in FIGS. 16A-17B.

In some embodiments, the membrane 138 can comprise a plurality of layers. For example, the membrane 138 can include a membrane body or a hydrophobic layer 151 (e.g., PTFE) and adhesive layer 153. In some embodiments, the adhesive layer 153 can adhere the membrane 138 to the upper portion 132 of the housing 130 over the access port 136. In the illustrated embodiment, the adhesive layer 153 can adhere the membrane 138 to a recess formed at the bottom side 132b of the upper portion 132 and over the access port 136. In some other embodiments, the adhesive layer 153 can adhere the membrane 138 to the upper side 132a of the upper portion 132 over the access port 136. The adhesive layer 153 can seal the membrane 138 over the access port 136 to prevent leakage of the electrochemical solution provided in the chamber 146. In other embodiments, the membrane 138 can be fixed to the housing over the access port 136 without a separate adhesive layer, such as by welding or heat treatment.

The filter 139 can include a filter layer 150 and an adhesive layer 152. The adhesive layer 152 can adhere the filter layer 150 to a recess formed in the upper portion 132 of the housing 130 and over the access port 136. In some embodiments, the access port 136 can be structured such that when the filter 139 is placed in the access port 136, the top side 132a of the upper portion 132 can be generally planar. The filter layer 150 can comprise any suitable materials. The filter 139 can include any suitable additional layers. In some applications, the filter 139 can filter unwanted materials that might interfere with detection of the gas(es) of interest. In some embodiments, the filter 139 can comprise activated carbon that can react with alcohol (e.g., adsorb alcohol). In some embodiments, the filter 139 can comprise activated woven carbon cloth. For example, the activated woven carbon cloth can be Flexzorb™ ACC, manufactured by Chemviron, for all of the embodiments herein that include a filter.

In some embodiments, the lower portion 134 can include a plurality of holes 154 for conductive plugs 156. The conductive plugs 156 can comprise, for example, a solder plug or a conductive epoxy plug. The conductive plug 156 can be connected to ends 147a of the arms 147 formed in the upper portion 132.

Figure 21A:
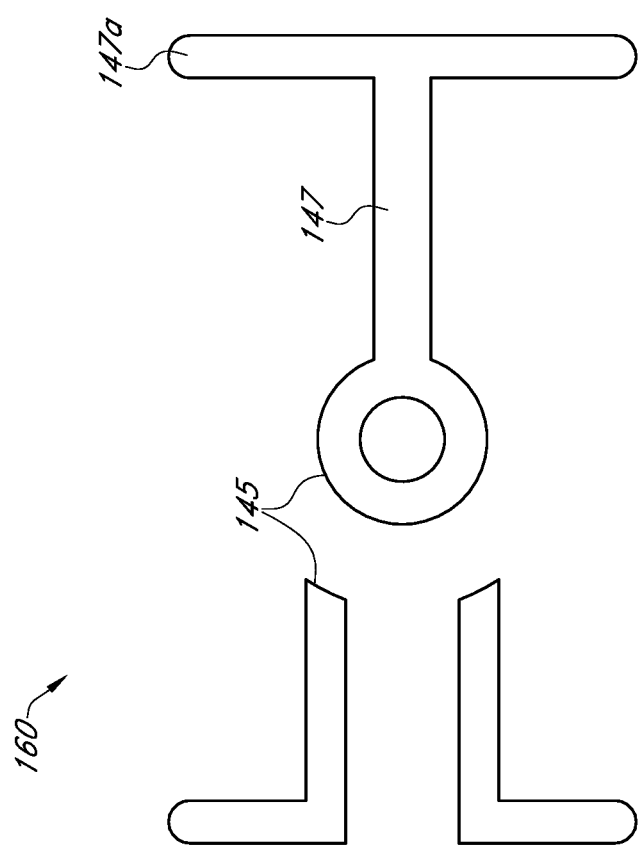
FIG. 21A is a schematic top plan view of a lead frame structure for an electrochemical sensor according to one embodiment.
Figure 21B:
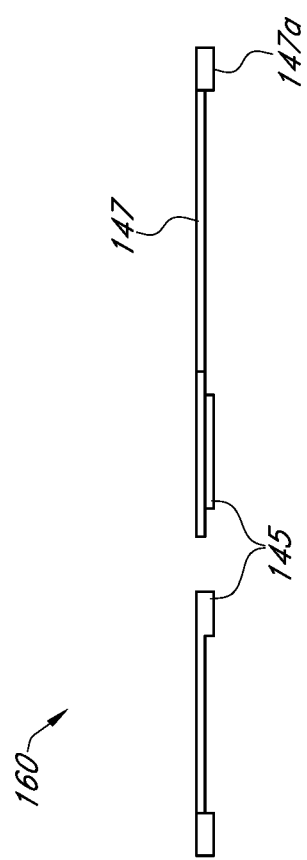
FIG. 21B is a schematic side view of the lead frame structure illustrated in FIG. 21A.
Figure 21C:
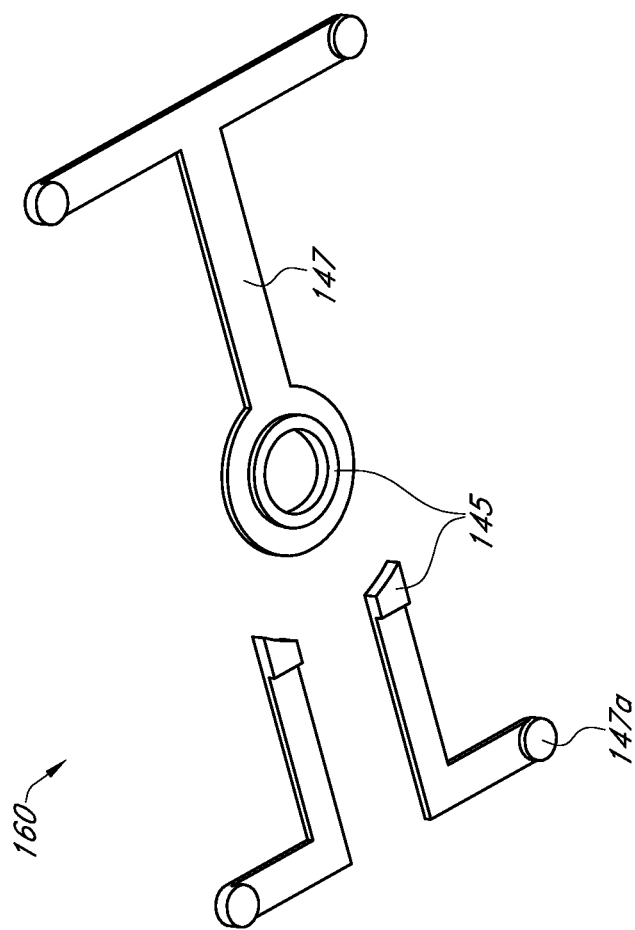
FIG. 21C is a schematic bottom perspective view of the lead frame structure illustrated in FIGS. 21A and 21B.

FIG. 21A is a schematic top plan view of a lead frame structure 160 according to one embodiment. FIG. 21B is a schematic side view of the lead frame structure 160 illustrated in FIG. 21A. FIG. 21C is a schematic bottom perspective view of the lead frame structure 160 illustrated in FIGS. 21A and 21B. The lead frame structure 160 can comprise the plurality of electrodes 145, and the arms 147 that extends from the electrodes 145. In some embodiments, the ends 147a of the arms 147 and/or the electrodes 145 can be coated with a protective layer (e.g., a gold layer). In some embodiments, the electrodes 145 can be coated with a carbon black or other catalyst layer. In some embodiments, the lead frame structure 160 can comprise various metal materials, such as copper, stainless steel, etc. In some embodiments, the lead frame structure 160 can comprise conductive non-metal materials, such as conductive ABS.

The devices disclosed herein can be manufactured using any suitable methods. In some embodiments, a method of manufacturing a device can include fabricating a housing that has an upper portion and a lower portion. The method can include fabricating a lead frame that has a plurality of electrodes and arms extending from the electrodes. In some embodiments, fabricating the housing can include a molding process, for example, single or double shots molding. In some embodiments, fabricating the lead frame can include providing a conductive plastic material in voids or grooves formed in a the housing. In some embodiments, the housing can be defined by a molding material (e.g., liquid crystal polymer (LCP) or acrylonitrile butadiene styrene (ABS)). Fabricating the housing can include overmolding the lead frame (metal or conductively-filled plastic) by a molding material (e.g., LCP or ABS). In some embodiments, fabricating the housing can include providing the upper portion (e.g., a first element) and providing the lower portion (e.g., a second element). The lower portion can have a chamber configured to receive an electrochemical solution. The upper portion can have a plurality of electrodes, an access port, and/or a fill port. In some embodiments, fabricating the housing can include bonding the upper portion and the lower portion. In some embodiments the upper portion and the lower portion can be bonded by way of an adhesive. In some embodiments, the upper portion and the lower portion can be monolithically formed. In some embodiments, fabricating the housing can include providing a seal plate configured to seal the chamber.

In some embodiments, the method can also include providing a membrane and/or a filter to the access port. In some embodiments, the membrane allows gas communication between the chamber and the outside environs while preventing liquid communication between the chamber and the outside environs. In some embodiments, the membrane can be attached to the housing by way of an adhesive, ultrasonic welding, or thermal welding.

In some embodiments, the method can also include filling an electrochemical solution into the chamber. The electrochemical solution can be filled into the chamber through the fill port. The fill port can be sealed by way of a plug, and/or epoxy, potting materials.

In some embodiments, the method can also include forming an interconnect structure in the device. For example, the lower portion can include a through via (e.g., through mold via) that can at least partially provide interconnection between the plurality of electrodes to an external substrate or an external device.

In some embodiments, the method also includes providing a system in package (SiP). In some embodiments, the SiP can be provided into a cavity formed in the housing. For example, the cavity can be formed in the lower portion of the housing. In some embodiments, SiP can be over molded directly into the lower portion of the package.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The accompanying claims and their equivalents are intended to cover such forms or modifications as would fall within the scope and spirit of the disclosure.

The invention claimed is:

1. A gas sensor comprising:
   a housing having an upper portion, and a lower portion, wherein the housing comprises a non-conductive molding material;

a chamber formed in the lower portion of the housing, the chamber configured to receive an electrochemical solution;

a cavity separated from the chamber and formed in the lower portion of the housing, the cavity configured to receive at least one electrical component;

a plurality of electrodes comprising a conductive material and formed in the upper portion of the housing; the plurality of electrodes integrated and at least partially embedded in the non-conductive molding material of the housing along the upper portion of the housing and at least partially exposed to the chamber;

an access port formed in the upper portion, the access port configured to provide fluid communication between an interior of the housing and an outside environ; and one or more conductive arms extending horizontally from the plurality of electrodes;

wherein the plurality of electrodes are in electrical communication with an interconnect structure formed in the housing, the interconnect structure comprising the one or more conductive arms and a plurality of interconnects extending through the lower portion of the housing from a top side of the lower portion to a bottom side of the lower portion;

wherein, when the housing is coupled to a printed circuit board assembly, a top portion of each of the plurality of interconnects is in contact with a chamber-facing side of the one or more conductive arms and a lower portion of each of the plurality of interconnects is in contact with a cavity-facing side of the printed circuit board assembly;

wherein the chamber and the cavity are formed on opposite sides of the lower portion.

2. The gas sensor of claim 1, further comprising a microcontroller packaged in the housing and electrically coupled to the plurality of electrodes.

3. The gas sensor of claim 1, wherein the housing comprises polymer or plastic molded over the plurality of electrodes.

4. The gas sensor of claim 1, wherein at least one of the plurality of electrodes comprises conductively-filled plastic material.

5. The gas sensor of claim 1, wherein a thickness of the plurality of electrodes is greater than a thickness of the conductive arms.

6. The gas sensor of claim 1, wherein the access port comprises a membrane that allows gas communication between the chamber and the outside environ while preventing liquid communication between the chamber and the outside environ.

7. The gas sensor of claim 6, wherein the membrane comprises a membrane body having a PTFE membrane, one or more adhesive layers, and a protective layer, wherein the membrane body is positioned between the one or more adhesive layers, and wherein the one or more adhesive layers are configured to adhere the membrane to the housing.

8. The gas sensor of claim 1, wherein the plurality of electrodes comprise at least one catalytic material selected from the group consisting of carbon black, iridium black, platinum black, gold black, and ruthenium black.

9. The gas sensor of claim 8, wherein at least a portion of the upper portion of the housing is covered with the at least one catalytic material.

10. The gas sensor of claim 1, wherein the housing comprises a liquid crystal polymer (LCP) material.

11. The gas sensor of claim 1, further comprising a recess formed in the upper portion and exposed to the chamber, the recess configured to receive at least a portion of the electrochemical solution when the electrochemical solution expands inside the chamber.

12. A gas sensor comprising:

a housing having an upper portion, and a lower portion, the upper portion including a molded frame comprising a non-conductive molding material;

a chamber formed in the lower portion of the housing, the chamber configured to receive an electrochemical solution;

a cavity separated from the chamber and formed in the lower portion of the housing, the cavity configured to receive at least one electrical component;

a lead frame structure comprising a conductive material and formed in the upper portion of the housing, the lead frame structure integrated and at least partially embedded in the non-conductive molding material of the housing along the upper portion of the housing and comprising a plurality of electrodes, the plurality of electrodes at least partially exposed to the chamber;

an access port formed in the upper portion, the access port configured to provide fluid communication between an interior of the housing and an outside environ; and one or more conductive arms extending horizontally from the plurality of electrodes;

wherein the plurality of electrodes are in electrical communication with an interconnect structure formed in the lower portion of the housing, the interconnect structure comprising a plurality of interconnects extending at least partially through a plurality of holes of the lower portion from a top side of the lower portion to a bottom side of the lower portion;

wherein the chamber and the cavity are formed on opposite sides of the lower portion.

13. The gas sensor of claim 12, wherein the housing comprises polymer or plastic molded over the lead frame structure.

14. The gas sensor of claim 12, wherein the access port is configured to provide fluid communication between the chamber and the outside environ.

15. The gas sensor of claim 12, wherein the access port comprises a membrane that allows gas communication between the interior of the housing and the outside environ while preventing liquid communication between the interior of the housing and the outside environ.

16. The gas sensor of claim 15, wherein the membrane comprises a membrane body having a PTFE membrane, one or more adhesive layers, and a protective layer, wherein the membrane body is positioned between the one or more adhesive layers, and wherein the one or more adhesive layers are configured to adhere the membrane to the housing.

17. The gas sensor of claim 12, wherein the housing comprises a liquid crystal polymer (LCP) material.

18. The gas sensor of claim 12, further comprising a recess formed in the upper portion and exposed to the chamber, the recess configured to receive at least a portion of the electrochemical solution when the electrochemical solution expands inside the chamber.

* * * * *